INVENTORS
ROBERT J. GOUNTANIS
HERMAN OSOFSKY
BY
Griffin and Stokes
ATTORNEYS

Oct. 11, 1966 R. J. GOUNTANIS ET AL 3,278,906

DUAL CHANNEL MODE

Filed April 1, 1963 22 Sheets-Sheet 2

DUAL CHANNEL MODE

Filed April 1, 1963

Oct. 11, 1966 R. J. GOUNTANIS ETAL 3,278,906

DUAL CHANNEL MODE

Filed April 1, 1963 22 Sheets-Sheet 7

DUAL CHANNEL MODE

Filed April 1, 1963 22 Sheets-Sheet 8

DUAL CHANNEL MODE

Filed April 1, 1963

22 Sheets-Sheet 11

Oct. 11, 1966 R. J. GOUNTANIS ETAL 3,278,906

DUAL CHANNEL MODE

Filed April 1, 1963

22 Sheets-Sheet 13

Oct. 11, 1966 R. J. GOUNTANIS ETAL 3,278,906

DUAL CHANNEL MODE

Filed April 1, 1963 22 Sheets-Sheet 18

Oct. 11, 1966 R. J. GOUNTANIS ET AL 3,278,906

DUAL CHANNEL MODE

Filed April 1, 1963 22 Sheets-Sheet 20

United States Patent Office 3,278,906

Patented Oct. 11, 1966

3,278,906

DUAL CHANNEL MODE

Robert J. Gountanis, Mendota Heights, and Herman Osofsky, Roseville, Minn., assignors to Sperry Rand Corporation, New York, N.Y., a corporation of Delaware Filed Apr. 1, 1963, Ser. No. 269,247
12 Claims. (C. 340—172.5)

The present invention relates to control circuits for controlling the transfer of data between a data processing unit and one or more external devices thereto. The data processing unit normally employs words containing N bits of data. Some of the external devices are capable of transmitting or receiving N-bit data words and these devices are connected to the data processing unit by means of N-bit data transfer channels. Others of the external devices are capable of transmitting or receiving data words containing 2 N-bits of data. These devices are connected to the data processing unit by two channels each capable of transferring N bits of data. There are two types of channels. Input channels are employed for entering data into the data processing unit from an external device. Output channels are employed for transferring data from the data processing unit to an external device. All input channels are identical and all output channels are identical so that any channel may be connected to an external device of either type. The present invention provides means for controlling two input channels or two output channels connected to a single external device whereby the data processing unit may transmit or receive data words containing 2 N bits of data.

In the present system the data processing unit is connected to the external devices by way of cables. Each cable contains the data and control leads for one input channel or one output channel. Thus, each cable includes N signal paths for transferring data words from an external device to the data processing unit or N signal paths for transferring data words to an external device from the data processing unit.

As disclosed herein, all data transfers occur at the request of the external devices. These devices may signal an input request, an output request, or an external interrupt. Each cable contains three control signal paths over which these signals may be transmitted to the data processing unit.

When operating in the single channel mode, an input request causes the data processing unit to sample the data on the corresponding input channel and stores the data in the memory of the data processing unit. When the data has been stored, the data processing unit sends an Input Acknowledge signal to the external device so that the external device may know that the data on its input channel has been stored in the memory.

When operating in the single channel mode, an output request causes the data processing unit to remove a data word from memory and place it in an output register. The data processing unit then sends an Output Acknowledge signal to the external device so that the external device may know that the requested data is on the output channel and may be sampled at any time.

The External Interrupt signal is produced by an external device when an abnormal condition occurs therein. The external device places on the corresponding input channel a code word indicating the type of abnormal condition and then produces the External Interrupt signal. When operating in the single channel mode, the data processing unit responds by storing the code word, executing a special Jump Instruction, and then performing a subroutine to determine the type of abnormal condition.

Broadly speaking, an object of the present invention is to provide a system as described above in combination with means for controlling the system whereby it operates in the dual channel mode.

An object of the present invention is to provide means whereby a data processing unit having a basic word length of N bits may be connected to external devices having basic word lengths of either N bits or two-N bits so that words of either length may be transferred therebetween.

For ease of reference, all input channels are numbered consecutively and are divided into two groups designated even and odd. In like manner, all output channels are numbered consecutively and divided into even and odd groups. When an external device utilizing words having 2 N bits is being connected to the data processing unit two input channels are employed if data is to be transferred to the data processing unit and/or two output channels are required if data is to be transferred from the data processing unit to the external device. One is an odd numbered channel and the other is the next lower even numbered channel of the same type. Selectively operable dual mode control means are provided for each odd numbered channel. When an odd numbered channel and the next lower even numbered channel are connected to an external device having a word length of two N bits and the mode selection means for the odd numbered channel is set, an input request, output request or an External Interrupt signal transmitted over the odd numbered channel causes the transfer of a data word containing two N bits of data. This is designated the dual mode of operation.

When the device is set up for dual mode transfers over a pair of input channels and an input request is received by the data processing unit over the odd numbered channel of the pair, the data processing unit responds by sampling the data on both the odd numbered input channel and the next lower even numbered input channel, and storing the sampled data in the memory on two consecutive memory cycles.

When the device is set up for dual mode transfers over a pair of output channels and an output request is received by the data processing unit over the odd numbered channel of the pair, the data processing unit responds by withdrawing N bits of data from each of two memory locations, and placing the data in two output registers. The data processing unit then sends an Output Acknowledge signal to the external device making the request so that it may know that the requested data is on the output channels and may be sampled at any time.

When the device is set up for dual mode transfers over a pair of input channels and an External Interrupt signal is sent to the data processing unit over the odd numbered channel of the pair, the data processing unit responds by sampling the data words on the odd numbered input channel and the next lower even numbered input channel, and storing the data words in memory on two consecutive memory cycles. After the data words have been stored, the data processing unit withdraws a special Jump Instruction from memory and performs a subroutine to analyze the data words and determine the abnormal condition which caused the External Interrupt.

Therefore, a further object of the present invention is to provide a data processing unit having a plurality of input channels and output channels each capable of transferring data words having a length of N bits, at least one external device for processing data words having a length of two N bits, said external device being connected to at least two of said input channels and/or two of said output channels, and means responsive to a signal from said external device for controlling the transfer of 2 N bits of data between said data processing unit and said external device.

An object of the present invention is to provide a data processing unit and an external device as described above, said data processing unit having a memory for storing words having a length of N bits, said transfer control means being responsive to an input request or an External Interrupt signal from said external device for storing the data present on one of said input channels and then storing the data present on the other said input channels.

An object of the present invention is to provide a data processing unit as described above, said data processing unit having a memory for storing words having a length of N bits, said transfer control means being responsive to an output request signal from said external device for transferring two words from said memory to an output register and then signalling said external device that it may sample the two output channels to obtain the requested word.

In accordance with the present invention, the data processing unit may be required to accept a data word having a length of 2 N bits, store this word, and at some later time transfer this word back to the same external device from whence it came or to another external device. Since only one-half of a double length word can be stored in any given memory location of the data processing unit, the N most significant bits are stored in one memory location and the N least significant bits are stored at the next lower memory location. This requires that means be provided for maintaining the significance of the two halves of a double length word. The problem of maintaining the correct significance is rendered more difficult because, under certain conditions, it may be desirable to read a block of words from consecutive memory locations in ascending order and, under other conditions, to read a block of words from consecutive memory locations in descending order. To further complicate the problem, some channels or functions may have a higher priority than other channels or functions. Since several external devices may be operating simultaneously, it is necessary to allot priority to the external device making the highest priority request, allow the transfer of one word (single or double length), and then again determine which external device is making the highest priority request.

An object of the present invention is to provide means for allotting priority on the basis of the type of function requested and the number of the channel making the request, said priority determining means generating a memory address at which a terminal control word is stored. This control word is the memory address at which the last data word of a block of words transmitted over a particular channel is to be stored. From the address of this control word the data processing unit derives the address of a current control word. The current control word specifies the memory address at which the next word is stored if an input request is being performed or the memory address from which the next word is read if an output request is being performed. The current control word is updated and returned to memory for use when the next word is transferred over the same channel.

Since an input or an output request requires only one memory reference if the channel making the request is set for the single mode of operation but requires two memory references if the channel making the request is set for the dual mode of operation, the current control word must be modified by either one or two. If the sign of the current control word is minus then the modification must be by minus one or minus two so that descending addresses are used. If the sign of the current control word is plus then the modification must be by plus one or plus two so that ascending addresses are used.

A further object of this invention is to provide a data processing unit, a plurality of external devices connected to said data processing unit by input and output channels, priority determining means for allotting priority between said external devices and generating the address of a control word associated with the channel allotted priority, means for selecting the dual or single mode of operation, and means responsive to said mode selection means and the sign of said control word for selectively modifying said control word by plus or minus one and transferring a single length word between said data processing unit and said external unit, or modifying said control word by a plus or minus two and transferring a double length word between said data processing unit and said external unit.

In the case of an external interrupt there are two control words for each channel. The first designates the address at which the incoming word stored and the second designates the address of a Jump Instruction. These control words are generated by the priority circuits and the mode selection means. When operating in the dual mode, an External Interrupt causes a double length word to be placed on the data lines for the input channels. This requires two memory references and two control words. Accordingly, a further object of the present invention is to provide a data processing unit, a plurality of external units connected to said data processing unit, mode selection means, priority means for allotting priority between said external devices and generating the address at which one-half of an incoming double length word is to be stored, and control means responsive to said mode selection means and said address generating means for subsequently generating an address at which the other half of said double length word is to be stored.

Other objects of the invention and its mode of operation will become apparent upon consideration of the following description taken in conjunction with the accompanying drawings in which.

Figure 32:
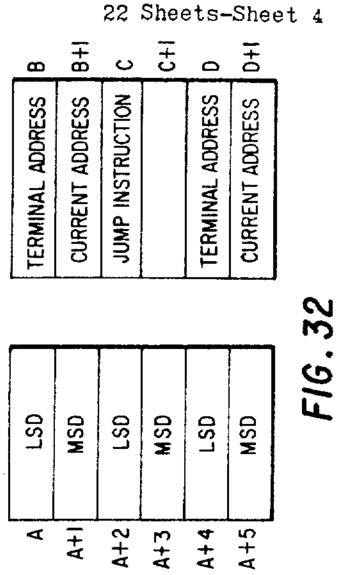
Figure 31:
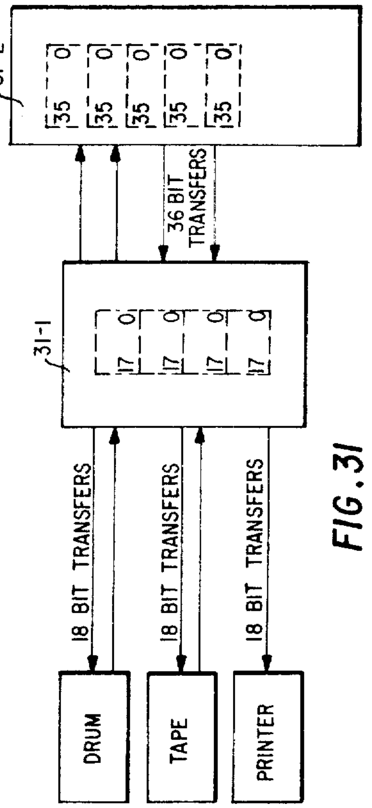
Figure 6:
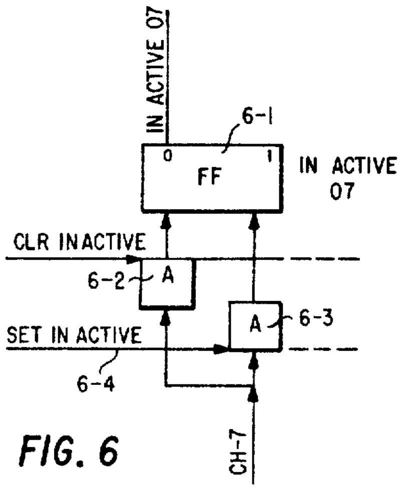
Figure 7:
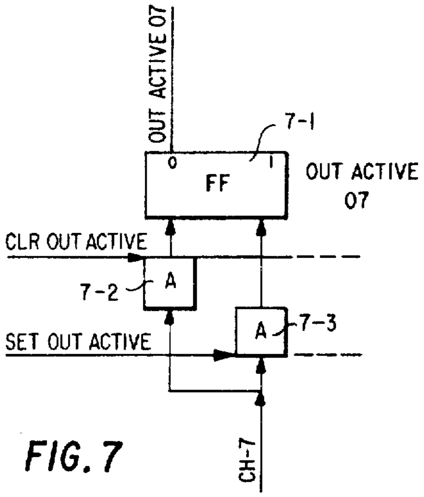
Figures 8, 9, 10:
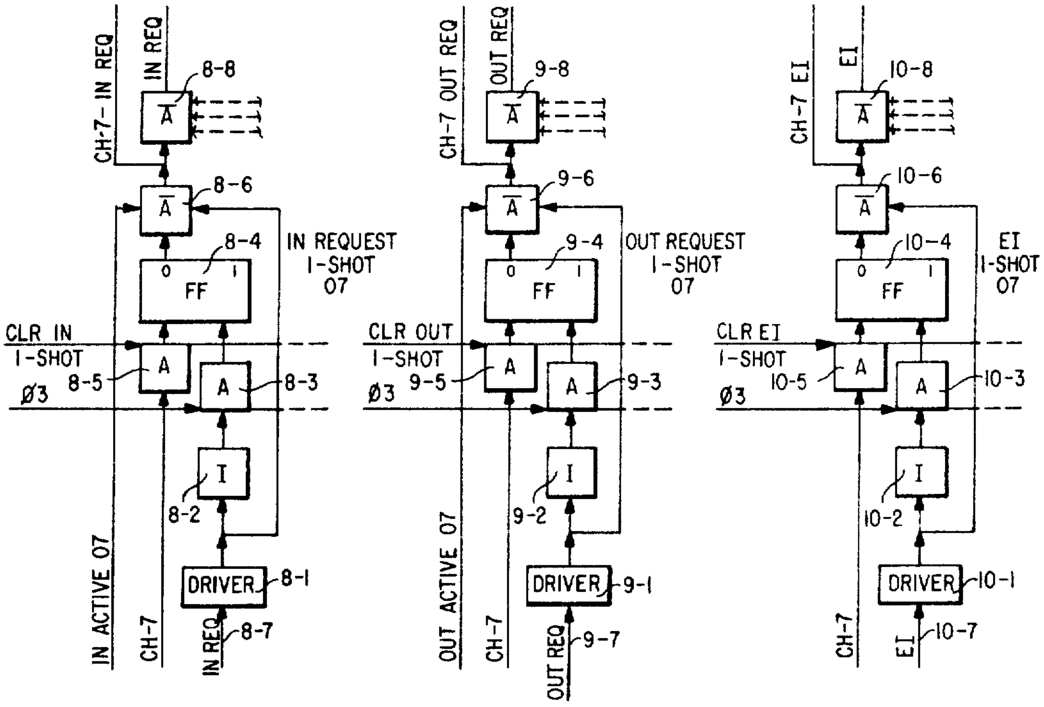
Figure 11:
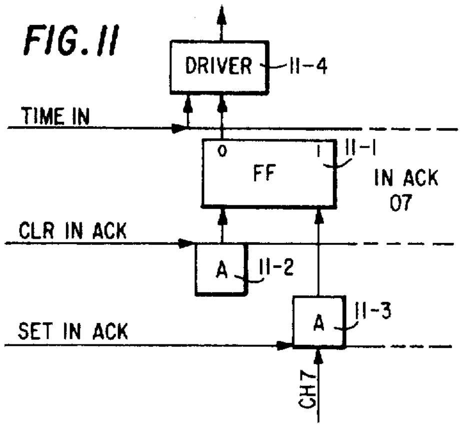
Figure 12:
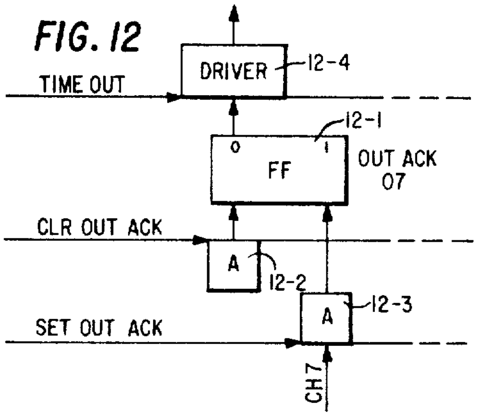
Figure 16:
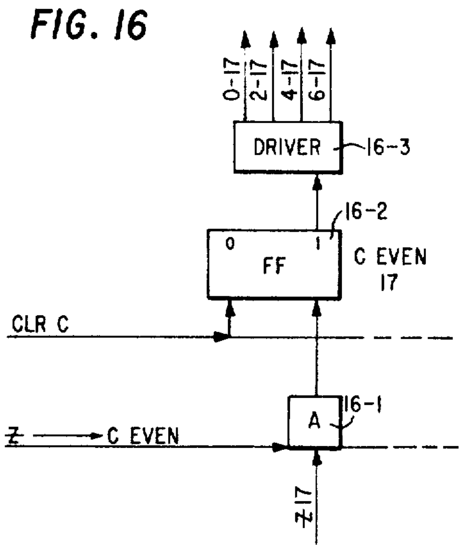
Figure 17:
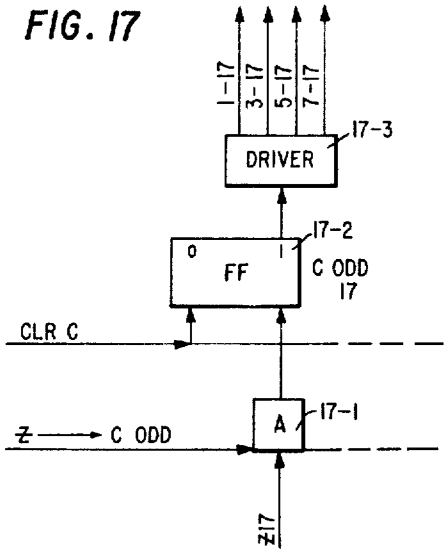
Figure 18:
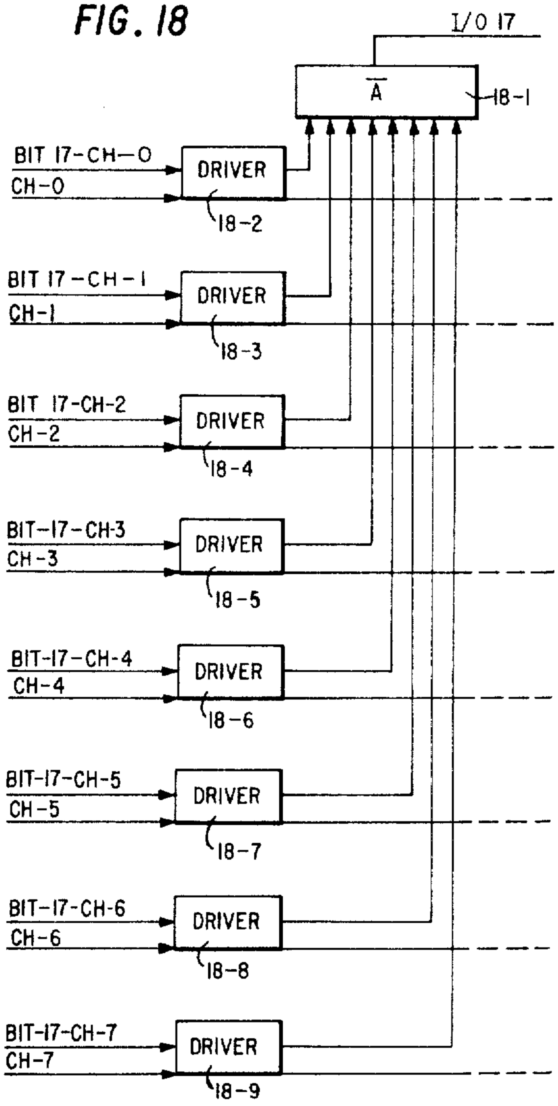
Figure 13:
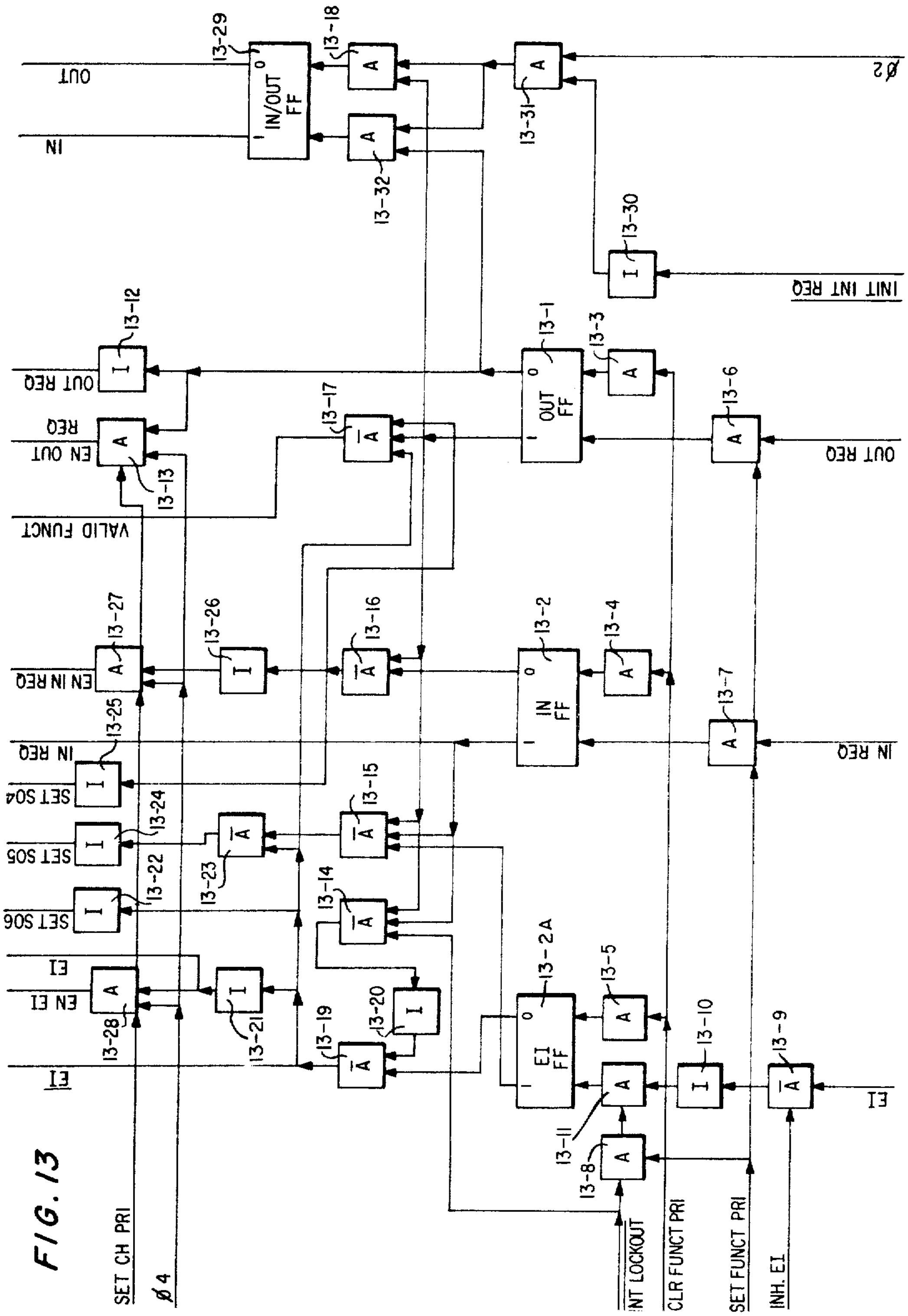
Figure 28:
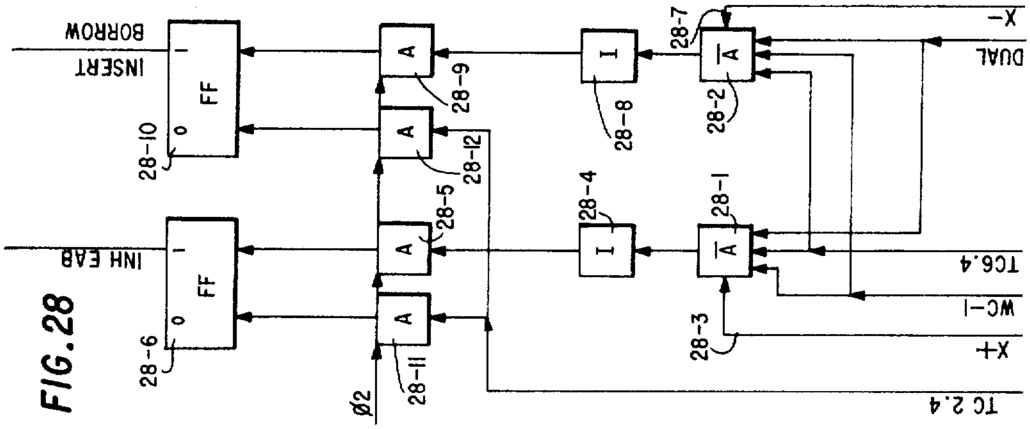
Figure 14:
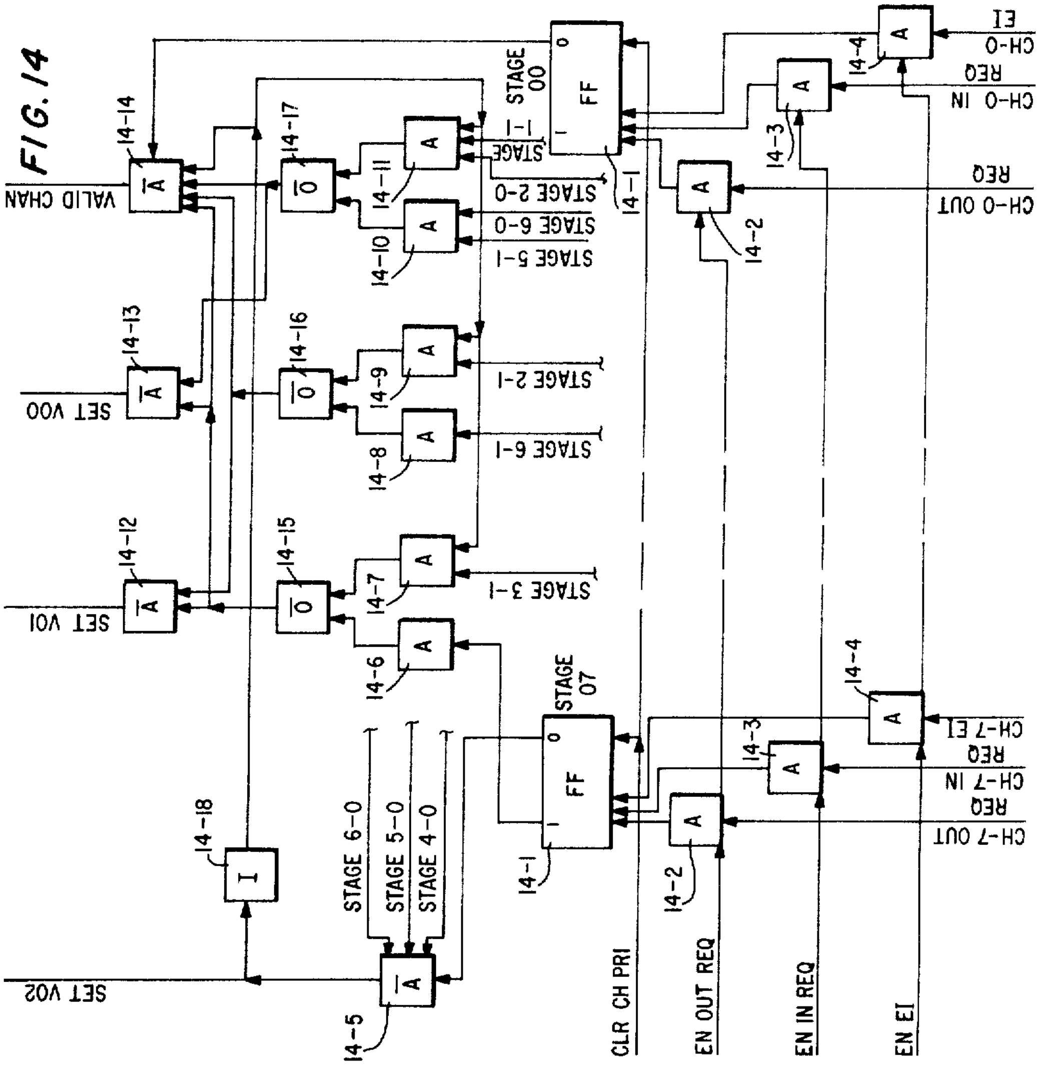
Figure 15:
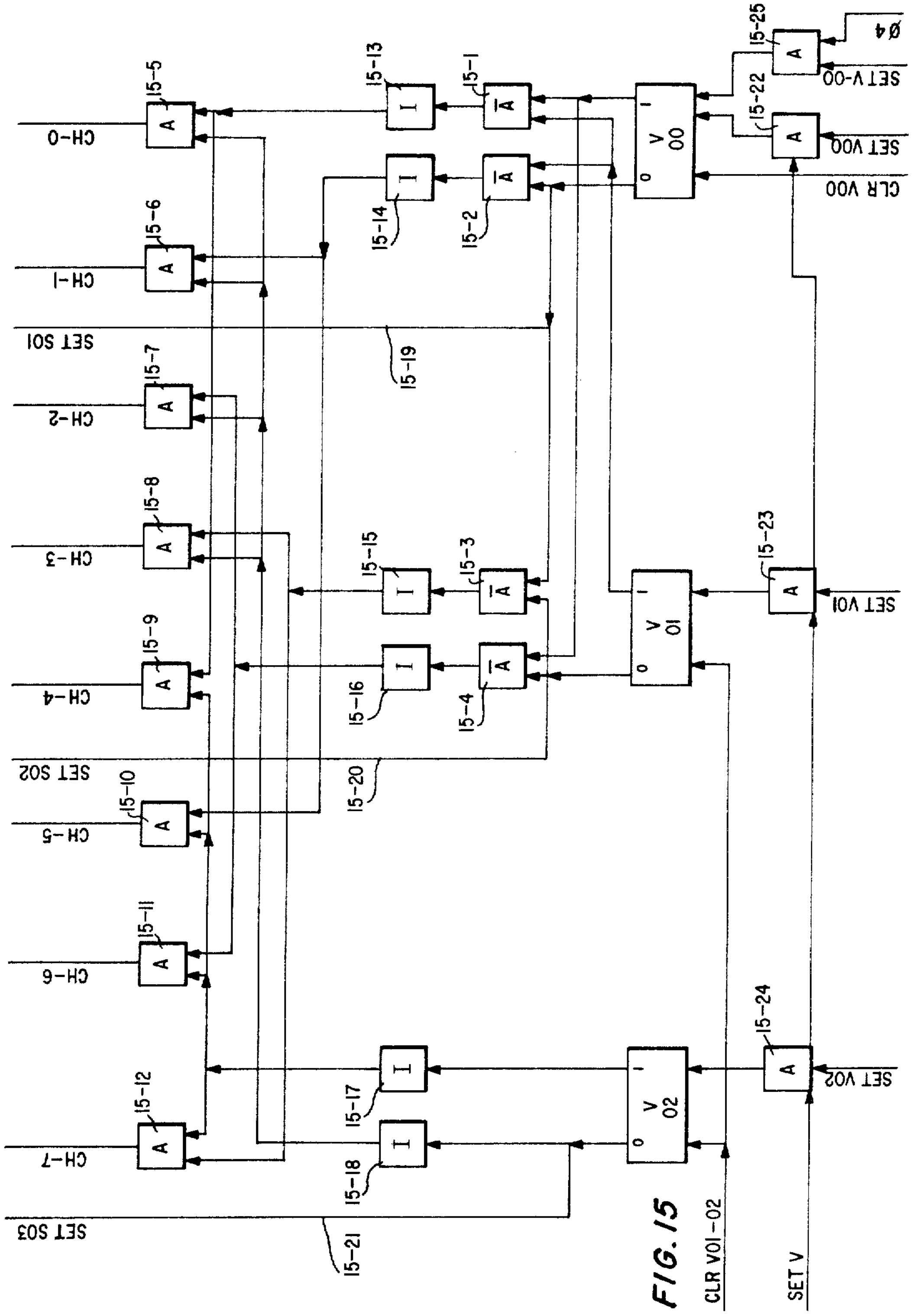
Figures 19, 20, 21, 22, 23:
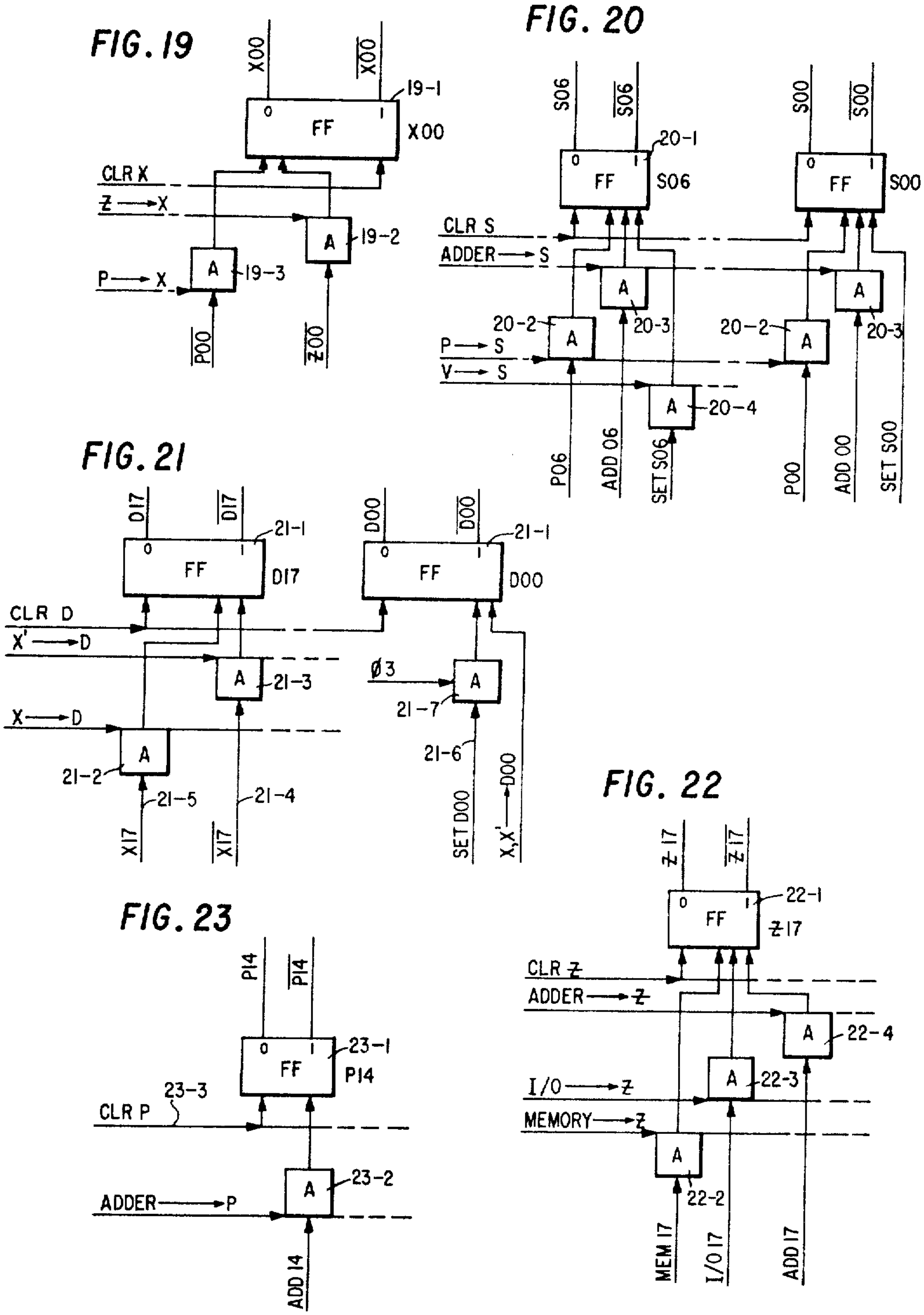
Figure 25:
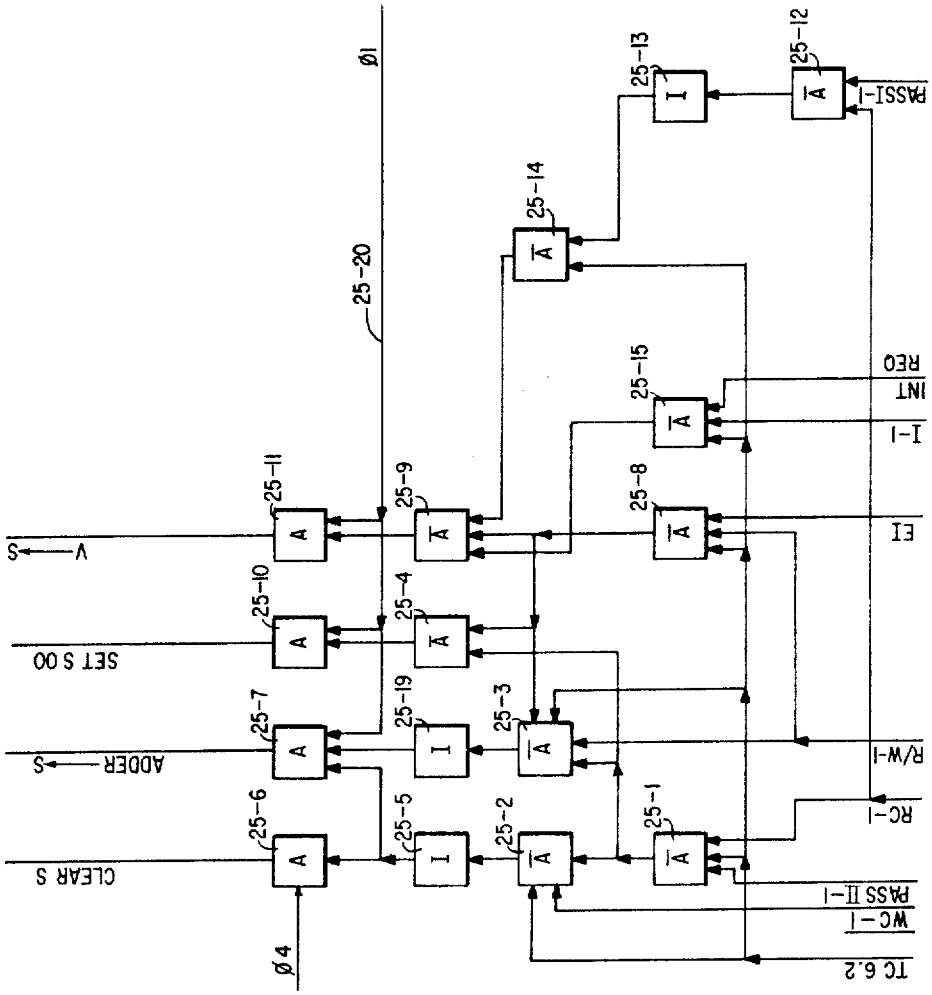
Figure 24:
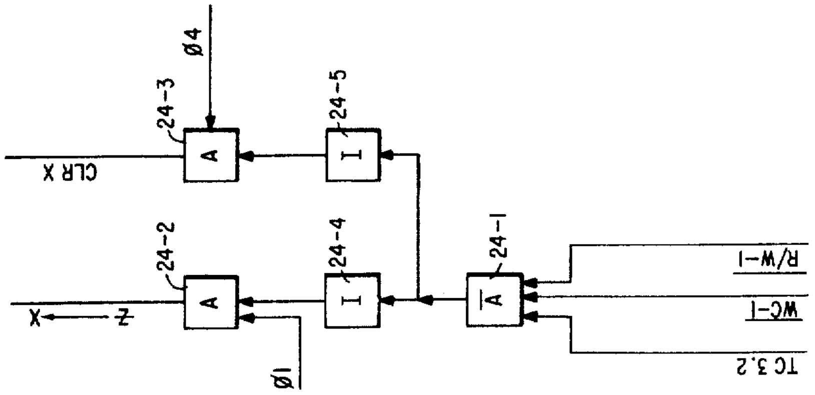
Figure 27:
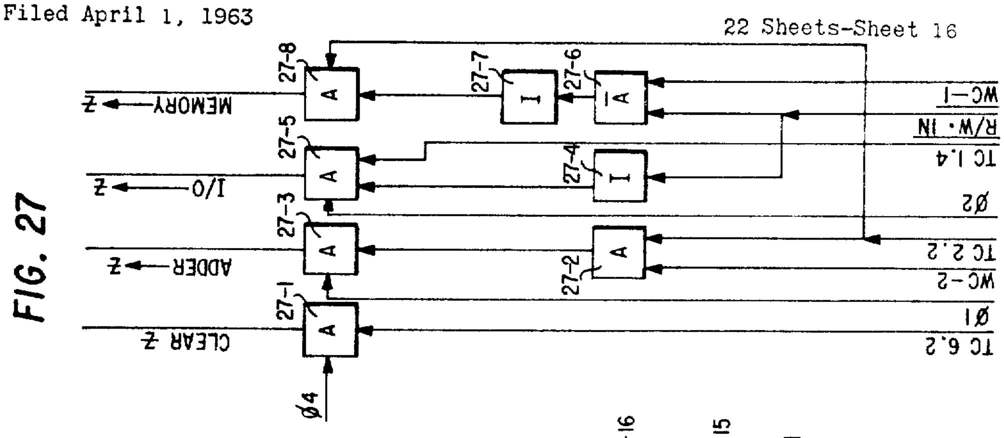
Figure 26:
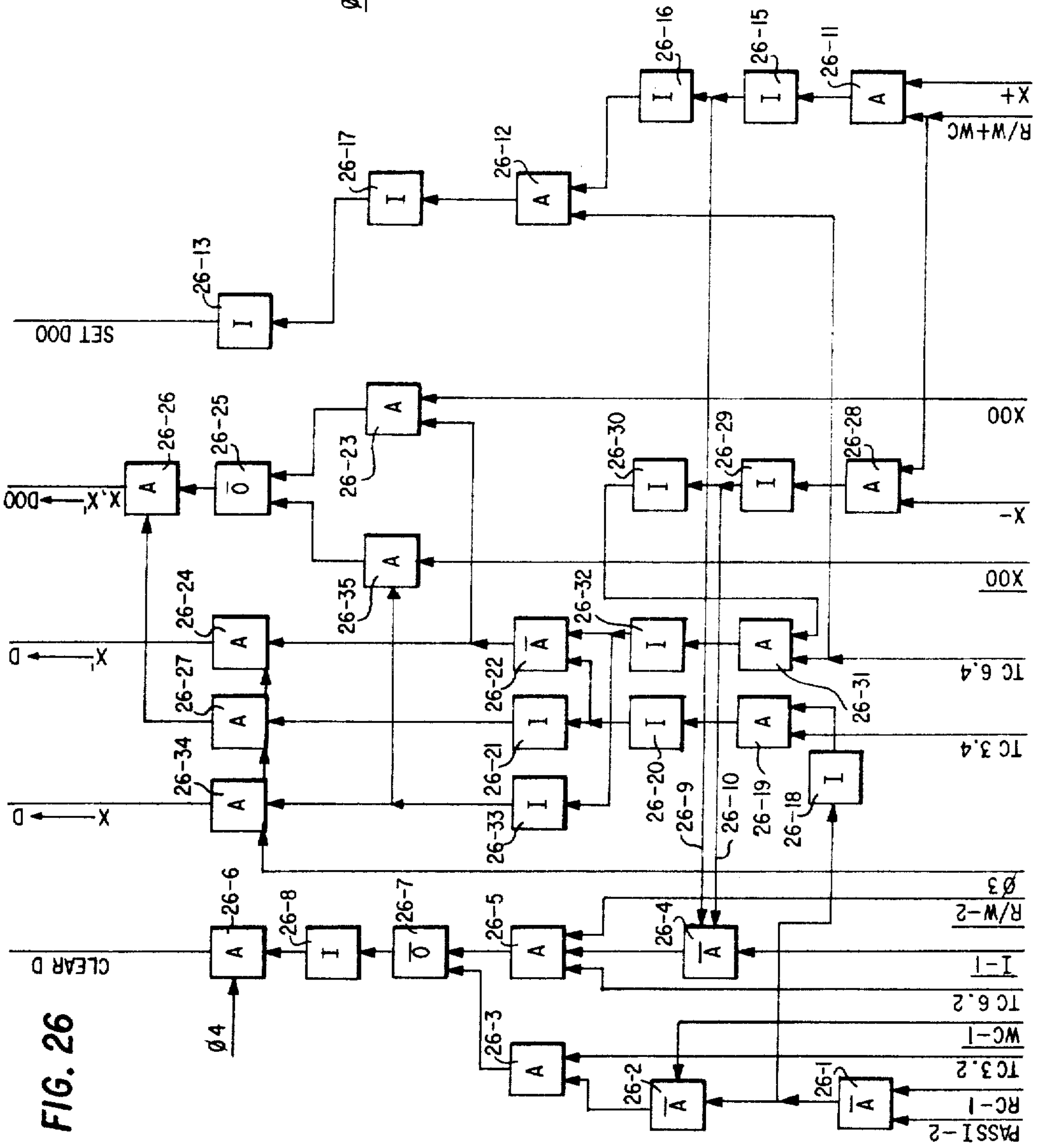
Figure 29:
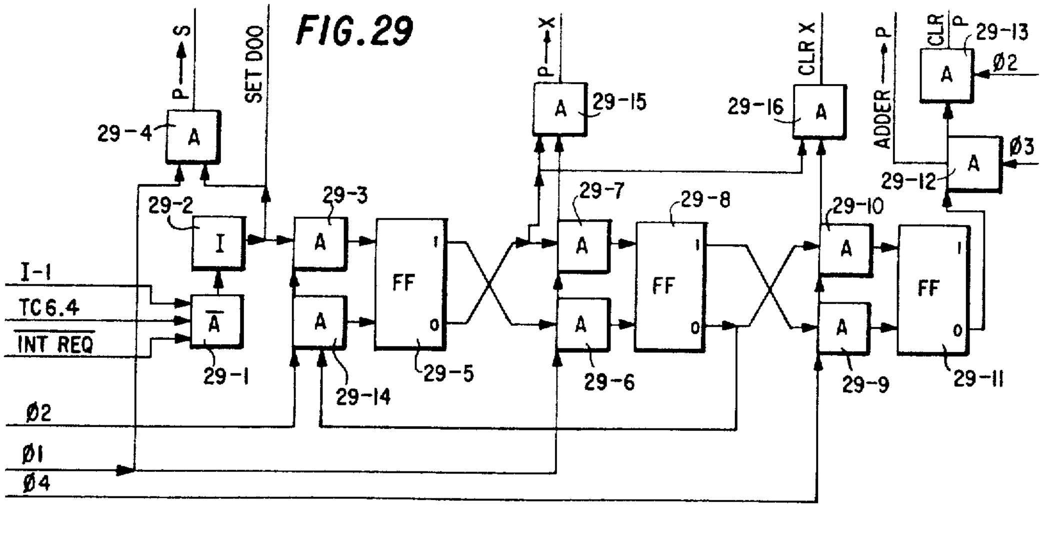
Figure 30:
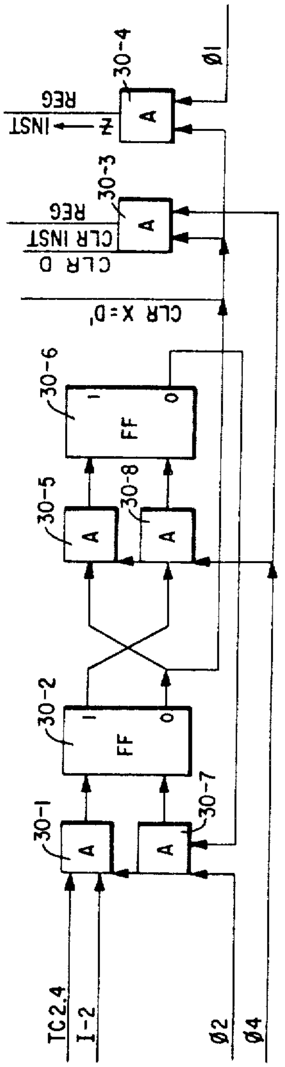

FIGURES *5a–5d* show the input-output control circuits;

FIGURE 6 shows a typical stage of the In Active register;

FIGURE 7 shows a typical stage of the Out Active register;

FIGURE 8 shows a typical stage of the In Request One Shot register;

FIGURE 9 shows a typical stage of the Out Request One Shot register;

FIGURE 10 shows a typical stage of the EI One Shot register;

FIGURE 11 shows the typical stage of the In Acknowledge register;

FIGURE 12 shows a typical stage of the Out Acknowledge register;

FIGURE 13 shows the function priority circuits;

FIGURE 14 shows the channel priority circuits;

FIGURE 15 shows the V Register and translator;

FIGURE 16 shows a typical stage of the C Even register;

FIGURE 17 shows a typical stage of the C Odd register;

FIGURE 18 shows a typical stage of the data input gates;

FIGURE 19 shows a typical stage of the X register;

FIGURE 20 shows typical stages of the S register;

FIGURE 21 shows typical stages of the D register;

FIGURE 22 shows a typical stage of the Z register;

FIGURE 23 shows a typical stage of the P register;

FIGURE 24 is a logic diagram of the X register controls;

FIGURE 25 is a logic diagram of the S register controls;

FIGURE 26 is a logic diagram of the D register controls;

FIGURE 27 is a logic diagram of the Z register controls;

FIGURE 28 is a logic diagram of circuits for selectively adding or subtracting one from the sum of the values applied to the Adder;

FIGURE 29 shows a timing chain for generating certain signals required for selecting instruction addresses;

FIGURE 30 shows circuits for generating certain commands on every I sequence;

FIGURE 31 is a block diagram for illustrating the advantages of the present invention;

FIGURE 32 is a diagram illustrating the manner in which double length words are stored in memory or removed therefrom under the control of channel control words; and, FIGURES 33*a*, 33*b*, 34*a*, 34*b*, 34*c*, 35*a*, 35*b*, 36 and 37 are timing diagrams illustrating the operation of the present invention under various sets of conditions.

*Basic circuits and conventions employed*

The basic circuits employed herein are the inverter, the Or-inverter, the And-inverter, and the And.

The inverter performs a signal inversion. That is, it responds to a positive input signal by producing a negative output signal. A negative input signal produces a positive output signal. The inverter is represented in the accompanying drawings as a square having the symbol I therein.

The Or-inverter performs the logical Or function with inversion. If all inputs are negative the Or-inverter produces a positive output signal. If at least one input is positive then it produces a negative output signal. This element is represented in the drawings by a rectangular or square bearing the symbol O.

The And-inverter performs the logical And-function with inversion. If all inputs are positive and And-inverter produces a negative output signal. If at least one input is negative then the And-inverter produces a positive output signal. This element is represented by a square bearing the symbol $\overline{A}$.

The And circuit performs the logical And function. If all its inputs are positive then it produces a positive output signal. If at least one input is negative then a negative output signal is produced. This element is represented by a square bearing the symbol A.

Both the And and And-inverter are referred to hereafter as gates.

A rectangle bearing the symbol FF denotes a bistable flip-flop. Each flip-flop has a set input terminal, a reset input terminal, a set output terminal and a reset output terminal. A positive signal applied to the set input terminal sets the flip-flop thus causing a negative signal to appear at the set output terminal and a positive signal to appear at the reset output terminal. A positive signal applied to the reset input terminal resets the flip-flop thus causing a positive signal to appear at the set output terminal and a negative signal to appear at the reset output terminal. A flip-flop may comprise two Or-inverters each having one input connected to the output of the other.

The details of the basic logic circuits are not shown herein since many devices capable of performing these functions are well known. Also, it will be understood that the terms positive and negative as used herein are used only for the purpose of describing a specific embodiment of the invention. The terms may be interchanged provided they are interchanged consistently wherever they occur.

For ease of reference, each element shown in the drawings bears a hyphenated reference character with the number before the hyphen designating the figure in which the element appears.

*General description*

The present invention is adapted for use in a satellite computer or data processing unit 31–1 as shown in FIG- URE 31. The satellite computer may be a medium size stored program computer having the usual circuits for performing the various arithmetic operations. The satellite computer may operate as an independent unit or it may operate in conjunction with a large scale digital computer 31–2.

When operating in conjunction with a large scale computer, the satellite computer may serve as a buffer unit by receiving data from the large scale computer at high speed and transferring it to drums, tapes, printers or other devices at a slower speed or by receiving data from the drums, tapes and so forth at slow speeds and transferring it to the large scale computer at high speed. The satellite computer may also control the transfer of data between other external units such as, for example, transfers from drums to tape, tape to printer, etc.

The length of the words employed by the large scale computer may be 2 N bits while the length of the words employed in the satellite computer may be N bits. In many instances some or all of the drums, tapes, printers and other devices connected to the satellite computer may utilize words containing N bits. The circuits hereinafter described are those circuits within the satellite computer which permit it to communicate with external devices utilizing words having a length of either N bits or 2 N bits.

The term "external device" as herein used includes all computers, drums, tapes, printers or other devices connected to the satellite computer, or data processing unit.

The external devices are connected to the data processing unit by cables. The cables are divided into two groups designated input cables and output cables. In the embodiment shown, it is assumed that the large scale computer utilizes 36-bit words while the data processing unit, drums, tapes, and printer utilize 18-bit words. Each input cable contains eighteen signal paths designated an input channel for the transfer of 18-bit data words from an external device to the data processing unit. Each output cable contains eighteen signal paths designated an output channel for the transfer of 18-bit data words from the data processing unit to an external device. Each cable also contains several control leads as subsequently described.

All data transfers are initiated at the request of the external devices. An external device may have data ready for the data processing unit in which case it generates an input request which is applied to the data processing unit. If an external device is ready to receive data it produces an output request. If an abnormal condition occurs in an external device it produces a code word indicating the nature of the abnormal condition and transmits an External Interrupt signal to the data processing unit. The code word is transferred to the computer over the input channel and is subsequently analyzed to determine what should be done as a result of the abnormal condition.

The input cables are numbered consecutively and are divided into two groups designated even and odd. In like manner, the output cables are divided into even and odd groups. Each external device having a basic word length of eighteen bits is connected to the data processing unit by a single input cable if it is desired to transfer data from the external device into the data processing unit and a single output cable if it is desired to transfer data from the data processing unit to the external device. These cables may be any one of the even numbered cables or odd numbered cables.

Each external device having a basic word length of thirty-six bits is connected to the data processing unit by two input cables if it is desired to transfer data from the external device into the data processing unit. One of these cables must be an odd numbered input cable and the other must be the next lower even numbered input cable. The reason for this is that in storing 36-bit words in the computer memory which normally stores only eighteen bits at each memory location, two memory locations are used and provision must be made to maintain the significance of the two-halves of the word. This is accomplished by always treating the eighteen bits transferred over the even numbered channel as the least significant digits and storing them at a memory location A and treating the eighteen bits transferred over the odd numbered channel as the most significant digits and storing them at memory location A+1.

Each external device having a word length of 36-bits is connected to the data processing unit by two output cables if it is desired to transfer data from the data processing unit to the external device. One of these cables must be an odd numbered output cable and the other must be the next lower even numbered output cable.

Associated with each input channel are two control words. The first control word is designated the terminal control word and the second control word is designated the current control word. The terminal control word for a particular channel defines the last memory address at which a word received over the input channel may be stored. The current control word for a particular channel defines a memory address at which the next word received over the input channel is to be stored.

A special instruction loads the control words into two adjacent memory locations at the time an input channel is rendered capable of making input requests. These memory locations are fixed for reasons which are subsequently explained.

FIGURE 32 symbolically shows memory locations A through A+5 as well as memory locations B and B+1, C and C+1, and D and D+1. Assume that it is desired to store six 18-bit words received over an input channel at addresses A through A+5. Assume further that addresses B and B+1 are the fixed addresses assigned to the terminal and current control words, respectively, for the particular channel over which the transfer is to take place. A special instruction is performed which loads the value A+5 into address B and the value A into address B+1.

When the first word is ready for transfer the external device produces an input request signal. If this particular channel is allotted priority the priority circuits generate the address B. This address is entered into a memory address register and the terminal address stored at B is read out of the memory. Next, address B is increased by one to obtain address B+1 and this value is entered into the memory address register to select the current control word. The current control word is read out of location B+1 and compared with the terminal control word. They are not equal so the operation continues. The current control word is now incremented by one to form the value A+1 and this value is returned to memory location B+1 for use as the next current control word.

The current control word (before incrementing) has a value A and this value is entered into the memory address register to select address A. The first 18-bit word is then read into this address. When another 18-bit word is ready for entry into the memory of the data processing unit the external device again makes an input request. The terminal and current control words are withdrawn from memory, compared, and the current control word updated and returned to memory location B+1. The incoming word is stored at address A+1 which is the current control word value before incrementing.

After six input requests six data words are stored and the value of the current control word equals the value of the terminal control word. At this point the input channel is rendered incapable of making further input requests. It may be rendered active again by performing another special instruction which loads a new current control word and a new terminal control word into addresses B+1 and B, respectively.

In some instances it may be desirable to store incoming data at consecutive addresses A through A+5 in descending order. In this case the initial current control word loaded into location B+1 is A+5 preceded by a minus sign while the value A preceded by a minus sign is entered into address B. The minus sign causes the current control word to be decremented by one on each input request. When the current control word reaches the value A the input channel is rendered inactive.

Assume now that an even and an odd input channel are connected to an external device utilizing 36-bit words and the data processing unit controls are set for the dual mode of operation. The current and terminal control words are loaded into locations B and B+1 as described above. However, each input request from the external device causes two 18-bit data transfers and also causes the current control word to be modified by two and returned to memory location B+1.

Assume that the data is being stored in ascending addresses. The first input request from the external device causes the eighteen least significant digits (LSD) to be stored at address A. These digits appear on the even numbered channel. The current control word is then incremented by one to obtain address A+1 and the eighteen most significant digits (MSD) are stored at this address. These digits appear on the odd numbered channel.

Each succeeding input request causes two 18-bit portions of a word to be stored in successive addresses. When the current control word equals the terminal control word the input channel is inactivated.

Successive halves of 36-bit words may be stored at consecutive addresses in descending order. The negative sign of the current control word causes the current control word to be decremented by one as each half word is stored. In this case the least significant digits of the first incoming word are stored at A+4, the most significant digits of the first incoming word are stored at A+5, the least significant digits of the second word are stored at A+2, the most significant digits of the second word are stored at A+3, and so forth in that order. The current control word is decremented by two in response to each input request and the channel is rendered inactive when the terminal and current control words are equal.

Each output channel has a terminal control word and a current control word associated with it. These control words are stored at fixed memory addresses D and D+1 and control data transfers over the output channels in the same manner that the control words described above control data transfers over input channels.

Associated with each input channel are two further memory addresses C and C+1. These are fixed addresses which are generated only when an abnormal condition occurs in the external device. Assuming the external device operates with 18-bit words, it places on the data lines an 18-bit code word identifying the condition. It then produces an External Interrupt signal. If no other channels or functions have a higher priority, the priority circuits generate the first fixed address C+1. The code word is stored at this address after which the data processing unit decreases the address by one to obtain the second fixed address C. The second address is the address of a special Jump Instruction which causes the data processing unit to enter a sub-routine to analyze the code word.

If the external device is one which utilizes 36-bit words it places an 18-bit code on the even numbered input channel and an 18-bit code on the odd numbered input channel. It then generates the External Interrupt signal which causes the computer to (1) store the code from the odd numbered channel at the first fixed address for that channel, (2) modify the first fixed address for the odd numbered channel to obtain the first fixed address for the even numbered channel, (3) store the code word on the even numbered input channel at the first fixed address for that channel, (4) modify the first fixed address for the even numbered channel to obtain the second fixed address for that channel, and (5) execute the special Jump Instruction stored at the second fixed address for the even numbered channel. The manner in which these modifications are made is subsequently explained in detail.

Figure 1:
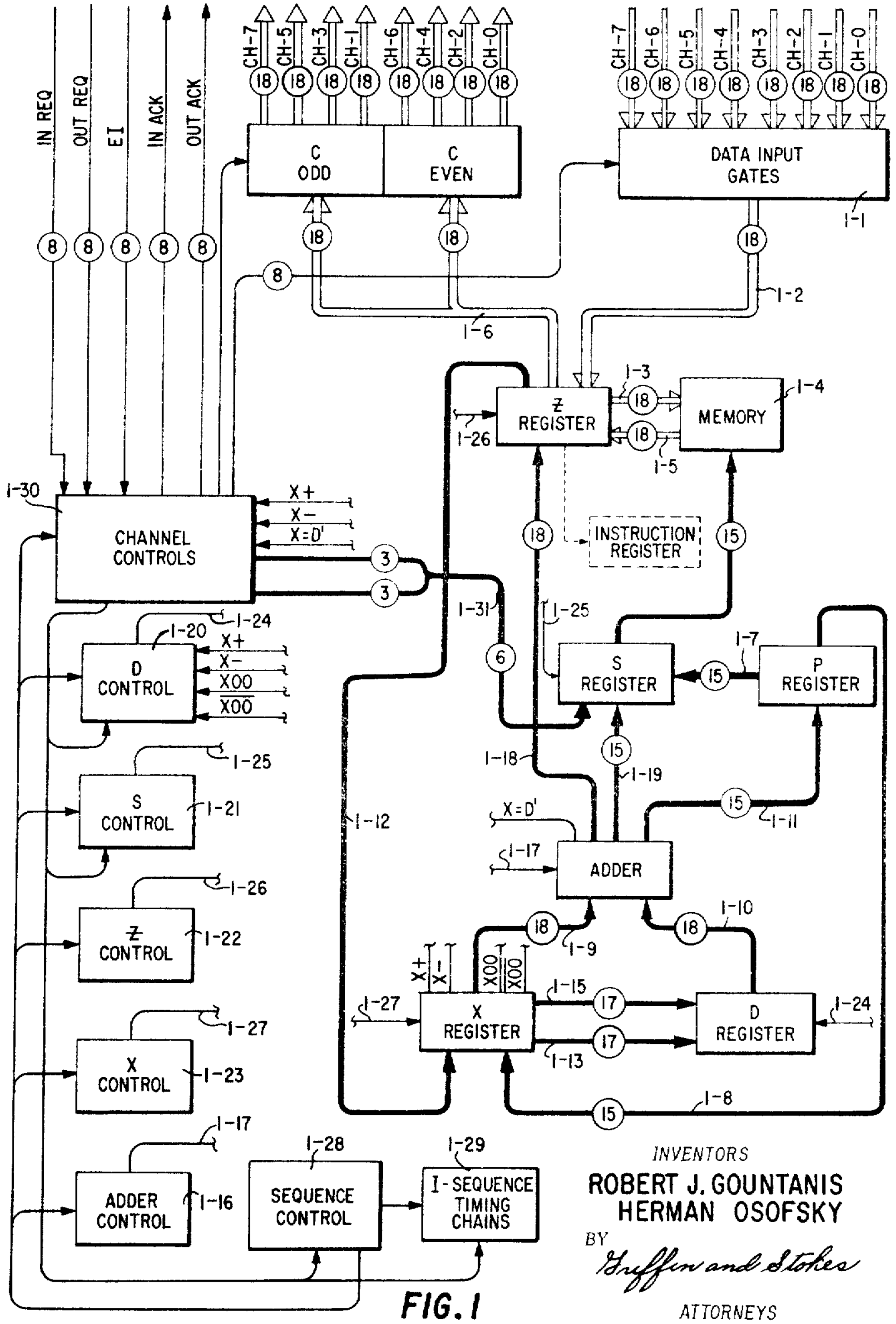
FIGURE 1 is a block diagram of the invention.
Figure 2:
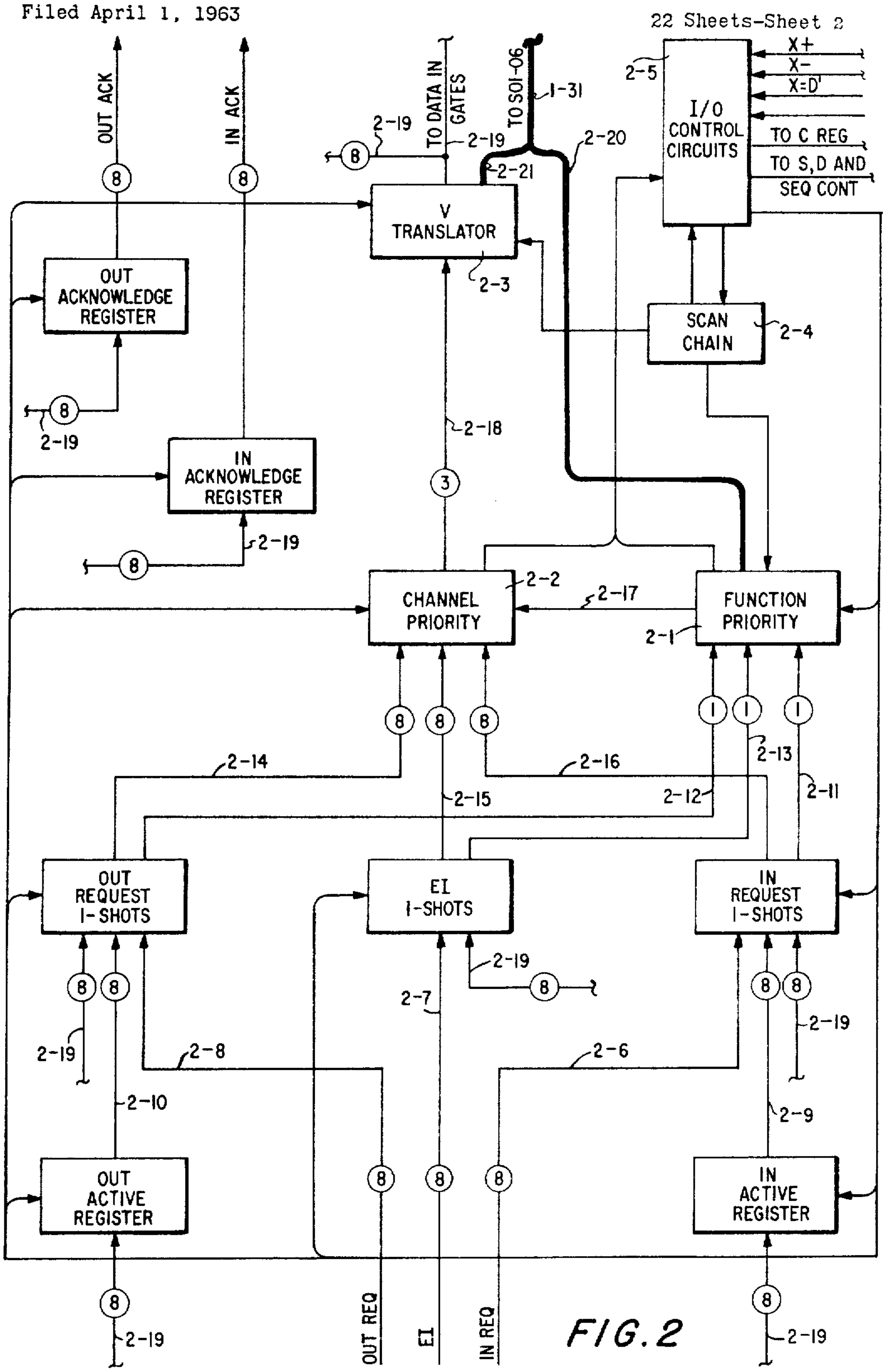
FIGURE 2 is a block diagram of the channel control circuits.

Referring now to FIGURES 1 and 2, the transfer paths represented by double lines indicate data transfer paths between the external devices and the memory of the data processing unit. The single black connecting lines represent cables containing control signal leads and the heavy black connecting lines represent transfer paths employed in computing addresses and addressing memory.

As shown in FIGURE 1, a preferred embodiment has eight input channels designated CH–0 through CH–7 and eight output channels also designated CH–0 through CH–7. All inputs are connected to a series of data input gates 1–1. The data input gates are connected by means of a cable 1–2 to the input of the Z register. The Z register serves as the memory buffer register and the content of the Z register is continuously applied by way of cable 1–3 to the memory 1–4.

A cable 1–5 connects the memory to the Z register so that information read out of the memory may be entered into the Z register. The output of the Z register is connected by means of a cable 1–6 to the odd and even C registers.

All odd numbered output channels are connected to the Odd C register so that the content of the Odd C register is continuously available on all of the odd numbered output channels. In like manner, all of the even numbered output channels are connected to the Even C register so that the content of the Even C register is continuously available on all of the even numbered output channels.

The data processing unit operates under the control of a program of instructions stored at sequential locations in the memory. Each time a new instruction is required, the content of the P register is transferred by way of cable 1–7 to the S register. The S register serves as the memory address register. The content of this register is applied to translator circuits which select a particular memory location. The instruction is then read out of the memory over cable 1–5 to the Z register and is subsequently entered into the instruction register where it is decoded to control the various circuits of the data processing unit to carry out the desired operation. The instruction register is shown in phantom outline since it is not used in the present invention. However, it should be understood that the data processing unit will normally include means for performing the usual arithmetic instructions and the instruction register is utilized for decoding these instrucetions.

Each time an instruction is withdrawn from memory the content of the P register is transferred to the X register by way of cable 1–8. The value +1 is entered into the D register. The contents of the X and D registers are continuously applied to the adder by way of cables 1–9 and 1–10 and the sum of these values continuously appears at the output of the adder. The output of the adder is connected to the P register by way of cable 1–11 so that the incremented instruction address may be stored in the P register. When it is again desired to withdraw an instruction from memory the value in the P register is again transferred to the S register to address the memory.

Each time an input request or an output request is performed, the terminal control word must be compared with the current control word. The terminal control word is read out of memory and entered into the Z register. From the Z register it is transferred by way of cable 1–12 to the X register. The complement of the value in the X register is then transferred by way of cable 1–13 to the D register.

The current control word is then read out of memory into the Z register and transferred to the X register. The values in the X and D registers are applied to the adder where they are added and if the sum is zero, indicating that the terminal control word is equal to the current control word, the adder produces the signal X=D′ which is applied to the channel controls to deactivate the channel associated with these control words.

After each current control word has been compared with the terminal control word the current control word must be modified to obtain the control word for the next operation over the same channel. The D register is cleared and the value +1 or −1 entered therein depending upon whether the current control word is to be incremented or decremented.

If the current control word is to be incremented the D controls apply a signal over the cable 1–24 to the D register to set the low order stage of this register. If the current control word is to be decremented then the value −1 is entered in the D register. This is accomplished by simultaneously gating the complement of the value in the X register to the D register over cable 1–13 and gating the true value in the X register to the D register over the cable 1–15 while at the same time preventing the setting of the low order stage of the D register.

When operating in the dual channel mode it is necessary to modify each current control word by ±2 rather than ±1. In this case adder control circuits 1–16 produce a signal on cable 1–17 which is connected to the adder. This signal causes +1 to be added to the sum of the values applied to the adder from the X and D registers if the current control word is being incremented and causes −1 to be added to the sum of the values applied to the adder from the X and D registers if the current control word is being decremented. The modified current control word is transferred over cable 1–18 to the Z register and is subsequently stored in memory at the same location from whence it came.

When the device is performing an input request or an output request operation, the current control word (before modification) is the address at which the incoming data is to be stored or the address from which the outgoing data is to be withdrawn. Therefore, after the modified current address has been computed and stored, the control signals in cable 1–17 are terminated and the D register is cleared. The current control word (before modification) remains in the X register. Therefore, the content of the X register is gated through the adder and transferred by way of cable 1–19 to the S register where it selects the memory address at which the incoming information is to be stored or from which the outgoing information is to be withdrawn.

Control circuits 1–20 through 1–23 control the D, S, Z and X registers, respectively, by means of control signals applied to the registers by way of cables 1–24 through 1–27, respectively. In general, these circuits respond to commands from the channel controls and sequence control to produce signals for clearing the registers or gating information into the registers. In addition, the S and D register controls include special circuits for selectively clearing the low order stages of the S and D registers.

The data processing unit is designed to operate in successive sequences which are defined by the condition of the sequence control unit 1–28. The data processing unit may operate in an I sequence during which it withdraws an instruction from memory, in an RC sequence during which it withdraws a control word from memory for an input or an output operation, in a WC sequence during which it modifies and returns to memory a current control word, or an R/W sequence during which data on an input channel is stored in memory or a word is read from memory and placed on an output channel. These are the only sequences employed in the present invention. However, it should be understood that when the present invention is incorporated into a complete system capable of performing instructions other than input/output instructions, the sequence control unit 1–28 may include circuits for causing the data processing unit to operate in other sequences.

The RC, WC and R/W sequences are employed in executing either an input request or an output request. The R/W and I sequences are employed in response to an external interrupt request.

When the sequence control circuits are set for an I sequence, control signals are applied to I sequence timing chains 1–29 to initiate the operation of these timing chains. These timing chains produce certain commands required primarily for controlling the P, X and D registers for incrementing instruction addresses and controlling the instruction register for clearing this register and entering an instruction therein from the Z register.

When an input or an output request is being performed channel controls 1–30 generate six bits of the address of the terminal control word. Also, when an External Interrupt is being performed the channel controls generate six bits of the address at which the incoming code word is to be stored. These addressing signals are transferred from the channel controls to the S register over cable 1–31.

The channel controls are shown in greater detail in FIGURE 2 and comprise an In Active register, an Out Active register, an In Request One-Shot register, an Out Request One-Shot register, an EI One-Shot register, an In Acknowledge register, and an Out Acknowledge register. In addition, the channel controls include function priority determining circuits 2–1, channel priority determining circuits 2–2, a register and translator 2–3, a scan chain 2–4 and various I/O control circuits 2–5.

Associated with each input channel is a lead over which the external device signals the data processing unit when it has information on the input channel ready for entry into the data processing unit memory. These leads are connected to individual stages of the In Request One-Shot register.

Each input cable also includes a control lead over which the external device may signal the data processing unit when it has detected an abnormal condition and placed a code word on its input channel. These leads are connected to individual stages of the EI One-Shot register.

Each output cable includes a lead over which the external device may signal the data processing unit when the external device is ready to accept data from the data processing unit. These leads are connected to individual stages of the Out Request One-Shot register. Each stage of the In Active register is connected by way of a lead in cable 2–9 to the corresponding stage of the In Request One-Shot register while each stage of the Out Active register is connected by way of a lead in a cable 2–10 to a corresponding stage of the Out Request One-Shot register.

If any channel makes an input request and the stage of the In Active register corresponding to that channel is on, a signal is produced on lead 2–11 to indicate that at least one input channel desires to communicate with the memory. This lead is applied to the function priority circuits 2–1. In like manner, if any channel makes an output request and the stage of the Out Active register corresponding to that channel is on, a signal is produced on lead 2–12 to indicate to the function priority circuits that at least one output channel desires to communicate with the memory. If any channel requests an External Interrupt the corresponding stage of the EI One-Shot register is set a signal is produced on lead 2–13 to indicate to the function priority circuits that at least one channel has a code word available for storage in the memory.

The function priority circuits determine which function shall have priority when more than one type of function is being requested. Output requests have the highest priority, input requests have the next lower priority and external interrupts have the lowest priority.

The channel priority circuits include an 8-stage register. Each stage of this register is connected to the output of the corresponding stage of the Out Request One-Shot register by way of cable 2–14, the corresponding stage of the EI One-Shot register by way of cable 2–15, and the corresponding stage of the In Request One-Shot register by way of cable 2–16. Thus, the channel priority register may simultaneously receive signals from some channels requesting output operations, some channels requesting input operations, and some channels requesting external interrupts. However, when the highest priority function has been determined by the function priority circuits, signals are produced in cable 2–17 which effectively prevent all signals except those of the highest priority function from controlling the setting of the channel priority register. For example, if the function priority circuits allot priority to an output request then only the signals in cable 2–14 are permitted to control the setting of the register and in the channel priority circuits.

The channel priority circuits also include a translator which is connected in such a manner that it produces a 3-digit binary code at its output, this code corresponding to the highest numbered channel making a request of the type allotted priority by the function priority circuits. For example, if channels 1, 3 and 5 are all making an output request and the function priority circuits allot priority to the output request function the channel priority circuits generate the binary representation of the value 5. This binary code is transferred by way of cable 2–18 to the V register and translator 2–3.

The V register translator controls all channels. The binary value in the V register is translated into a signal on one of eight output lines within cable 2–19. These lines are individually connected to the eight sets of data input gates, the eight stages of the Out Acknowledge register, the eight stages of the In Acknowledge register, the eight stages of the Out Request One-Shot register, the eight stages of the EI One-Shot register, the eight stages of the In Request One-Shot register, the eight stages of the Out Active register and the eight stages of the In Active register. Thus, in order to set a particular stage of any one of these registers the corresponding lead in cable 2–19 must be active.

At the time the function priority circuits determine the function having the highest priority, these circuits produce three digits of an address. Also, the setting of the V register is translated to produce an additional three digits of an address. These six digits are applied over cable 1–31 to stages S01 through S06 of the S register. These digits comprise six digits of the address of the terminal control word if an input request or an output request is being performed and comprise six digits of the address at which the code word is to be stored in memory if an external interrupt is being performed.

When an input request is performed it is necessary to signal the external device making the request when the input information has been stored in memory. Each input cable includes a control lead for this purpose. These control leads are connected to the In Acknowledge register and when an input operation has been completed on a given channel the corresponding stage of the In Acknowledge register is turned on to produce the In Acknowledge signal which is transmitted to the external device.

When an external device makes an output request it is necessary for the computer to signal the external device when the data is entered into the C register and is ready for transfer to the external device. Each output cable includes a control signal lead for this purpose. These leads are connected to the outputs of the various stages of the Out Acknowledge register. After the data processing unit has withdrawn the requested information from memory and placed it in the C register for transfer over a particular output channel, the I/O control circuits turn on the stage of the Out Acknowledge register corresponding to that output channel thus producing the Out Acknowledge signal.

The I/O control circuits shown in FIGURE 2 control all of the registers associated with the input and output channels and in addition provide control signals for the sequence controls, D Register controls and S register controls shown in FIGURE 1. The specific function of the I/O control circuits may be best understood after a detailed description of the various circuits has been given.

*Sequence control*

The specific embodiment of the invention described herein is adapted to operate under the control of a clock pulse generator which has four phases per cycle. During the first phase the clock pulse generator produces phase 1 ($\phi 1$) pulses, during the second phase it produces phase 2 ($\phi 2$) pulses, during the third phase it produces phase 3 ($\phi 3$) pulses, and during phase 4 ($\phi 4$) it produces phase 4 pulses. After each phase 4 the clock pulse generator begins a new cycle and produces a phase 1 clock pulse. One complete cycle of the clock pulse generator is designated a minor cycle. The specific details of the clock pulse generator are not shown herein since any one of several types now known in the art are admirably suited for use in practicing the present invention.

The present invention also utilizes a timing chain for generating gating signals having a duration of four clock pulse periods. This timing chain may be similar to the scan chain subsequently described but differs in that the last stage is connected to the first stage to provide for continuous recycling as long as the data processing unit is operating.

The timing chain operates in response to clock pulses and steps through one complete cycle every six minor cycles. Therefore, it takes twenty-four pulse periods to complete one cycle of the timing chain. One cycle of the timing chain is designated a sequence.

In the following description the gating signals from the timing chain are identified by the letters TC followed by a two-digit number having a decimal between the two digits. The letters TC refer to the timing chain, the digit to the left of the decimal identifies the minor cycle in which the signal begins, and the digit to the right of the decimal identifies the clock pulse phase in which the signal begins. For example, TC3.2 refers to a gating signal which comes from the timing chain and begins at the beginning of phase 2 of minor cycle 3 of a sequence. Since all signals from the timing chain have a duration of four clock pulse periods, the gating signal TC3.2 does not terminate until the end of phase 1 of minor cycle 4. As a second example, consider the gating signal TC5.4. This signal begins at the beginning of phase 4 of minor cycle 5 of a sequence and terminates at the end of phase 3 of minor cycle 6.

In the following description, two digits separated by a decimal point but not preceded by the letters TC designate a single clock pulse period. For example, when reference is made to time 5.4 it means the clock pulse period occurring during phase 4 of minor cycle 5 of a sequence.

As stated above, the complete cycle of operation of the timing chain is designated a sequence. There are several types of sequences designated RC, WC, R/W and I. The particular type of sequence being performed is determined by the status of the sequence control circuits.

Figure 3:
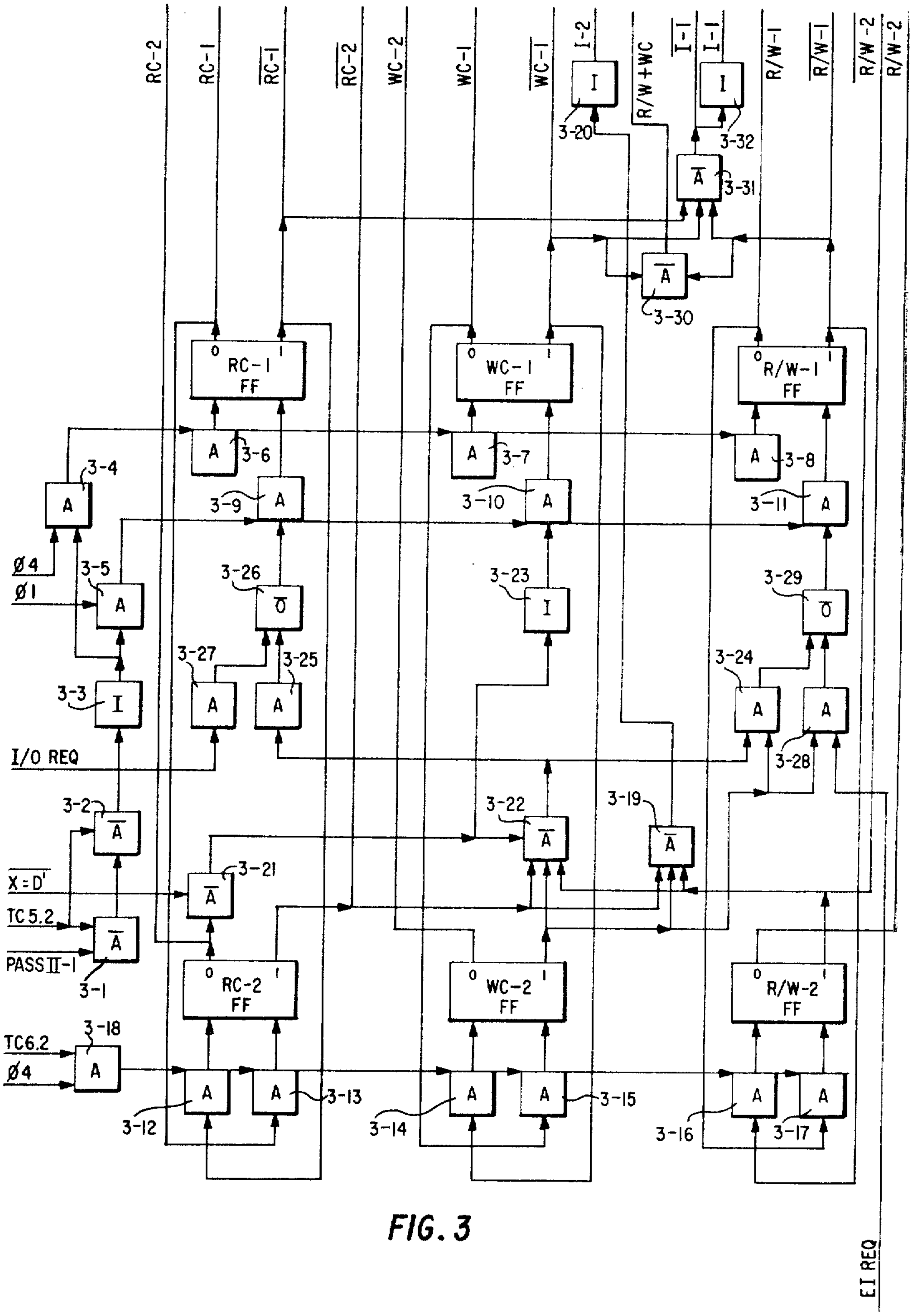
FIGURE 3 is a logic diagram of the sequence control circuits.

The sequence control circuits necessary for performing an input request, an output request or an external interrupt are shown in FIGURE 3. These circuits include a pair of flip-flops RC–1 and RC–2 for controlling read control sequences, a pair of flip-flops WC–1 and WC–2 for controlling write control sequences, and a pair of flip-flops R/W–1 and R/W–2 for controlling read-write sequences. An I sequence may occur when none of the flip-flops in FIGURE 3 is set.

In response to an Input request or an Output request the sequence control circuits normally cycle through two read control sequences, a write control sequence and either one or two read-write sequences. One read-write sequence is performed if the device is operating in the single channel mode and two read-write sequences are performed if the device is operating in the dual channel mode.

In response to an External Interrupt the sequence control circuits cycle through either one or two read-write sequences depending upon whether the device is operating in the single or dual channel mode. After the last read-write sequence is executed the sequence controls enter an I sequence during which a special Jump Instruction is withdrawn from memory. The special Jump Instruction causes the data processing unit to enter a subroutine to analyze the information received from the external device during the read-write sequence or sequences.

Referring now to FIGURE 3, the gating signal TC5.2 and the signal Pass II-1 are applied to a gate 3–1. The output of this gate is connected to a gate 3–2 which also receives the gating signal TC5.2. The output of gate 3–2 is connected through an inverter 3–3 to one input of gates 3–4 and 3–5. Gate 3–4 is further conditioned by phase 4 clock pulses and produces output signals which are applied in parallel to each of the gates 3–6, 3–7 and 3–8. Gates 3–6, 3–7 and 3–8 have their outputs connected to the reset input terminals of the flip-flops RC—1, WC–1 and R/W–1, respectively.

Gate 3–5 also receives phase 1 clock pulses and produces output signals which are applied in parallel to each of the gates 3–9, 3–10 and 3–11. The gates 3–9, 3–10 and 3–11 have their outputs connected to the set input terminals of the flip-flops RC–1, WC–1 and R/W–1, respectively.

The set output terminal of flip-flop RC–1 is connected to one input of a gate 3–12 which has its output connected to the reset input terminal of the flip-flop RC–2. The reset output terminal of flip-flop RC–1 is connected to one input of a gate 3–13 which has its output connected to the set input terminal of flip-flop RC–2. The set output terminal of flip-flop WC–1 is connected to one input of a gate 3–14 which has its output connected to the reset input terminal of the flip-flop WC–2. The reset output terminal of the flip-flop WC–1 is connected to one input of a gate 3–15 which has its output connected to the set input terminal of flip-flop WC–2. The set output terminal of flip-flop R/W–1 is connected to one input of a gate 3–16 which has its output connected to the reset input terminal of the flip-flop R/W–2. The reset output terminal of flip-flop R/W–1 is connected to one input of a gate 3–17 which has its output connected to the set input terminal of the flip-flop R/W–2.

A gate 3–18 receives the gating signal TC6.2 and phase 4 clock pulses, and at time 6.4 of each sequence produces a positive output signal to condition one input of each of the gates 3–12 through 3–17. This causes each of the flip-flops in the lower rank to be set to the same condition as the corresponding flip-flop in the upper rank.

The flip-flops in the lower rank define the type of sequence being performed. If the RC–2 flip-flop is set then an RC sequence is being performed, if the WC–2 flip-flop is set then a WC sequence is being performed, and if the R/W–2 flip-flop is set then an R/W sequence is being performed. Only one of the flip-flops in the lower rank may be set during any sequence. Because these flip-flops are selectively set or reset at time 6.4 of a sequence, a sequence is considered to begin at time 6.4 and to end at the end of time 6.3.

Flip-flops RC–2, WC–2 and R/W–2 have their set output terminals connected to a gate 3–19. If the data processing unit is not executing an instruction and is not performing an input/output operation all inputs to 3–19 are positive and the gate produces a negative output signal that is inverted at 3–20 to become the signal I–2. The signal I–2 indicates that the data processing unit is in an I sequence. As stated before, an I sequence is executed for the purpose of withdrawing the next instruction word from the memory and placing it in the instruction decoder.

The reset output terminal of flip-flop RC–2 is connected to one input of a gate 3–21. This gate also receives the signal $\overline{X=D'}$. The output of gate 3–21 is connected to one input of a gate 3–22 and through an inverter 3–23 to one input of the gate 3–10. Gate 3–22 is connected to the set output terminals of the flip-flops RC–2, WC–2 and R/W–2.

The output of 3–22 is connected to one input of a gate 3–24 and through a gate 3–25 to one input of Or-inverter 3–26. The signal I/O Request is negative if the priority circuits allot priority to a a channel making either an input request or an output request. The signal I/O Request is applied through a gate 3–27 to the second input or Or-inverter 3–26. The output of Or-inverter 3–26 is connected to one input of gate 3–9 to condition this gate when the output signals from gates 3–25 and 3–27 are both negative.

The set output terminal of the flip-flop WC–2 is connected to one input of each of the gates 3–24 and 3–28. Gate 3–28 also receives the negative signal EI Request when the function priority circuits allot priority to a channel requesting an external interrupt. The outputs of gates 3–24 and 3–28 are connected to an Or-inverter 3–29 which has an output connected to one input of the gate 3–11. Or-inverter 3–29 produces a positive output signal to condition one input of the gate 3–11 when the outputs from gates 3–24 and 3–28 are negative at the same time.

The output signal from gate 3–22 determines when the sequence control circuits of FIGURE 3 may respond to an I/O request and perform the necessary sequences for transferring data between an external device and the data processing unit. If all inputs to the gate are positive it produces a negative output signal. The negative output signal is applied to gates 3–24 and 3–25 thus causing gates 3–25 and 3–24 to apply negative signals to 3–26 and 3–29, respectively.

If an input request or an output request is alloted priority then the signal I/O request is negative thus causing the second input to 3–26 to be negative. The Or-inverter produces a positive output signal to condition one input of gate 3–9.

The signal Pass II–1 is negative during R and W sequences so gate 3–1 produces a positive output which is applied to gate 3–2. From time 5.2 through 6.4 of an R or a W sequence gate 3–2 produces a negative output signal which is inverted at 3–3 and applied to gates 3–4 and 3–5. At time 5.4 gate 3–4 produces a positive output signal to reset flip-flops RC–1, WC–1, and R/W–1. At time 6.1 gate 3–5 produces a positive output signal to condition the second input of gate 3–9 and the gate produces a positive output signal to set the RC–1 flip-flop.

The positive signal off the reset side of flip-flop RC–1 conditions one input of gate 3–13. At time 6.4 gate 3–18 produces a positive output signal to condition the second input of gate 3–13 and the gate produces an output signal to set flip-flop RC–2 thus beginning the first RC sequence.

As subsequently explained, the signal Pass II–1 becomes positive during the first RC sequence and upon occurrence of the gating signal TC 5.2 causes gate 3–1 to produce a negative output signal. This signal is inverted at 3–2, inverted again at 3–2 and blocks gates 3–4 and 3–5. The blocking of gate 3–4 prevents flip-flop RC–1 from being reset and the blocking of gate 3–5 prevents either of the flip-flops WC–1 and R/W–1 from being set. Therefore, at time 6.4 when the output of gate 3–18 again samples the output of RC–1 the gate 3–13 produces an output signal to set flip-flop RC–2. Actually, the output from gate 3–13 has no effect at this time since flip-flop RC–2 is already set. Since flip-flop RC–2 is not reset at time 6.4 the sequence control circuits remain set for a second RC sequence.

Assuming the terminal address withdrawn from memory during the RC–I sequence and the current address withdrawn from memory during the RC–II sequence are not equal, the signal $\overline{X=D'}$ is positive. During the RC–II sequence the positive signal off the reset side of flip-flop RC–2 conditons the second input of gate 3–21 and this gate produces a negative output signal that is inverted at 3–23 and applied to one input of gate 3–10. During the early portion of the second RC sequence (RC–II) the signal Pass II–1 becomes negative thus applying a positive signal to one input of each of the gates 3–4 and 3–5. At time 5.4 of the second RC sequence gate 3–4 produces a positive output signal to reset the flip-flops RC–1, WC–1 and R/W–1. At time 6.1 of the second RC sequence gate 3–5 produces a positive output signal which conditions the second input of gate 3–10 and this gate produces an output signal to set the flip-flop WC–1.

The positive signal off the reset side of flip-flop WC–1 conditions one input of gate 3–15 while the positive signal off the set side of flip-flop RC–1 conditions one input of the gate 3–12. At time 6.4 gate 3–18 produces a positive output signal to condition the second input of gates 3–12 and 3–15. Therefore, at time 6.4 flip-flop RC–2 is reset to terminate the second RC sequence and flip-flop WC–2 is set to begin the WC sequence.

The negative signal off the set output terminal of the WC–2 flip-flop blocks gates 3–24 and 3–28 during the entire WC sequence. With both gates blocked Or-inverter 3–29 produces a positive output signal to condition one input of gate 3–11. At time 5.4 of the WC sequence gate 3–4 produces a positive output signal to reset flip-flops RC–1, WC–1 and R/W–1. At time 6.1 of the WC sequence gate 3–5 produces a positive output signal to condition the second input of gate 3–11 and this gate produces an output signal to set flip-flop R/W–1.

The positive signal off the reset side of flip-flop R/W–1 conditions one input of gate 3–17 while the positive signal off the set side of flip-flop WC–1 conditions one input of gate 3–14. At time 6.4 the positive output signal from gate 3–18 passes through gate 3–14 to reset flip-flop WC–2 and through gate 3–17 to set flip-flop R/W–2 thus terminating the WC sequence and beginning an R/W sequence.

Assuming the I/O request came from a channel set for the single channel mode of operation, only one R/W sequence is performed. At time 5.4 of the R/W sequence gate 3–4 produces a positive output signal to reset flip-flop R/W–1. The resulting positive signal off the set side of this flip-flop conditions one input of gate 3–16 at a time 6.4 the output of gate 3–18 passes through 3–16 to reset flip-flop R/W–2. This terminates the R/W sequence. When the flip-flop R/W–2 is reset all inputs to gate 3–19 are positive and the gate produces a negative output signal that is inverted at 3–20 to become the positive signal I–2. Thus, after the R/W sequence the data processing unit enters an I sequence to withdraw the next instruction from memory.

If the I/O request signal applied to gate 3–27 is a result of an input or output request over an odd numbered channel set for the dual channel mode, the operation of the sequence control circuits is, with one exception, the same as for the single channel mode described above. The exception is that a second R/W sequence (R/W–II) follows the first R/W sequence. During the first R/W sequence the signal Pass II–7 becomes positive so that the output of gate 3–1 is negative from 5.2 through 6.3 of the first R/W sequence. This prevents flip-flop R/W–1 from being reset at time 5.4 of the first R/W sequence. The positive signal off the reset side of flip-flop R/W–1 conditions the gate 3–17 and at time 6.4 the output of gate 3–18 passes through gate 3–17 to the set input terminal of flip-flop R/W–2. This signal has no effect since the flip-flop R/W–2 is already set. With the flip-flop set the device enters the second R/W sequence and during this sequence the signal Pass II–1 becomes negative. At time 5.4 of the second R/W sequence the positive output signal from gate 3–4 resets flip-flop R/W–1. The positive signal off the set side of this flip-flop conditions one input of gate 3–16 and at time 6.4 the output of gate 3–18 passes through gate 3–16 to reset flip-flop R/W–2. This terminates the second R/W sequence and initiates an I sequence.

An external interrupt operation may be initiated if the computer is not performing an input/output operation and the function priority circuits allot priority to a channel which is requesting an External Interrupt. Since the flip-flops RC–2, WC–2 and R/W–2 are all reset, the gate 3–22 produces a negative signal to block gate 3–24. If a channel requesting an external interrupt is allotted priority, the signal EI Request becomes negative and blocks gate 3–28. With both inputs negative Or-inverter 3–29 produces a positive output signal to condition one input of gate 3–11. At time 5.4 of the sequence gate 3–4 produces a positive output signal to clear the flip-flops RC–1, WC–1 and R/W–1. At time 6.1 of the sequence the positive output signal from gate 3–5 conditions a second input from gate 3–11 and this gate produces a positive output signal to set flip-flop R/W–1. The resulting positive signal off the reset side of this flip-flop conditions one input of gate 3–17 and at time 6.4 the output from gate 3–18 passes through 3–17 to set the R/W–2 flip-flop. If the signal EI Request results from an external interrupt request over a channel set for a single channel mode, only one R/W sequence is performed. At time 5.4 of the R/W sequence gate 3–4 produces a positive output signal to reset flip-flop R/W–1. The resulting positive output signal from the set side of the flip-flop conditions one input of gate 3–16 and at time 6.4 the output of gate 3–18 passes through gate 3–16 to reset flip-flop R/W–2. This terminates the R/W sequence and initiates an I sequence.

If the EI Request applied to gate 3–28 is the result of an external interrupt over an odd numbered channel which is set for the dual channel mode of operation, two R/W sequences must be performed. During the first R/W sequence the signal Pass II–1 becomes negative to block gates 3–4 and 3–5 thus preventing the reset of flip-flops R/W–1 and R/W–2 on the first R/W sequence. During the second R/W sequence the signal Pass II–1 becomes negative and at time 5.4 of this sequence the output signal from gate 3–4 resets flip-flop R/W–1. At time 6.4 the output signal from gate 3–18 passes through gate 3–16 to reset flip-flop R/W–2 to terminate the second R/W sequence and initiate an I sequence.

The set output terminal of each of the flip-flops RC–1, WC–1 and R/W–1 is connected to a gate 3–31 which produces a positive output signal if any one of the flip-flops is set. The output of 3–31 is applied to inverter 3–32 which produces a positive output signal when all of the flip-flops are reset.

The set output terminals of flip-flops WC–1 and R/W–1 are connected to a gate 3–30 which produces the positive signal R/W+WC if either of the flip-flops is set.

*Scan chain*

Figure 4:
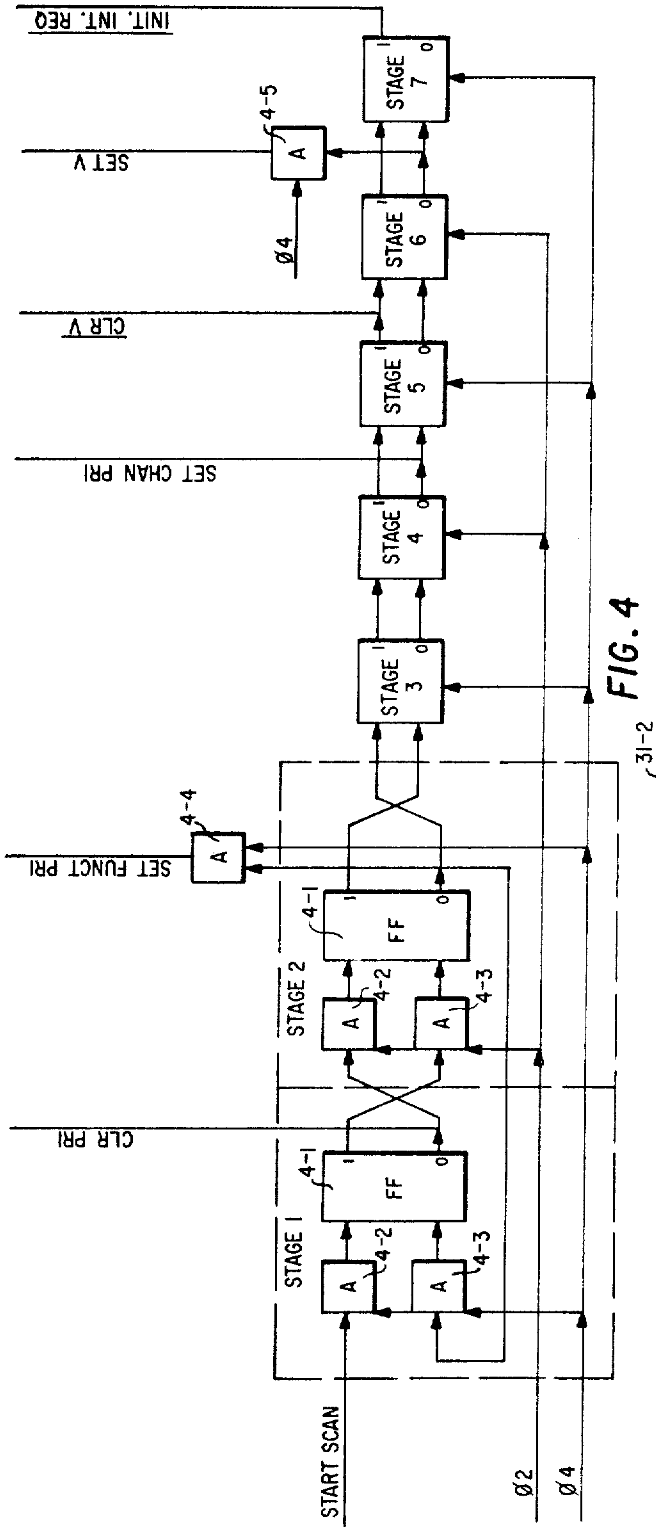
FIGURE 4 shows the scan timing chain.

The scan chain is shown in FIGURE 4. It comprises seven stages each having a flip-flop 4–1, and a pair of input gates 4–2 and 4–3. The output of each gate 4–2 is applied to the set input terminal of the flip-flop in the same stage while the output of the gate 4–3 is applied to the reset input terminal of the flip-flop in the same stage. The set output terminal of the flip-flop in one stage is applied to one input of the gate 4–3 in the next stage while the reset output terminal of the flip-flop in one stage is applied to the gate 4–2 in the next succeeding stage. Phase 4 clock pulses are simultaneously applied to the gates 4–2 and 4–3 in each of the odd numbered stages while phase 2 clock pulses are simultaneously applied to the gates 4–2 and 4–3 in each of the even numbered stages. Stages 3 through 7 of the scan chain are not shown in detail since these stages are similar to stages 1 and 2 as described above.

Operation of the scan timing chain is initiated by the command Start Scan which is generated by the I/O controls of FIGURE 5. As subsequently explained the Start Scan signal may be generated during any sequence which is not an RC sequence, WC sequence, or an I sequence during which an interrupt request is being performed. The Start Scan command occurs between 2.2 and 3.2 of the sequence and conditions one input of the gate 4–2 in stage 1. This gate is further conditioned by phase 4 clock pulses and at time 2.4 it produces a positive output signal to set the flip-flop 4–1 in stage 1. When the flip-flop in stage 1 is set, the positive signal off the reset output terminal is the command Clear Priority. This signal is applied to the I/O control circuits of FIGURE 5 for the purpose of generating the commands which clear the channel priority and function priority registers. The positive signal off the reset side of the flip-flop in stage 1 also conditions the gate 4–2 of stage 2 so that at time 3.2 this gate produces a positive output signal to set the flip-flop in stage 2.

When the flip-flop in stage 2 is set, the positive signal off the reset output terminal is applied to gate 4–4 which also receives phase 4 clock pulses. Therefore, at time 3.4 gate 4–4 produces the positive command Set Function Priority. This command is applied to the input gates of the function priority register shown in FIGURE 8.

The positive signal off the reset output terminal of the flip-flop in stage 2 is also applied to one input of the gate 4–3 in stage 1. Therefore, at time 3.4 this gate produces a positive output signal to reset the flip-flop in stage 1 and terminate the command Clear Priority. When the flip-flop in stage 1 is reset the positive signal off the set side conditions the gate 4–3 in stage 2. This gate also receives phase 2 clock pulses so at time 4.2 the gate produces a positive output signal to reset the flip-flop in stage 2.

In summary, stage 1 of the scan chain is turned on at time 2.4 and remains on until the beginning of time 3.4. Stage 2 is turned on at time 3.2 and remains on until the beginning of time 4.2. Thus, each stage comes on two phases after the preceding phase and remains on for four phases after which it is turned off. The output signals from the set and reset terminals of the flip-flop in stage 2 are applied to the gates 4–2 and 4–3 in stage 3 so that this stage will be turned on at time 3.4 and will remain on until the beginning of time 4.4. Stage 4 is turned on at time 4.2 and remains on until the end of time 5.1 and during this interval produces the command Set Channel Priority. Stage 5 is turned on at time 4.4 and remains on until the beginning of time 5.4. During this interval the negative signal off the set side of the flip-flop in this stage is the command $\overline{\text{Clear V}}$. Stage 6 is turned on at time 5.2 and remains on until the end of time 6.1 During this interval the positive signal off the reset side of the flip-flop conditions one input of gate 4–5. This gate is further conditioned by phase 4 clock pulses and thus produces the positive command Set V at time 5.4 of each scan cycle. Stage 7 is turned on at time 5.4 and remains on until the end of time 6.3. During this interval stage 7 produces the negative command $\overline{\text{Initiate Interrupt Request}}$.

*I/O control circuits*

FIGURES 5*a* through 5*d* show various control circuits of the present invention. These circuits produce commands for controlling the In and Out Acknowledge registers, the One-Shot registers, the In and Out Active registers, and the C registers. These circuits also control the clearing of the Function Priority and Channel Priority circuits and the V register and include means for selecting either the single or the dual channel mode of operation and means responsive to the mode selection means for varying the normal operation of the Sequence Control circuits.

*Mode selection.*—The selecting means for selecting the single or dual mode of operation is shown in FIGURE *5d* and includes an inverter 5–1, a plurality of gates 5–2 through 5–6, a flip-flop 5–7 and a plurality of switches S–1, S–3, S–5 and S–7.

The negative signal Initiate Interrupt Request is produced by the Scan Chain from 5.4 through 6.3 of each Scan sequence. This signal is inverted at 5–1 and conditions one input of gate 5–2. The gate is further conditioned by phase 2 clock pulses and at time 6.2 of every scan sequence produces a positive output signal to reset the flip-flop 5–7. When the flip-flop is reset the device operates in the single channel mode. Conversely, when the flip-flop is set the device operates in the dual channel mode.

Each of the switches is shown connected to a source of negative voltage which blocks each of the gates 5–3 through 5–6 so that a positive signal can never be applied to the set input terminal of the Dual Flip-Flop. As long as all switches are maintained in this position all channels operate in the single channel mode.

Assume the switch S–7 is turned on to thus condition one input of gate 5–6. If an input request, output request or external interrupt is received over Channel 7 and allotted priority by the function and channel priority circuits the V translator produces the positive signal CH–7. This conditions the second input of gate 5–6 and the gate produces a positive output signal to set the Dual Flip-Flop. This causes the device to operate in the dual channel mode so that a 36-bit transfer takes place with eighteen bits being transferred over channel 7 and eighteen bits being transferred over channel 6.

With the present invention it is possible for some channels to operate in the single channel mode while other channels operate in the dual channel mode. Thus, in the preceding example, if any of the channels 0 through 6 were allotted priority the device would operate in the single channel mode since only switch S–7 is set. If all four switches are set then the device operates in the dual channel mode if the channel allotted priority is either channel 1, 3, 5 or 7. Switch S–1 causes channel 1 to operate in conjunction with channel 0. Switch S–3 causes channel 3 to operate in conjunction with channel 2. Switch S–5 causes channel 5 to operate in conjunction with channel 4.

It should be noted that even though all four switches may be set for dual channel operation, the device operates in the single channel mode if an even numbered channel is allotted priority. If an even numbered channel is allotted priority then at least one input of each of the gates 5–3 through 5–6 is negative and none of the gates can produce a positive output signal to set the Dual Flip-Flop.

*Pass control.*—The circuits for inhibiting the normal stepping of the sequence control circuits are for the most part shown in the left portion of FIGURE *5a*. These circuits include gates 5–8 through 5–11. Or-inverter 5–12, gates 5–13 and 5–14, flip-flop 5–15, gates 5–16 and 5–17, flip-flop 5–18, gates 5–19 and 5–20, and inverters 5–21 and 5–22.

These circuits come into play during every RC sequence and also during the R/W sequence if the device is operating in the dual mode. As was explained with reference to the sequence control circuits of FIGURE 3, the RC–1, WC–1 and R/W–1 flip-flops are normally set at 6.1 of a cycle and reset at the following 5.4 time. The circuits in the left portion of FIGURE *5a* produce the signal Pass II–1 which is applied to the sequence control circuits to delay the reset of a sequence flip-flop for one complete sequence. That is, if the device is performing a first RC sequence these circuits produce the positive signal Pass II–1 which prevents the resetting of the RC–1 flip-flop at time 5.4 of the RC sequence. As a result, both the RC–1 and RC–2 flip-flops stay up for an additional sequence.

When operating in the single mode only a single R/W sequence is required. However, when operating in the dual mode the first R/W sequence must be followed by a second R/W sequence. Therefore, during the first R/W sequence of a dual mode operation the flip-flop 5–15 produces the positive output signal Pass II–1 to prevent the resetting of the R/W–1 flip-flop at time 5.4 of the first R/W sequence.

If the device is performing an RC sequence the signal $\overline{\text{RC–2}}$ is negative and blocks gate 5–11. If this is the first RC sequence the flip-flop 5–18 is in the reset state and the positive signal from its set output terminal conditions one input of gate 5–8. This gate is further conditioned by the gating signal TC4.4 and produces a negative output signal to block gate 5–9. With gates 5–9 and 5–11 both blocked Or-inverter 5–12 produces a positive output signal to condition one input of gate 5–13. At time 5.2 a phase 2 clock pulse conditions the second input of gate 5–13 and it produces a positive output signal to set flip-flop 5–15. This applies a positive signal to one input of gate 5–17 and a negative signal to one input of gate 5–16. The gates 5–16 and 5–17 also receive the gating signal TC6.2 and phase 4 clock pulses. Therefore, at time 6.4 of an RC–I sequence, gate 5–17 produces a positive output signal to set flip-flop 5–18. At this point the signal Pass II–2 becomes positive and the signal Pass I–2 off the set side of the flip-flop becomes negative.

The negative output signal from the side of flip-flop 5–18 is applied to one input of gate 5–8 where it is inverted and applied to gate 5–9. The resulting positive output from gate 5–9 causes Or-inverter 5–12 to produce a negative output signal to block gate 5–13 as long as flip-flop 5–18 is set.

When flip-flop 5–18 is set the positive signal off the reset output terminal conditions one input of gate 5–14. At time 1.2 a phase 2 clock pulse conditions a second input of gate 5–14 and it produces a positive output signal to reset the flip-flop 5–15. This terminates the signal Pass II–1 applied to the sequence control circuits and also applies a negative signal to gate 5–17 and a positive signal to gate 5–16. At time 6.4 of the sequence following the second RC sequence the other inputs of gate 5–16 are conditioned and it produces a positive output signal to reset flip-flop 5–18. This completes the cycle of operation of these circuits insofar as the RC sequence is concerned.

The circuits in the left portion of FIGURE *5a* go through a similar cycle in order to cause a second R/W sequence if the Dual Flip-Flop is set. The signals R/W–2 and Pass II–2 are applied to the gate 5–19. The output of this gate is connected to one input of gate 5–20 which also receives a positive signal from the Dual Flip-Flop when this flip-flop is set. The output of gate 5–20 is connected through inverters 5–21 and 5–22 to one input of the gate 5–10. Gate 5–10 is further conditioned by the signal R/W–2.

During an R/W–I sequence flip-flop 5–18 is in the reset state and applies a negative signal to gate 5–19. The resulting positive output from this gate conditions one input of gate 5–20. The other input of gate 5–20 is conditioned if the dual mode flip-flop is set. The output from 5–20 is inverted at 5–21, inverted again at 5–22, and applied as a positive signal to one input of gate 5–10. During an R/W–I sequence the signal R/W–2 is positive and conditions the second input of gate 5–10. The gate produces a negative output signal which blocks gate 5–11 thus applying a negative signal to one input of Or-inverter 5–12.

The positive signal off the set side of flip-flop 5–18 conditions one input of gate 5–8 during the R/W–I sequence. This gate is further conditioned by the gating signal TC4.4 and produces a negative output signal to block gate 5–9. This causes a negative signal to be applied to the second input of Or-inverter 5–12. With both inputs negative Or-inverter 5–12 produces a positive output signal to condition one input of gate 5–13. At time 5.2 of the R/W–I sequence a phase 2 clock pulse conditions the second input of gate 5–13 and it produces a positive output signal to set flip-flop 5–15.

The positive signal from the reset side of flip-flop 5–15 conditions one input of gate 5–17. At time 6.4 which is the first time period of the R/W–II sequence all inputs of gate 5–17 are conditioned and it produces a positive output signal to set flip-flop 5–18. The negative signal off the set side of flip-flop 5–18 is inverted in gate 5–8, passes through gate 5–9, is inverted again at 5–12, and blocks gate 5–13.

The positive signal off the reset side of flip-flop 5–18 conditions one input of gate 5–14 and at time 1.2 of the R/W–II sequence the gate produces a positive output signal to reset flip-flop 5–15. The positive signal off the set side of this flip-flop conditions one input of gate 5–16 which has its other inputs conditioned at time 6.4 of the sequence following the R/W–II sequence. The gate produces a positive output signal to reset flip-flop 5–18. This completes the cycle of operation for these circuits during the R/W sequences.

*V Register Controls.*—All stages of the V register are cleared at 5.3 of each Scan sequence. The signal Clear V is generated by the scan chain and applied to gate 5–23 in FIGURE 5*a* from 4.4 through 5.3 of every Scan sequence. The resulting positive output signal from 5–23 is applied to one input of each of the gates 5–24 and 5–25. The signal R/W–2 is negative during scan sequences and is applied to one input of a gate 5–26. The output of gate 5–26 is connected to one input of each of the gates 5–23 and 5–24. At time 5.3 a phase 3 clock pulse is applied to each of the gates 5–24 and 5–25 and they produce the signals Clear V01–02 and Clear V00, respectively.

The low order stage of the V register is cleared at time 3.3 of each R/W–I sequence of an external interrupt operation if the external interrupt is received over a channel which is set for the dual mode of operation. The positive signal off the reset side of the Dual Flip-Flop is applied to one input of gate 5–26. The positive signal R/W–2 is applied to a second input of this gate. The signal EI, the output signal from gate 5–19 and the gating signal TC2.4 are applied to the inputs of a gate 5–27. The output of gate 5–27 is connected to one input of gate 5–29 and the output of gate 5–29 is connected to the third input of the gate 5–26. A negative output from gate 5–27 causes a positive input signal to be applied to the third input of gate 5–26. Gate 5–26 produces a negative output signal that is inverted at 5–23 and applied to one input of gate 5–25. At time 3.3 a phase 3 clock pulse conditions the second input of gate 5–25 and it produces the signal Clear V00.

The low order stage of the V register is cleared at time 1.3 of the first R/W sequence resulting from an input or output request over a channel set for the dual mode if the sign of the value in the X register is positive. A gate 5–30 has one input connected to the set output terminal of flip-flop 5–18 and another input which receives the signal R/W–1. The output of gate 5–30 is connected to one input of a gate 5–31 which has a second input for receiving the signal X+. The output of 5–31 is connected to one input of an Or-inverter 5–32. The output of gate 5–19 is connected to one input of a gate 5–33 which also receives the signal X−. The output of gate 5–33 is connected to a second input of Or-inverter 5–32. The output of Or-Inverter 5–32 is connected to one input of a gate 5–34 which has its output connected to inverter 5–28. Gate 5–34 also receives the signals $\overline{EI}$ and TC6.4.

If the input or output request is made over a channel set for the dual mode of operation the dual mode flip-flop 5–7 is set and the positive signal off the reset side conditions one input of gate 5–26. During the R/W sequences the signal R/W–2 is positive to condition a second input of gate 5–26.

During sequence R/W–I the signal from the set side of flip-flop 5–18 is positive and conditions one input of gate 5–30. The signal R/W–1 is positive so gate 5–30 produces a negative output signal to block gate 5–31. If X is + then the signal X− is negative and blocks gate 5–33. With both gates 5–31 and 5–33 blocked Or-inverter 5–32 applies a positive signal to gate 5–34. Since either an input request or an output request is being performed the signal $\overline{EI}$ is positive to condition the second input of gate 5–34. The gating signal TC6.4 conditions a third input gate 5–34 and the gate produces a positive output signal that is inverted at 5–28, inverted again at 5–29 and applied to the input of gate 5–26. With all inputs positive gate 5–26 produces a negative output signal that is inverted at 5–23 and applied to one input of gate 5–25. The other input of gate 5–25 is conditioned by a phase 3 clock pulse and at time 1.3 the gate produces the command Clear V00.

The low order stage of the V register is also cleared during the R/W–II sequences resulting from an input or output request over a channel set for the dual mode of operation if the sign of the value in the X register is minus.

The positive signal off the reset side of the Dual Flip-Flop conditions one input of gate 5–26. The signal R/W–2 is positive and conditions the second input of gate 5–26.

During the R/W–II sequence the positive signal off the reset side of flip-flop 5–18 conditions one input of gate 5–19. The positive signal R/W–2 conditions the second input of gate 5–19 and the gate produces a negative output signal to block gate 5–33. If the sign of the value in the X register is minus then the signal X+ is negative and blocks the gate 5–31. Or-inverter 5–32 produces a positive output signal which passes through 5–34, 5–28, 5–29, 5–26 and 5–23 to condition one input of gate 5–25. At time 1.3 of the R/W–II sequence a phase 3 clock pulse conditions the second input of gate 5–25 and it produces the signal Clear V00.

The low order stage of the V register is set at time 2.4 of each R/W sequence if the channel granted priority is set for the dual mode. The positive signal off the reset side of the Dual Mode Flip-Flop is applied to one input of a gate 5–35. In FIGURE 5*c* a gate 5–36 receives the gating signal TC2.2 and the signal R/W1 and thus produces a negative output signal from 2.2 through 3.1 of each R/W sequence. This signal is inverted at 5–37 and applied to a second input of gate 5–35. With both inputs positive gate 5–35 produces a negative output signal that is inverted at 5–38 to become the positive command Set V00.

Figure 5A:
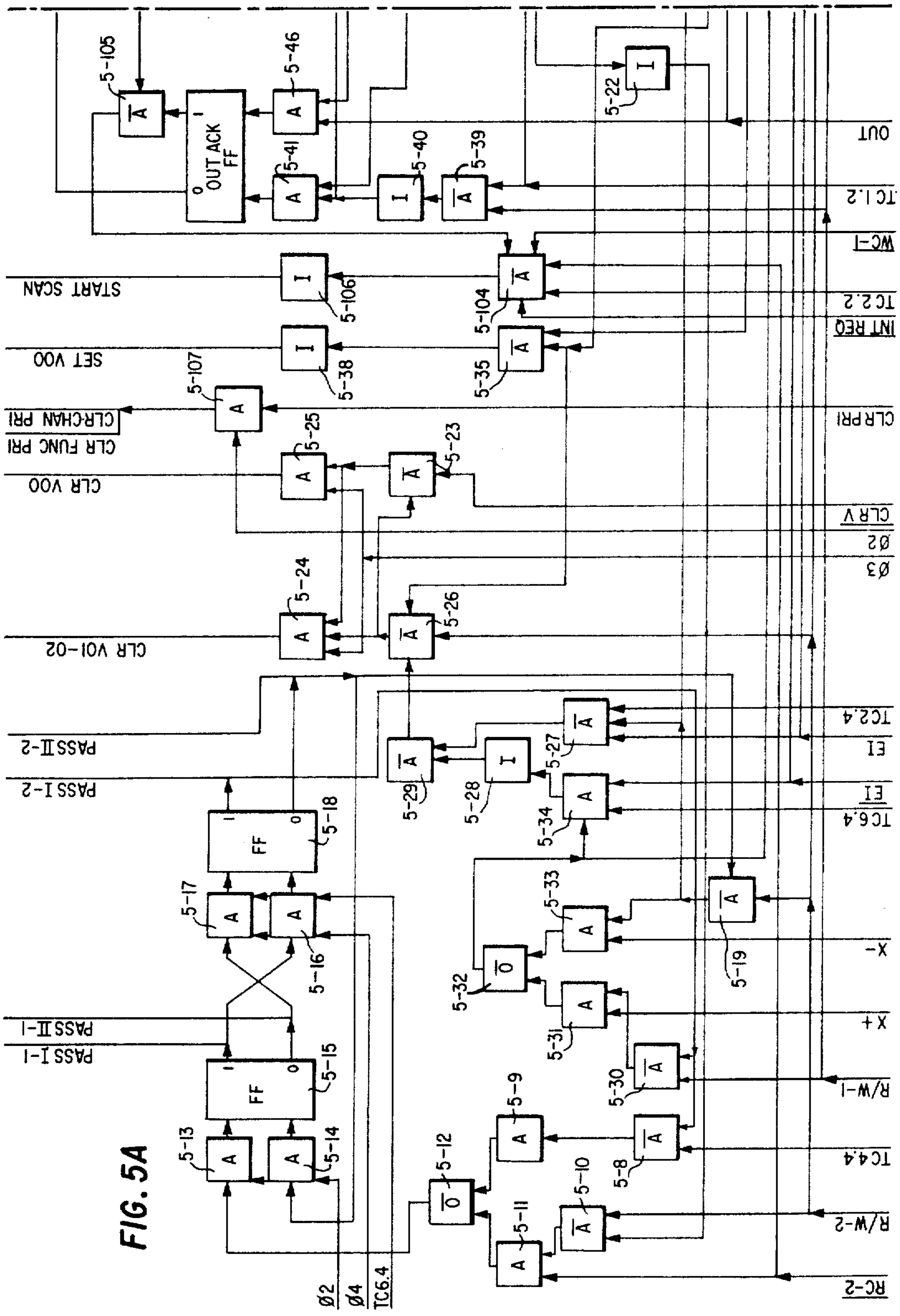
Figure 5B:
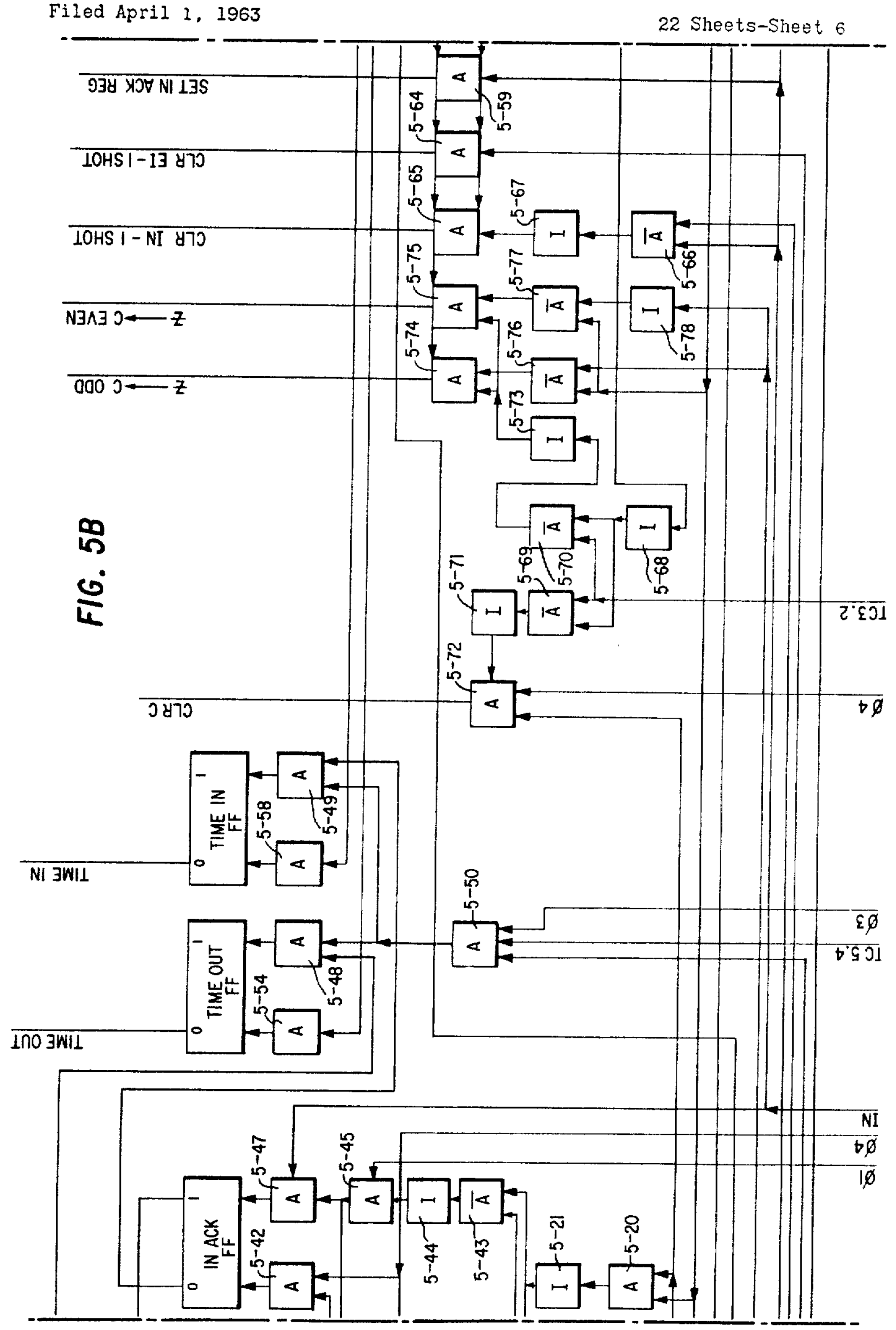
Figure 5C:
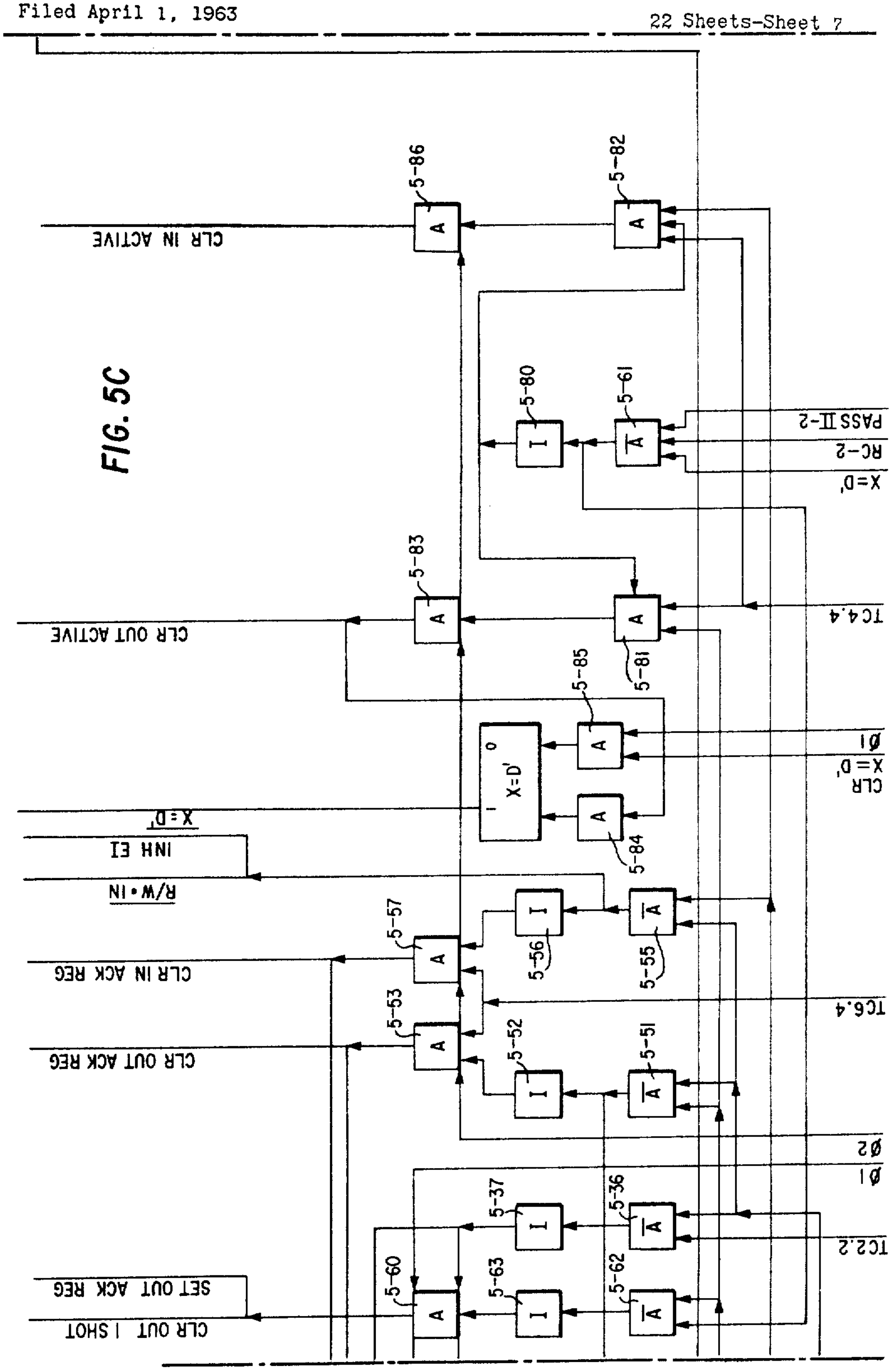

*Acknowledge Controls.*—The Out Acknowledge and In Acknowledge Flip-Flops and their associated circuits are shown in FIGURES 5*a* and 5*b*. These flip-flops should not be confused with the flip-flops comprising the stages of the In Acknowledge Register and Out Acknowledge register. The two flip-flops in FIGURES 5*a* and 5*b* control the setting of the Time In and Time Out flip-flops of FIGURE 5*b* and these flip-flops in turn gate the Acknowledge signals to the external devices.

The gate 5–39 receives the signal R/W–1 and the gating signal TC1.2 and has its output connected through an inverter 5–40 to one input of gates 5–41 and 5–42. Gates 5–41 and 5–42 have their outputs connected to the reset input terminals of the Out Acknowledge and In Acknowledge Flip-Flops, respectively. Both gates are further conditioned by phase 4 clock pulses so at time 1.4 of every R/W sequence both gates produce positive output pulses to reset the flip-flops.

The output of inverter 5–21 is connected to one input of a gate 5–43. This gate is further conditioned by the gating signal TC1.2 and when both inputs are positive the gate produces a negative output signal that passes through an inverter 5–44 to condition one input of a gate 5–45. This gate is further conditioned by phase 1 clock pulses and has its output connected to one input of each of a pair of gates 5–46 and 5–47.

Gate 5–46 is further conditioned by the signal Out and when both of its inputs are positive it produces a positive output signal to set the Out Acknowledge Flip-Flop. Gate 5–47 is further conditioned by the signal In and when both its inputs are positive the gate produces a positive output signal to set the In Acknowledge Flip-Flop.

Although the In acknowledge and Out Acknowledge Flip-Flops are both reset on every R/W sequence, only the Out Acknowledge Flip-Flop is set if an output request is being performed and only the In Acknowledge Flip-Flop is set if an input request or an external interrupt is being performed. Furthermore, the time at which a particular one of the flip-flops is set varies depending upon whether the device is operating in the single or dual mode. If the device is operating in the single channel mode one of the flip-flops is set at time 2.1 of the R/W–I sequence. If the device is operating in the dual channel mode one of the flip-flops is set at time 2.1 of the R/W–II sequence. This is evident from the fact that gate 5–20 receives an input from the Dual Mode Flip-Flop 5–7 and another input from gate 5–19 which is controlled by the Pass II flip-flop 5–18.

The Time In and Time Out flip-flops are shown in FIGURE *5b*. The reset output terminal of the Out Acknowledge Flip-Flop is connected to one input of a gate 5–48 while the reset output terminal of the In Acknowledge Flip-Flop is connected to one input of a gate 5–49. The gates 5–48 and 5–49 have their outputs connected to the set input terminals of the Time Out and Time In flip-flops, respectively.

The gate 5–50 receives the signals R/W–2 and TC5.4 as well as phase 3 clock pulses and produces positive output signals which are applied to the gates 5–48 and 5–49. Therefore, the Time Out Flip-Flop is set at time 6.3 of an R/W sequence if the Out Acknowledge Flip-Flop is set. In like manner, the Time In Flip-Flop is set at time 6.3 of an R/W sequence if the In Acknowledge Flip-Flop is set.

The signals Time In and Time Out are applied to the drivers in FIGURES 11 and 12 where they operate in conjunction with the In Acknowledge and Out Acknowledge registers to produce an In Acknowledge or an Out Acknowledge signal for the particular channel which was granted priority. This signal tells the external device making the request that the data has been stored (Input Acknowledge) or the requested data is available in the output register (Output Acknowledge).

The Time Out Flip-Flop is cleared at time 1.2 of each R/W sequence resulting from an output request. The gate 5–51 in FIGURE *5c* receives the signals R/W–1 and Out. The output of gate 5–51 is connected through an inverter 5–52 to one input of a gate 5–53. Gate 5–53 also receives the gating signal TC6.4 and phase 2 clock pulses and at time 1.2 of each R/W sequence resulting from an output request it produces a positive output signal that passes through a gate 5–54 to reset the Time Out Flip-Flop.

The positive output signal from gate 5–53 also becomes the command Clear Out Acknowledge Register. This command is applied to the flip-flops in each stage of the Out Acknowledge register shown in FIGURE 12 to reset the flip-flops.

The Time In Flip-Flop is cleared at time 1.2 of each R/W sequence resulting from an input request or an external interrupt. A gate 5–55 receives the signals R/W–1 and In and has its output connected through an inverter 5–56 to one input of a gate 5–57. Gate 5–57 is further conditioned by the gating signal TC6.4 and phase 2 clock pulses and at time 1.2 produces a positive output signal that passes through a gate 5–58 to reset the Time In Flip-Flop.

The positive output signal from gate 5–57 is the command Clear In Acknowledge Register. This command is applied to the In Acknowledge Register shown in FIGURE 11 where it resets the flip-flop in each stage of the register.

The signal Set In Acknowledge Register is produced by the gate 5–59 shown in FIGURE *5b*. This gate receives the signal In and also receives phase 1 clock pulses and the output signal from inverter 5–37 shown in FIGURE *5c*. Gate 5–59 produces the signal Set In Acknowledge Register at time 3.1 of each R/W sequence if the signal IN is positive. As shown subsequently, the signal In is positive if either an input request or an external interrupt is being performed.

The signal Set Out Acknowledge register is produced by the gate 5–60 shown in FIGURE *5c*. A gate 5–61 normally applies a positive input signal to one input of a gate 5–62. Gate 5–62 also receives the signal Out and if both inputs are positive the gate produces a negative output signal that is inverted at 5–63 and applied to one input of gate 5–60. Gate 5–60 is further conditioned by phase 1 clock pulses and the output of inverter 5–37 and produces the command Set Out Acknowledge register at time 3.1 of each R/W sequence if an output request is being performed.

*One-Shot Controls.*—The command Clear EI One-Shot is produced by gate 5–64. This gate receives the signal EI, the output signal from inverter 5–37, and phase 1 clock pulses and produces the command Clear EI One-Shot at time 3.1 of each R/W sequence if an external interrupt is being performed. This command is applied to each stage of the EI One-Shot register where it acts in conjunction with the output of the V register to reset only that stage corresponding to the channel which caused the interrupt.

The Signal Clear In One-Shot is produced by the gate 5–65. The gate 5–66 receives the signals In and $\overline{EI}$ and responds by producing a negative output signal. This signal is applied through an inverter 5–67 to one input of gate 5–65. Gate 5–65 is further conditioned by the output signal from inverter 5–37 and phase 1 clock pulses and at time 3.1 of each R/W sequence resulting from an input request it produces the command Clear In One-Shot. This command is applied to each stage of the In Request One-Shot register where it acts in conjunction with the output of the V register to reset only that stage corresponding to the channel which requested the input operation.

The command Clear Out One-Shot is produced by the gate 5–60. This signal occurs at the same time as the command Set Out Acknowledge register. That is, the command Clear Out One-Shot occurs at time 3.1 of each R/W sequence if an output request is being performed. This command is applied to each stage of the Out Request One-Shot register where it acts in conjunction with the output of the V register to reset only that stage corresponding to the channel which requested the output operation.

*C Register Control.*—The commands for controlling the C register are generated in FIGURE *5b*. The output of gate 5–51 (FIG. *5c*) is applied through an inverter 5–68 to one input of gates 5–69 and 5–70. Gates 5–69 and 5–70 are further conditioned by the gating signal TC3.2. The output of gate 5–69 is inverted at 5–71 and applied to one input of gate 5–72. Gate 5–72 also receives the output signal from gate 5–19 and phase 4 clock pulses. Since the output of 5–19 is positive only during R/W-I sequences and the output of gate 5–51 is negative only during R/W sequences resulting from an output request, the command Clear C is produced at time 3.4 of each R/W–I sequence if an output request operation is being performed.

The output of gate 5–70 is inverted at 5–73 and applied to one input of gates 5–74 and 5–75. These gates also receive phase 1 clock pulses. Gate 5–74 is further conditioned by the output of a gate 5–76 which is connected to Or-inverter 5–32 and the reset output terminal of the Dual Mode Flip-Flop. Gate 5–75 is further conditioned by the output of a gate 5–77 which is connected through an inverter 5–78 to the output of Or-inverter 5–32. Gate 5–77 is also connected to the reset output terminal of the Dual Mode Flip-Flop.

The commands Z To C Odd and Z To C Even are generated under various conditions depending upon whether the device is operating in the single or dual channel mode and whether the sign of the value in the X register is positive or negative.

If the device is operating in the single channel mode then the commands Z to C Odd and Z to C Even are both generated at time 4.1 of the R/W sequence if an output request is being performed. The circuit is through 5–51, 5–68, 5–70 and 5–73 to condition one input of gates 5–74 and 5–75. The negative signal off the reset side of the Dual Flip-Flop is inverted at 5–76 to condition the gate 5–74 and is inverted at 5–77 to condition gate 5–75.

When performing an output request in the dual channel mode there must be a data transfer from Z to C Even and Z to C Odd. If the sign of X is plus then the transfer from Z to C Even occurs during the R/W–I sequence and the transfer from Z to C Odd occurs during the R/W–II sequence. The output signal of gate 5–51 is negative during both R/W–I and R/W–II. This signal passes through 5–68, 5–70, and 5–73 to condition one input of gates 5–74 and 5–75. In FIGURE 5*a*, during the R/W–I sequence the positive signal off the set side of flip-flop 5–18 conditions one input of gate 5–30. The gate is further conditioned by the signal R/W–1 and produces a negative output signal to block gate 5–31. Since X is plus, the signal X— is negative and blocks gate 5–33. With both 5–31 and 5–33 blocked, Or-inverter 5–32 produces a positive output signal that is inverted at 5–78 and inverted again at 5–77 to condition gate 5–75 to produce the command Z to C Even.

During the R/W–II sequence the negative signal from the set side of flip-flop 5–18 is inverted at 5–30 and conditions one input of gate 5–31. Since the signal X+ is positive gate 5–31 produces a positive output signal that is inverted at 5–32 and inverted again at 5–76 to condition gate 5–74 to produce the command Z to C Odd.

If the sign of the value in the X register is negative and an output request is being performed in the dual mode, the command Z to C Odd occurs during the R/W–I sequence and the command Z to C Even occurs during the R/W–II sequence. Gates 5–74 and 5–75 are conditioned as before by the negative output signal from gate 5–51. During the R/W–1 sequence the negative signal from the reset side of flip-flop 5–18 is inverted at 5–19 and conditions one input of gate 5–33. Since the sign of the value in the X register is minus the signal X— is positive and conditions a second input of gate 5–33. The resulting positive output from this gate is inverted at 5–32 and inverted again at 5–76 to condition gate 5–74 to produce the command Z to C Odd.

During the R/W–II sequence the positive signal off the reset side of flip-flop 5–18 conditions one input of gate 5–19. This gate is further conditioned by the signal R/W–2 and produces a negative output signal to block gate 5–33. The signal X+ is negative and blocks gate 5–31. With gates 5–31 and 5–33 both blocked Or-inverter 5–32 produces a positive output signal that is inverted at 5–78, inverted again at 5–77 to condition gate 5–75 to produce the command Z to C Even.

*Channel Termination.*—In performing an input request or an output request, the present invention always performs an RC–I sequence to withdraw the terminal control word from memory and an RC–II sequence to withdraw the present control word from memory. During the RC–II sequence the two control words are compared and if they are equal it is an indication that no further request from that channel should be honored. The circuits which become active when the terminal control word and current control word are compared and found equal are shown in the right portion of FIGURE 5*c*.

Gate 5–61 receives the signal X=D′ from the adder when the two values are equal. This gate is further conditioned by the signals RC–2 and Pass II–2. When all inputs are positive the gate produces a negative output signal which is applied to the gate 5–62 to prevent the clearing of the Out One-Shot and the setting of the Out Acknowledge Register. By preventing the generation of the command Set Out Acknowledge Register, the data processing unit cannot falsely indicate to the output device that the requested output data is available in the C register. This, of course, assumes that X is found equal to D′ when performing an output request.

The output signal from gate 5–61 is inverted at 5–80 and applied to one input of gates 5–81 and 5–82. Gate 5–81 receives the signals Out and TC4.4 and when all inputs are positive it produces a positive output signal to condition one input of a gate 5–83. Gate 5–83 is further conditioned by phase 2 clock pulses and produces the command Clear Out Active at time 5.2 of an RC–II sequence if an output operation is being performed and X=D′. The command Clear Out Active is applied to the reset gates of the Out Active register shown in FIGURE 7 where it operates in conjunction with the output of the V register to clear the flip-flop corresponding to the channel which requested the output operation. As subsequently described, when an Out Active Flip-Flop is reset it prevents output request signals from the external devices from being honored by the data processing unit.

The output of gate 5–83 passes through gate 5–84 to set the X=D′ flip-flop. When the flip-flop is set the negative command $\overline{X=D'}$ is generated. This signal is applied to the sequence control circuits of FIGURE 3 where it terminates the output operation. The flip-flop is reset at time 4.1 of the next I sequence. The signal Clear X=D′ and a phase 1 clock pulse are applied to gate 5–85 which produces a positive output signal to reset the flip-flop. The signal Clear X=D′ is generated in FIGURE 30.

The X=D′ flip-flop is not set if an input request is being performed and the current control word equals the terminal control word. However, the Active Flip-Flop for the channel making the request is reset to prevent further input requests from that channel. Gate 5–82 receives the output of inverter 5–80, the gating signal TC4.4, and the signal In. If all inputs are positive the gate produces a positive output signal to condition one input of gate 5–86. This gate is further conditioned by phase 2 clock pulses and at time 5.2 of an RC–II sequence resulting from an input request, the gate produces the command Clear In Active provided X=D′. This command is applied to the In Active register where it acts in conjunction with the output of the V register to reset the stage corresponding to the channel which made the request.

Figure 5D:
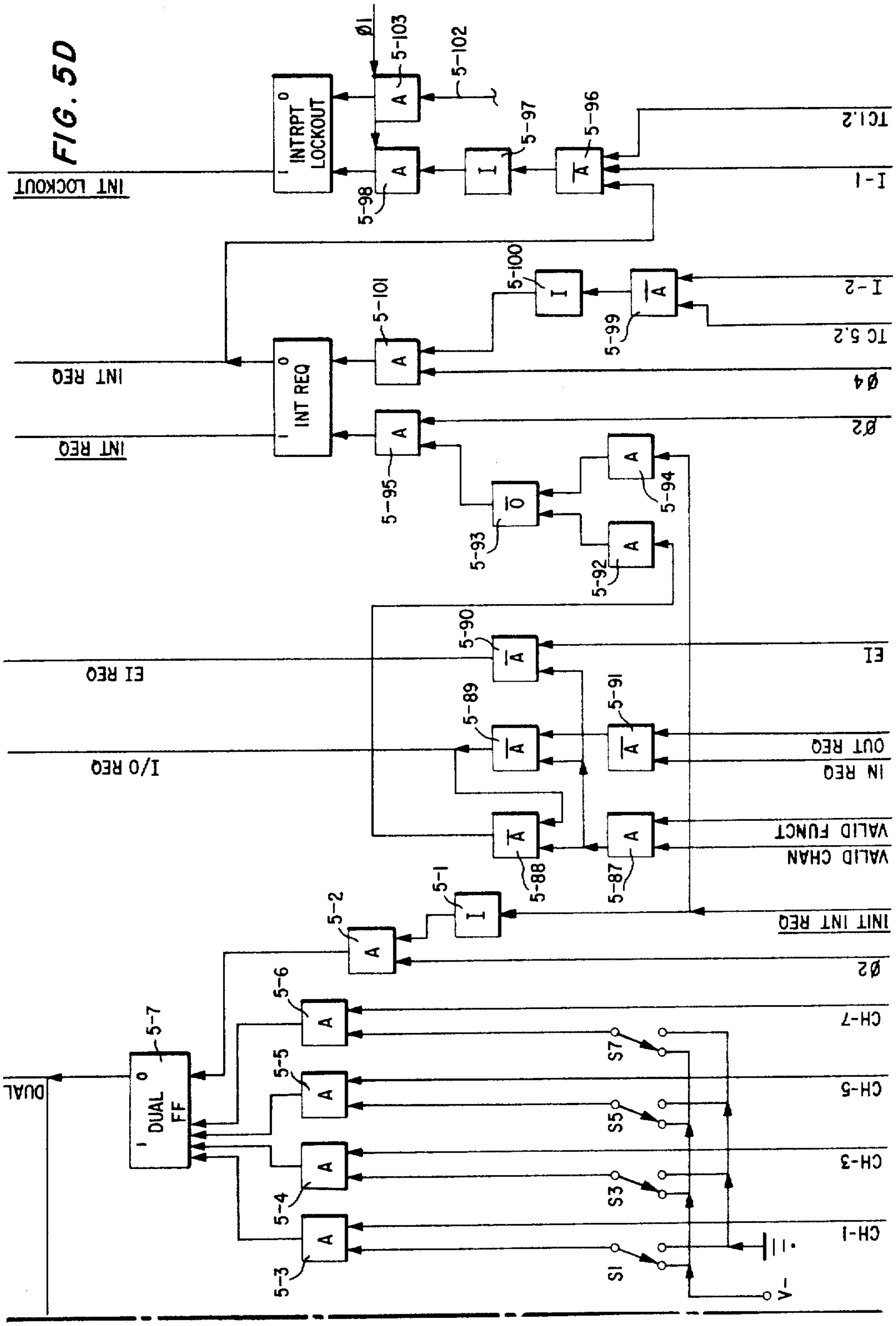

*Request Control.*—The interrupt request and interrupt lock-out circuits are shown in FIGURE 5*d*. A gate 5–87 receives the signals Valid Channel and Valid Function. These signals are generated by the channel priority and function priority circuits. If both inputs are positive gate 5–87 produces a positive output signal to condition one input of gates 5–88, 5–89 and 5–90. If an external interrupt is the highest priority function being requested, the function priority circuits produce the signal EI to condition the second input of gate 5–90. With both inputs positive, gate 5–90 produces the signal EI Request. This signal is applied to the sequence control circuits of FIGURE 3 where it initiates an R/W sequence.

If either an input request or an output request is the highest priority function being requested, the function priority circuits produce a negative signal on one of the leads to gate 5–91, thus applying a positive signal to one input of gate 5–89. If the output of gate 5–87 is positive to condition the second input of gate 5–89, the gate produces the negative signal I/O request. This signal is applied to the sequence control circuits of FIGURE 3 where it initiates an RC sequence.

The output of gate 5–89 is connected to one input of gate 5–88. If there is neither an input request nor an output request but there is a valid channel signal and a valid function signal, it is an indication that there should be an external interrupt. Under these conditions both inputs to gate 5–88 are positive and it produces a negative output signal which passes through a gate 5–92 to one input of an Or-inverter R–93.

The scan chain of FIGURE 4 produces the negative signal $\overline{\text{Initiate Interrupt Request}}$ from 5.4 through 6.3 of each scan sequence. This signal passes through a gate 5–94 to a second input of Or-inverter 5–93. With both inputs negative, 5–93 produces a positive output signal that is applied to a gate 5–95. This gate is further conditioned by phase 2 clock pulses and has its output connected to the set input terminal of the Interrupt Request Flip-Flop so that the flip-flop is set at time 6.2 of a scan sequence.

When the Interrupt Request Flip-Flop is set the positive signal off the reset output terminal conditions one input of a gate 5–96. This gate is further conditioned by the signal I–1 and the gating signal TC1.2 and when all inputs are positive it produces a negative output signal that is inverted at 5–97 and applied to one input of a gate 5.98. Gate 5–98 is further conditioned by phase 1 clock pulses and has its output connected to the set input terminal of the Interrupt Lock-out Flip-flop. Therefore, at time 2.1 of the first I sequence following an external interrupt request the Interrupt Lock-Out-Flip-Flop is set. The resulting negative signal off the set side of the Interrupt Lock-out Flip-Flop is applied to the function priority circuits of FIGURE 13 where it prevents further EI signals from setting the EI function flip-flop.

The Interrupt Request Flip-Flop is reset at time 5.4 of the first I sequence following the sequence in which it is set. A gate 5–99 receives the signals I–2 and TC5.2 and produces a negative output signal that is inverted at 5–100 and applied to one input of a gate 5–101. Gate 5–101 is further conditioned by phase 4 clock pulses and has its output connected to the reset input terminal of the Interrupt Request Flip-Flop.

The Interrupt Lock-out Flip-Flop is reset during the last sequence of a jump instruction. As explained before, an external interrupt causes the execution of either one or two R/W sequences and then causes the execution of an I sequence which withdraws a special jump instruction from the memory. This jump instruction initiates a subroutine for the purpose of determining the abnormal condition which caused the external interrupt. The last instruction of this subroutine is a jump instruction. As this instruction is executed the lead 5–102 becomes positive to condition one input of gate 5–103. When the phase 1 clock pulse occurs it passes through the gate to reset the Interrupt Lock-out Flip-Flop.

*Start Scan.*—The signal for starting the operation of the scan chain is generated in FIGURE 5*a*. A gate 5–104 receives the signals $\overline{\text{Interrupt Request}}$, $\overline{\text{RC–2}}$, $\overline{\text{WC–1}}$ and TC 2.2 as well as the output of a gate 5–105. Gate 5–105 is connected to the set output terminals of the Out Acknowledge Flip-Flop and the In Acknowledge Flip-Flop. If at least one of the flip-flops is set gate 5–105 applies a positive signal to gate 5–104. If all inputs to gate 5–104 are positive it produces a negative output signal that is inverted at 5–106 to become the command Start Scan. This command is applied to the scan chain shown in FIGURE 4.

It should be noted that the command Start Scan can occur during R/W and I sequences. Each time the command occurs it will start the scan chain of FIGURE 4 to cause a scan cycle, in which the request lines from the external devices are scanned, the function and channel priorities determined to thus produce a request signal. However, as explained with reference to the sequence control circuits, such request signals do not affect the sequence control unless the data processing unit is executing an I sequence. Thus, scan cycles which do not occur during an I sequence have no effect on input/output operations. As explained before, this is true only for the particular circuits shown. When incorporated into a general purpose system, such requests may activate the sequence controls during sequences other than I sequences.

*Channel active registers*

The In Active Register contains eight stages corresponding to the eight input channels and the Out Active Register contains eight stages corresponding to the eight output channels. Before the data transfer can take place over an input channel the stage of the In Active Register corresponding to that channel must be turned on. In like manner, before an output data transfer operation may take place over an output channel the stage of the Out Active register corresponding to that output channel must be turned on.

A typical stage of the In Active Register is shown in FIGURE 6. It comprises a flip-flop 6–1, a reset input gate 6–2 and a set input gate 6–3. The particular stage shown activates input channel 7. In order to activate input channel 7, the flip-flop 6–1 must be set. The flip-flop is set upon the occurrence of the command Set In Active concurrent with the positive signal CH–7.

The circuits necessary for setting the In Active Flip-Flops are not shown herein since they form no part of the present invention. For purposes of explaining the present device it may be assumed that the In Active Flip-Flops are all set thus rendering all input channels operative. It should be understood that in actual practice an input channel is rendered active by performing Buffer Load instruction which (1) loads a current address and a terminal address into the memory addresses assigned to the channel, (2) activates the output line of the V register corresponding to the number of the channel being activated, and (3) energizes the Set In Active lead 6–4.

The reset output terminal of each In Active Flip-Flop is connected to a gate in the corresponding stage of the In Request One-Shot circuits shown in FIGURE 8. When an In Active Flip-Flop is set the positive signal off the reset terminal conditions the gate in the In request One-Shot Circuits so that these circuits may respond to an input request from the external device connected to that channel.

A single stage of the Out Active Register is shown in FIGURE 7 and comprises a flip-flop 7–1, a reset input gate 7–2 and a set input gate 7–3. The circuits necessary for setting the Out Active Flip-Flop are not shown herein since they form no part of the present invention. For an understanding of the present invention it is sufficient to assume that the Out Active Flip-Flops are all set thus rendering all output channels active. However, it should be understood that these flip-flops are turned on individually by performing a Load Buffer instruction which loads a current and terminal address into the buffer locations assigned to the channel and energizes the Out Active lead 7–4 and the output line of the V register corresponding to the number of the channel being activated.

When an input or an output operation is being performed the current and terminal controls are read from the memory and compared. If they are equal the transfer operation is terminated and the channel active flip-flop is reset. If the operation is an input transfer the control circuits produce the command Clear In Active which is applied to each of the gates 6–2. The V translator produces a positive signal indicating the channel over which the transfer is taking place. With both inputs conditioned the gate 6–2 produces a positive output signal to reset the In Active Flip-Flop for that channel.

On the other hand, if the current and terminal controls are equal and an output transfer is taking place the control circuits of FIGURE 5 produce the command Clear Out Active. This command is applied to each of the gates 7–2. The V register produces a positive signal indicating the channel over which the transfer is taking place. With both inputs positive the gate 7–2 produces a positive output signal to reset the Out Active Flip-Flop for that channel.

*One-shot registers*

There are three one-shot registers. They are the In Request One-Shot Register shown in FIGURE 8, the Out Request One-Shot Register shown in FIGURE 9, and the External Interrupt One-Shot Register shown in FIGURE 10. There are eight stages in each register, there being one stage for each channel. Only those stages for controlling channel 07 are shown in FIGURES 8–10, the remaining stages being similar to those shown.

Referring now to FIGURE 8, stage 07 of the In Request One-Shot Register comprises a driver circuit 8–1, an inverter 8–2 connected to the output of 8–1, a gate 8–3 connected to the output of 8–2 and responsive to $\phi 3$ clock pulses for producing positive output pulses to set a flip-flop 8–4. The flip-flop is reset by a positive output signal from a gate 8–5 when the gate is conditioned by the CH–7 signal from the V register and the command Clear In One-Shot from the I/O control circuits. The reset output terminal of the flip-flop is connected to a gate 8–6 which is also connected to the output of driver 8–1 and the In Active Flip-Flop for channel 07.

The purpose of the In Request One-Shot circuit is to insure that no more than one input operation is performed in response to an input request no matter how long the input request is generated by the external device. The reason for this is that in the present system the data processing unit responds to an input request by sensing the input lines of the channel making the request, storing the data sensed, and then sending an Input Acknowledge signal to the device making the request. The external device may stop producing the input request any time after it receives the Input Acknowledge. This may occur immediately or it may occur after the data processing unit has gone through another scan operation. Thus, the In Request One Shot circuits for a particular channel prevent a second input operation from being requested for that channel even though the external device for that channel may still be generating an input request. The only way another input request may be made by the same external device is by terminating the first input request signal on lead 8–7 and then producing another input request signal on that lead.

Assume for example that the external device connected to channel 07 desires to transfer a data word to the data processing unit. Normally, the output of driver 8–1 is negative. This signal is inverted at 8–2 and conditions 8–3 so that the flip-flop is set on each phase 3 if the external device is not presenting an input request. The positive signal from the reset output terminal of the flip-flop conditions one input of gate 8–6. It is assumed that channel 07 has been made active by setting the In Active Flip-Flop for channel 07 so that the signal In Active 07 conditions the second input of 8–6.

When the external device connected to this channel generates an Input Request signal on lead 8–7 the output of driver 8–1 becomes positive and conditions the third input of gate 8–6. The gate produces the negative signal CH–7 In Request. This signal is applied to the Channel Priority Register of FIGURE 14 where it prevents the setting of stage 07 to thus provide an indication that channel 07 is making a request.

The output of gate 8–6 is also applied to a gate 8–8. There is only one gate 8–8 for the In Request One-Shot Register. It is connected to the output of the gate 8–6 in each stage of the register and if one or more channels receive an input request signal gate 8–8 produces the positive signal In Request. This signal is applied to the function priority circuits of FIGURE 13 where it sets the In Function flip-flop.

Since there may be other channels having a higher priority, the data transfer over input channel 07 may not take place immediately. When the priority circuits eventually allot priority to this channel the V register translator in FIGURE 15 produces the signal CH–7 to activate the input circuits for channel 07. The data lines for channel 07 are sensed and the data stored in memory. After the data lines have been sensed the data processing unit produces a CH–07 Input Acknowledge signal which tells the external device on this channel that it may terminate its input request. At the same time, the I/O control circuits of FIGURE 5 produce the command Clear In One-Shot. This command is applied to the gates 8–5 in all stages of the In Request One-Shot Register. However, the V register is producing the signal CH–7 so only the gate 8–5 in stage 07 is conditioned. The output signal from this gate resets the In Request One-Shot Flip-Flop for channel 07.

When the flip-flop is reset the negative signal at the reset output terminal blocks gate 8–6. The only way another input operation for this channel can be initiated is to again condition gate 8–6. This is accomplished by terminating the first In Request on lead 8–7 so that the output of driver 8–1 becomes negative to set the flip-flop, and then generating a second In Request on lead 8–7 so that the output of driver 8–1 becomes positive to condition the third input to gate 8–6.

The Out Request One-Shot register is shown in FIGURE 9. It performs the same function for the output channels that the In Request One-Shot register performs for the input channels hence a detailed description of its operation is believed unnecessary. The CH–0 through CH–7 Out Request signals produced by each stage are applied to the corresponding stage of the Channel Priority Register. The positive signal Out Request is produced whenever any of the output channels makes an output request. This signal is applied to the function priority circuits where it sets the Out function flip-flop.

The External Interrupt One-Shot register is shown in FIGURE 10. It functions in a manner similar to the In Request One-shot register described above. There is, however, one major difference. The External Interrupt One-Shot circuit and more particularly the gates 10–6 are not conditioned by "Active" flip-flops as are the In and Out One-Shot circuits. Accordingly, an External Interrupt Request may be generated in FIGURE 10 if the flip-flop 10–4 for a given channel is set and the external device connected to that channel conditions the driver 10–1 to cause it to produce a positive output signal. The signal External Interrupt is applied to the function priority circuits where it sets the External Interrupt function flip-flop.

The signal CH–7 EI Request from stage 7 as well as the EI Requests from the other stages are applied to the corresponding stages of the Channel Priority Register.

*Acknowledge registers*

The In Acknowledge Register comprises eight similar stages, one for each of the input channels. The purpose of each stage is to inform the external device connected to the correspondingly numbered input channel that its Input request or External Interrupt has been allotted priority, the input lines have been sampled and the data stored. When the external device receives the Acknowledge signal it knows that it may terminate its input request or external interrupt request to the data processing unit.

FIGURE 11 shows that stage of the In Acknowledge Register which is operative in conjunction with input channel 07. The stage includes a flip-flop 11–1, a reset input gate 11–2, a set input gate 11–3 and a driver 11–4.

The command Clear In Acknowledge is generated by the I/O control circuits of FIGURE 5. When this command is positive it passes through the gate 11–2 in each stage to reset the flip-flops 11–1. After the input channel has been sampled the I/O control circuits produce the commands Set In Acknowledge and Time In. The command Set in Acknowledge is applied to the gate 11–3 in each stage of the register. Only one of these gates has its second input conditioned. Assume for example that the information on input channel 07 is sampled. The V register is producing the CH–7 signal which conditions the second input of gate 11–3 in stage 07 of the In Acknowledge register and the gate produces a positive output signal to set the flip-flop 11–1 in stage 07.

The positive signal from the reset output terminal of the flip-flop conditions one input of the driver 11–4. Subsequent to the setting of the flip-flop the I/O control circuits of FIGURE 5 produce the command Time In. This command is applied to the driver in each stage but since the flip-flop in stage 07 is the only one set, the driver in this stage is the only one which produces a significant output signal. This signal is applied to the external device connected to channel 07 to inform the device that it may terminate its request and remove the data from the input channel.

The Out Acknowledge Register comprises eight similar stages, one for each of the eight output channels. The purpose of each stage is to inform the external device connected to the correspondingly numbered output channel that its output request has been allotted priority and a data word is in the C register ready to be sampled.

Stage 07 of the Out Acknowledge Register is shown in FIGURE 12. It includes a flip-flop 12–1, a reset input gate 12–2, a set input gate 12–3 and a driver 12–4. In view of the similarity between this register and the In Acknowledge Register a detailed description of its operation is not given. The commands Set Out Acknowledge, Clear Out Acknowledge and Time Out are all generated by the I/O control circuits of FIGURE 5. If the flip-flop 12–1 is set at the time the command Time Out occurs, driver 12–4 produces an output signal to the external device connected to the corresponding output channel to inform the external device that the requested output data is in the C register and ready for sampling.

*Function priority circuits*

The specific embodiment of the invention disclosed herein includes eight input channels and eight output channels. These channels are connected to external devices which may be operating independently of each other. Thus, one, two or more external devices may be simultaneously requesting priority for the purpose of performing an input/output operation.

This priority is determined at two levels. First, the function priority circuits of FIGURE 13 sense the type of input/output operations being requested and allot priority on the basis of the functions being requested.

After the function priority has been determined the function priority circuits of FIGURE 13 produce output signals to enable the inputs to the channel priority circuit of FIGURE 14. This permits all channels making a request of the type allotted priority to enter an indication of this request into the channel priority register. The channel priority register and associated circuits then allot priority to the highest numbered channel requesting the function of the type allotted priority in FIGURE 13.

As explained above, the function priority and channel priority circuits also generate an address. For an input request or an output request this address is the address of the terminal control word assigned to the channel making the request. Table I, below, tabulates these addresses for each input channel and each output channel. On an external interrupt the address generated by the function priority and channel priority circuits is the address in memory at which the data word from the external device is to be stored. Table II is a tabulation of these addresses.

TABLE I

| | Address of Terminal Control Word | | Address of Current Control Word | |
|---|---|---|---|---|
| | In | Out | In | Out |
| Channel 0 | *0110000 | *0100000 | *0110001 | *0100001 |
| Channel 1 | *0110010 | *0100010 | *0110011 | *0100011 |
| Channel 2 | *0110100 | *0100100 | *0110101 | *0100101 |
| Channel 3 | *0110110 | *0100110 | *0110111 | *0100111 |
| Channel 4 | *0111010 | *0101010 | *0111011 | *0101011 |
| Channel 5 | *0111010 | *0101010 | *0111011 | *0101011 |
| Channel 6 | *0111100 | *0101100 | *0111101 | *0101101 |
| Channel 7 | *0111110 | *0101110 | *0111111 | *0101111 |

* Higher order bits are all 0's.

TABLE II

| | Channel Data Address | Jump Instruction Address |
|---|---|---|
| Channel 0 | *1000001 | *1000000 |
| Channel 1 | *1000011 | *1000010 |
| Channel 2 | *1000101 | *1000100 |
| Channel 3 | *1000111 | *1000110 |
| Channel 4 | *1001001 | *1001000 |
| Channel 5 | *1001011 | *1001010 |
| Channel 6 | *1001101 | *1001100 |
| Channel 7 | *1001111 | *1001110 |

* Higher order bits are all 0's.

The function priority circuits of FIGURE 13 generate the three high order bits of each address while the channel priority circuits of FIGURE 14 generate the next three bits of the address. The low order bit of each address is determined in a manner subsequently described.

The function priority circuits include an Out Function flip-flop 13–1, an In Function flip-flop 13–2 and an EI Function flip-flop 13–2A. These flip-flops are cleared at 3.2 of each scan sequence by the command Clear Function Priority which comes from FIGURE 5. This command is applied to gates 13–3 through 13–5 which have their outputs connected to the reset input terminals of the flip-flops 13–1 through 13–2A, respectively.

Indications of the types of functions being requested are entered into the flip-flops at 3.4 of each scan sequence. The command Set Function Priority is generated by the scan chain of FIGURE 4 and applied to one input of each of the gates 13–6 through 13–8. Gate 13–6 receives the signal Output Request if any of the Out Request One-Shots (FIG. 9) are set. Upon occurrence of the command Set Function Priority the gate 13–6 produces a positive output signal to set the Out Flip-Flop.

Gate 13–7 receives the positive signal In Request if any of the In Request One-Shots (FIG. 8) are set. Upon occurrence of the command Set Function Priority this gate produces a positive output signal to set the In Function Flip-Flop.

A gate 13–9 receives the positive signal EI if any of the External Interrupt One-Shots (FIG. 10) are set. This gate is further conditioned by the signal Inhibit EI and produces a negative output signal that is applied through an inverter 13–10 to one input of a gate 13–11. The signal $\overline{\text{Interrupt Lock-out}}$ is normally positive and conditions one input of a gate 13–8. Upon occurrence of the command Set Function Priority gate 13–8 produces a positive output signal to condition one input of gate 13–11. If the signal EI is positive at this time gate 13–11 produces a positive output signal to set the EI Function Flip-Flop.

The reset output terminal of the Out Flip-Flop is applied to one input of an inverter 13–12 and one input of a gate 13–13. The output of inverter 13–12 is the signal Output Request which is applied through the circuits of FIGURE 5*d* to the sequence controls shown in FIGURE 3.

The set output terminal of the Out Flip-Flop is connected to one input of each the gates 13–14 through 13–18. The reset output terminal of the In Flip-Flop is connected to one input of the gate 13–16. The set output terminal of the In Flip-Flop is connected to one input of each of the gates 13–14 and 13–15. The output from the set terminal of the In Flip-Flop is the signal In Request which is applied through the circuits of FIGURE 5*d* to the sequence controls shown in FIGURE 3.

The reset output terminal of the EI Flip-Flop is connected to one input of a gate 13–19. The output of gate 13–14 is inverted at 13–20 and applied to the second input of gate 13–19. The output of gate 13–19 is the signal $\overline{\text{EI}}$. This signal is inverted at 13–21 to become the signal EI and is inverted at 13–22 to provide a signal to set stage 06 of the S register. The output signal from gate 13–19 is also applied to one input of gates 13–17 and 13–23.

The set output terminal of the EI Flip-Flop is connected to one input of the gate 13–15 and the output of this gate is connected to an input of gate 13–23. The output of gate 13–23 is inverted at 13–24 to provide the signal Set S05.

The output of gate 13–16 is inverted at 13–25 to provide a signal to set S04. The output of gate 13–16 is inverted at 13–26 to provide one input for a gate 13–27. The output of gate 13–16 is also applied to the gate 13–17. The output of gate 13–17 is the signal Valid Function.

The output of inverter 13–21 is applied to one input of a gate 13–28. The gates 13–13, 13–27 and 13–28 all receive phase 4 clock pulses as well as the command Set est priority. Therefore, gate 13–13 produces the signal through 3.1 of each scan sequence. Therefore, these gates can produce an output signal only at time 4.4 of a scan sequence. In normal operation only one of these gates is conditioned on a given scan sequence. The particular one that is conditioned is determined by the highest priority function flip-flop set. The output function has the highest priority, the input function has the next higher priority, and the external interrupt function has the lowest priority. Therefore, gate 13—13 produces the signal Enable Out Request at time 4.4 of each scan sequence if the Out Flip-Flop is set. The gate 13–27 produces the signal Enable In Request at time 4.4 of a scan sequence if the In Flip-Flop is set and the Out Flip-Flop is not set. The gate 13–28 produces the signal Enable EI at time 4.4 of a scan sequence if the EI Flip-Flop is set and both the In and the Out Flip-Flops are reset.

The signals Enable Out Request, Enable In Request and Enable EI are applied to the Channel Priority register of FIGURE 14 to enable an indication of the channels requesting a particular function to be entered into the Channel Priority register.

Column 2 of Table I shows that bits 6, 5 and 4 of the address of the terminal control word must be 0, 1 and 0, respectively if an output operation is being performed. The Out Flip-Flop is set thus applying a negative signal to each of the gates 13–14 through 13–16. The output of gate 13–14 is a positive signal which is inverted at 13–20, inverted again at 13–19 and applied to inverter 13–22. Thus, when the Out Flip-Flop is set the output of inverter 13–22 is negative thus preventing the setting of stage 06 of the S register.

The negative signal applied to gate 13–15 emerges from this gate as a positive signal and is applied to gate 13–23. The output of gate 13–19 is positive and conditions the second input of gate 13–23. The gate produces a negative output signal that is inverted at 13–24 to become the positive signal Set S05.

The negative signal applied to gate 13–16 emerges as a positive signal. This signal is inverted at 13–25 so that the signal Set S04 is negative.

The Out-Flip-Flop remains set during the output operation thus causing the value 010 to be available at the outputs of inverters 13–22, 13–24 and 13–25. The output signals from these inverters are selectively sampled at various times during the output operation.

When the Out Flip-Flop is set the positive signal off the reset side is inverted at 13–12 to become the signal Out Request. This signal is used to initiate the output operation by setting the sequence control circuits for an RC sequence.

Column one of Table I shows that bits 6, 5 and 4 of the address of the terminal control word are 0, 1 and 1, respectively, if an input operation is being performed. In this case the In Flip-Flop is set. The negative signal off the set side of the In Flip-Flop passes through 13–14, 13–20, 13–19 and 13–22 so that the signal Set 06 is negative. The negative signal off the set output terminal of the In Flip-Flop is inverted at 13–15, inverted again at 13–23 and inverted again at 13–24 so that the signal Set S05 is positive.

The positive signal off the reset side of the In Flip-Flop is applied to gate 13–16 and, assuming an Out Request is not being made, the second input of this gate is also positive. The resulting negative output signal is inverted at 13–25 to become the positive signal Set S04.

The negative output signal from gate 13–16 is inverted at 13–26 to condition one input of gate 13–27. At times 4.4 of the scan cycle this gate is conditioned by the command Set Channel Priority and a phase 4 clock pulse so that it produces the signal Enable In Request. This signal is applied to the channel priority register where it conditions read-in gates for the purpose of determining which input channels are making an input request.

The negative signal off the set side of the In Flip-Flop becomes the In Request Signal. This signal is used to initiate the input operation by setting the sequence controls for an RC sequence.

If an External Interrupt is requested but no input or output request is made the EI Flip-Flop is set and the In and Out Flip-Flops are reset. Assuming that signal $\overline{\text{Interrupt Lock-out}}$ is positive, all inputs to gate 13–14 are positive and it produces a negative output signal that is inverted at 13–20 and applied to one input of gate 13–19. Gate 13–19 also receives a positive signal from the reset output terminal of the EI Flip-Flop. The negative output of gate 13–19 is inverted at 13–22 so that the signal Set S06 is positive. The output of gate 13–19 is inverted at 13–23 and inverted again at 13–24 so that signal Set S05 is negative. The negative signal from the reset side of the In Flip-Flop is inverted at 13–16 and inverted again at 13–25 so that the signal Set S04 is negative. This corresponds to column one of Table II which shows that when an external interrupt is being performed bits 6, 5 and 4 of the address where the incoming word is to be stored are 1, 0 and 0, respectively.

The output of gate 13–19 is inverted at 13–21 and conditions the gate 13–28. This gate is further conditioned by the command Set Channel Priority and a phase 4 clock pulse so that it produces the signal Enable EI at time 4.4 of the scan sequence. The Enable EI signal is applied to the read-in gates of the Channel Priority Register so that determination may be made of which channels are requesting the external interrupt. The signal EI produced by inverter 13–28 is applied through the I/O controls of FIGURE 5*d* to the sequence controls of FIGURE 3 where it sets these controls for an R/W sequence.

The signal $\overline{\text{Interrupt Lock-out}}$ comes from the set output terminal of the Interrupt Lock-out flip-flop. This signal is normally positive but becomes negative when the Interrupt Lock-out flip-flop (FIG. 5*d*) is set during the first I sequence following an External Interrupt. The External Interrupt causes sub-routine to be performed to determine the type of abnormal condition which caused the External Interrupt to be requested. The signal $\overline{\text{Interrupt Lock-out}}$ blocks gate 13–8 to prevent the setting of the EI flip-flop and blocks gate 13–19 to prevent the generation of the signal EI for a second External Interrupt until after the sub-routine resulting from a first External Interrupt has been completed.

The signal Inhibit EI is normally positive to condition the gate 13–9 but becomes negative on any R/W sequence resulting from an In Request or an External Interrupt. When the signal becomes negative it prevents the setting of the EI flip-flop. The reason for this may be explained as follows. In response to an Input or Output request the present invention performs an RC–I sequence, an RC–II sequence, a WC sequence, and then at least one R/W sequence. On the other hand, in response to an External Interrupt the present invention performs only the R/W sequence. Since a scan sequence may occur concurrently with the R/W sequence resulting from an input request, it would normally be possible to set the EI flip-flop as a result of another channel requesting an External Interrupt at time 3.4 of the R/W sequence. Since the operations performed on an R/W sequence resulting from an input request are not the same as the operations performed on an R/W sequence resulting from an External Interrupt, some means must be provided to prevent the setting of the EI flip-flop. This is the purpose of the signal Inhibit EI.

An Output Request causes transfer of information out of the data processing unit and into an external device. On the other hand, both an Input Request and External Interrupt cause information to be transferred out of an external device and into the data processing unit. For reasons subsequently explained, it is necessary to know the direction in which information is being transferred. This function is performed by the In/Out Flip-Flop 13–29. The In/Out Flip-Flop is either set or reset at 6.2 of a scan sequence depending upon the condition of the Out Flip-Flop. The scan chain generates the negative signal $\overline{\text{Initiate Interrupt Request}}$ from time 5.4 through 6.3. This signal is applied through an inverter 13–30 to one input of a gate 13–31. This gate is further conditioned by phase 2 clock pulses and at time 6.2 of each scan sequence produces a positive output signal to condition one input of each of the gates 13–18 and 13–32. Gate 13–18 has another input connected to the set output terminal of the Out Flip-Flop and an output connected to the reset input terminal of the In/Out Flip-Flop. Gate 13–32 has an input connected to the reset output terminal of the Out Flip-Flop and an output connected to the set input terminal of the In/Out Flip-Flop. If the Out Flip-Flop is set, then at time 6.2 of the scan sequence gate 13–32 produces a positive output signal to set the In/Out Flip-Flop. On the other hand, if the Out Flip-Flop is reset, then at 6.2 of the scan sequence gate 13–18 produces a positive output signal to reset the In/Out Flip-Flop. The signals In and Out produced by the In/Out Flip-Flop are applied to the I/O controls of FIGURE 5.

*Channel priority*

As explained previously, several external devices may be requesting access to the memory at the same time. The function priority circuits described above allot priority on the basis of the type of function being requested. However, two or more external devices may be making a request for access to the memory for the purpose of performing the same function. The channel priority circuits shown in FIGURE 14 determine which external device shall have access to the memory when two or more external devices are requesting access to the memory for the same purpose. Priority is allotted on the basis of channel number. That is, channel 7 takes priority over channel 6 or any lower numbered channel, channel 6 takes priority over channel 5 or any lower numbered channel, channel 5 takes priority over channel 4 or even any lower numbered channel and so forth, with channel 0 having the lowest priority.

The Channel Priority register comprises eight stages. Only stages 00 and 07 are shown in FIGURE 14 with the intermediate stages being similar to those shown. Each stage includes a flip-flop 14–1, an output request gate 14–2, an input request gate 14–3 and an external interrupt gate 14–4.

Each of the bip-flops 14–1 is cleared at 5.3 of each scan sequence by the command Clear Channel Priority. At time 5.4 of each scan cycle each flip-flop of the channel priority register is set except those flip-flops corresponding to channels which are making a request of the type allotted priority.

Each of the output request gates 14–2 is conditioned by the command Enable Output Request whenever the function priority circuits of FIGURE 13 determine that an output operation is the highest priority function being requested by any of the external devices. The gates 14–2 are individually connected to the corresponding stages of the Out Request One-Shot register. Thus, gate 14–2 for stage 07 receives the positive signal CH–7 Out Request as long as channel 7 is not requesting an output operation and the gate 14–2 of stage 00 receives the positive signal CH–0 Out Request as long as channel 0 is not requesting an output operation.

The gates 14–3 are simultaneously conditioned by the command Enable In Request when the function priority circuits of FIGURE 13 determine that an input request is the highest priority function being requested. The gates 14–3 are further conditioned by the individual channel In Request signals from the In Request One-Shot register as long the corresponding channel is not requesting an input operation.

The gates 14–4 are simultaneously conditioned by the command Enable EI which is generated by the function priority circuits when it is determined that the highest priority function being requested is an external interrupt operation. The gates 14–4 are individually connected to the corresponding stages of the External Interrupt One-Shot register and as long as the corresponding channel is not requesting an external interrupt the gate is conditioned. The output signals from the flip-flops in the Channel Priority register are applied to a translator circuit which produces a binary code corresponding to the number of the channel which is allotted priority. The translator circuit comprises a plurality of gates 14–5 through 14–14, a plurality of Or-inverters 14–15 through 14–17 and an inverter 14–18. The reset output terminal of the flip-flops in stages 4 through 7 are connected to gate 14–5. The output of this gate is the signal Set V02. The output of gate 14–5 is inverted at 14–18 and applied to one input of gates 14–7, 14–9, 14–11 and 14–14. The set output terminal of the flip-flop in stage 7 is applied through gate 14–6 to Or-inverter 14–15. The set output terminal of the flip-flop in stage 3 is connected to gate 14–7 which has its output connected to the second input of Or-inverter 14–15. The output of 14–15 is applied to one input of gates 14–12 through 14–14. The set output terminals of the flip-flops in stages 6 and 2 are connected to the gates 14–8 and 14–9, respectively. The outputs from these gates are applied to Or-inverter 14–16 which has its output connected to gates 14–12 and 14–14. The set output terminal of the flip-flop in stage 5 and the reset output terminal of the flip-flop in stage 6 are connected to the gate 14–10. The set output terminal of the flip-flop in stage 1 and the reset output terminal of the flip-flop in stage 2 are connected to the gate 14–11. The outputs of the gates 14–10 and 14–11 are applied to Or-inverter 14–17 which has its output connected to the gates 14–13 and 14–14. The reset output terminal of the flip-flop in stage 00 is applied to gate 14–14.

As an illustration of the operation of the channel priority circuits assume that the function priority circuits of FIGURE 13 have determined that an input operation is the highest priority operation being requested and is thus producing the signal Enable In Request to condition each of the gates 14–3. Assume further that channels 2 and 7 are both requesting an input operation. In this case channel 7 should be allotted priority and the circuits of FIGURE 14 should produce a combination of output signals to enter the binary value 7 (111) in the V register. With both channel 2 and channel 7 requesting an input operation the CH–2 In Request and the CH–7 In Request signals are both negative and thus block the gates 14–3 in stages 2 and 7 of the Channel Priority register. The remaining channels, that is channels 0, 1, 3, 4, 5 and 6 are not requesting input operations so the In Request One-Shot circuits for these channels produce positive signals to condition the second input of the gates 14–3 for these stages. Thus, the flip-flops in stages 0, 1, 3, 4, 5 and 6 of the Channel Priority register are set while the flip-flops in stages 2 and 7 remain reset. The negative signal off the reset side of the flip-flop in stage 07 is inverted at 14–5 and becomes the positive signal Set V02. The positive signal off the set side of the flip-flop in stage 07 passes through 14–6, is inverted at 14–15 and inverted again at 14–12 to produce the signal Set V01. The output of 14–15 is also inverted at 14–13 to produce the signal Set V00. Thus, even though channels 2 and 7 are requesting an input operation the translator circuits in FIGURE 14 produce a binary code representing the highest numbered channel requesting the input operation.

The output of 14–14 is the signal Valid Channel. This signal is positive as long as at least one stage of the Channel Priority register remains reset. The signal Valid Channel is applied to the I/O control circuits of FIGURE 5 where it operates in conjunction with the Valid Function signal to prevent an I/O request or an EI request unless at least one of the function priority flip-flops is set and one of the channel priority flip-flops is reset. In the above illustration where channel 7 was selected the output from 14–15 is inverted at 14–14 to become the signal Valid Channel.

*V register and translator*

The V register and translator are shown in FIGURE 15. It comprises three flip-flops V00, V01 and V02 and a translator circuit. The translator circuit comprises a plurality of gates 15–1 through 15–12 and a plurality of inverters 15–13 through 15–18.

Flip-flop V00 has its set output terminal connected to gates 15–1 and 15–4 and its reset output terminal connected to gates 15–2 and 15–3. Flip-flop V01 has its set output terminal connected to gates 15–1 and 15–2 and its reset output terminal connected to gates 15–3 and 15–4. Flip-flop V02 has its set output terminal connected through inverter 15–17 to one input of gates 15–9 through 15–12 and has its reset output terminal connected through inverter 15–18 to one input of gates 15–5 through 15–8.

The output of gate 15–1 is inverted at 15–13 and applied to one input of gates 15–5 and 15–9. The output of gate 15–2 is inverted at 15–14 and applied to one input of gates 15–6 and 15–10. The output of gate 15–3 is inverted at 15–15 and applied to one input of gates 15–8 and 15–12. The output of gate 15–4 is inverted at 15–16 and applied to one input of gates 15–7 and 15–11.

The V register and translator serve two functions. First, the translator decodes the three digit value standing in flip-flops V00 through V02 and produces a positive signal on one of the eight output lines CH0 through CH–7. The particular output line which is positive at a given instant determines which of the input-output channels is conditioned for a transfer operation. Thus, the output from gates 15–5 through 15–12 are applied to the Input and Output Acknowledge registers, the Input and Output Request One-Shots, the Input and Output Active registers and the data input gates. An input or an output operation can take place on a channel only if the corresponding output lead from the translator is positive.

Assume for the moment that all flip-flops in the V register are reset. The positive signals from the set side of flip-flops V00 and V01 condition gate 15–1 and this gate produces a negative output signal that is inverted at 15–13 to condition one input of gate 15–5. The negative signal from the reset side of flip-flop of V02 is inverted at 15–18 and applied to the second input of gate 15–5. Therefore, when all flip-flops in the V register are reset gate 15–5 produces a positive signal CH–0 to condition channel 0 for an input or output operation.

As a second example consider the case where it is desired to perform an input or an output operation over channel 7. In this case flip-flops V00 through V02 are all set. The negative output signal from the set side of flip-flop V02 is inverted at 15–17 and conditions one input of gate 15–12. The positive signals from the reset side of flip-flops V00 and V01 condition both inputs of gate 15–3. This gate produces a negative output signal that is inverted at 15–15 and applied to the second input of gate 15–12. With both inputs positive gate 15–12 produces the positive output signal CH–7.

The second function of the V register is to generate three bits of a memory address. In the case of an Input Request or an Output Request this memory address is the address of the terminal control word associated with the particular channel being granted priority and in the case of an External Interrupt it is the address at which an incoming word is stored. The V register generates only bits 3, 2 and 1 of the memory address, bits 6, 5 and 4 being generated by the Function Priority circuits as described above and the low order bit being generated in a manner subsequently described.

When flip-flop V00 is set, the positive signal off the reset side is applied over lead 15–19 to the next to the low order stage S01 of the memory address register. When flip-flop V01 is set the positive signal off the reset side is applied over lead 15–20 to stage S02 to set this stage of the memory address register. Finally, when flip-flop V02 is set the positive signal off its reset side is applied over lead 15–21 to set stage S03 of the memory address register. This is in agreement with columns 1 and 2 of Table I and column 1 of Table II which shows that bits 1, 2 and 3 of the addresses assigned to channel 0 are all zeroes while bits 1, 2 and 3 of the addresses assigned to channel 7 are all ones.

The binary code designating the channel granted priority is entered into the V register from the Channel Priority register by way of gates 15–22 through 15–24. These gates continuously receive output signals from the Channel Priority register and upon occurrence of the command Set V these signals are applied to the flip-flops of the V register to set the appropriate flip-flops. The command Set V is generated by the I/O control circuits of FIGURE 4 at 5.4 of each scan sequence. All stages of the V register are cleared immediately before the Set V command occurs. The command Clear V01–V02 occurs at 5.3 of each scan sequence and is applied to the reset input terminal of V01 and V02 to reset these flip-flops. The command Clear V00 occurs at 5.3 of each scan sequence and is applied to the reset input terminal of V00 to reset this flip-flop.

When operating in the dual mode the eighteen bits of data transferred over the even numbered channel are considered to be the eighteen least significant bits of a 36-bit word and the eighteen bits transferred over the odd numbered channel are considered to be the eighteen most significant bits of the 36-bit word. In order to maintain the correct significance of the bits the information transferred over the even channel is stored in or read from the address specified by the control word while the eighteen bits transferred over the odd numbered channel are transferred from or read into the next higher memory address. Since the address specified by the control word may be incremented or decremented, depending upon the sign of the control word, it may at times be necessary to first transfer the data over the even channel and then the data over the odd channel while at other times it may be necessary to first transfer the data over the odd channel and then the data over the even channel. This is accomplished in part by selectively setting flip-flop V00 to energize one of the odd numbered channel select lines of the V translator to select an odd channel or clearing V00 to select an even channel. The commands Clear V00 and Set V00 perform this function. These commands are generated as explained with reference to FIGURE 5. The command Set V00 is mixed with a phase 4 pulse gate 15–25 and applied to the set input terminal of flip-flop V00.

*C register*

The C registers are two eighteen bit storage registers which function as output buffer registers. When an external device makes an output request the data processing unit responds by withdrawing a single eighteen bit word from memory and entering it into both of the C registers. The data processing unit then signals the external device that the requested data is ready by transmitting an Output Acknowledge signal. After it receives the Acknowledge signal the external device samples the C register.

The above statements are true only if the external device is connected to a channel which is conditioned for the single mode. If the Output Request is received over an odd numbered channel conditioned for the dual mode, the data processing unit responds by loading one 18-bit word into one C register and another 18-bit word into the other C register. The external device then samples both C registers.

The C registers are designated C Even and C Odd because one stores the information to be transferred over the even numbered output channels and the other stores the information to be transferred over the odd numbered output channels.

All stages of C Even are similar to the high order stage 17 shown in FIGURE 16. Each stage of C Even includes a gate 16–1 having one input connected to the reset output terminal of the corresponding stage of the Z register and another input responsive to the command Z to C Even. If a given stage of the Z register contains a binary one it conditions the gate 16–1 and, upon occurrence of the command V to C Even the gate produces a positive output signal to set the flip-flop 16–2 in the corresponding stage of C Even.

The set output terminal of each flip-flop is connected to a driver 16–3 which drives one bit line in each of the four even numbered channels. For example, when the flip-flop in stage 17 of C Even is set it produces a negative output signal which conditions driver 16–3. Driver 16–3 then produces a binary one indication on the leads corresponding to bit 17 in output channels 0, 2, 4 and 6.

The command Clear C is applied to the reset input terminal of each flip-flop in C Even for the purpose of clearing the register before data is entered therein. This command is generated in FIGURE *5c.*

All stages of the C Odd register are similar. The high order stage 17 is shown in FIGURE 17. Each stage includes a gate 17–1 having one input connected to the reset output terminal of the corresponding stage of the Z register and another input responsive to the command Z to C Odd. When a given stage of the Z register contains a binary one it conditions the gate 17–1 so that upon occurrence of the command Z to C Odd the gate produces a positive output signal to set the flip-flop 17–2 in the corresponding stage of C Odd.

The set output terminal of each flip-flop is connected to a driver 17–3 which drives one bit line in each of the four odd numbered output channels. For example, when the flip-flop in stage 17 of C Odd is set it conditions driver 17–3 which produces a binary one indication on the leads corresponding to bit 17 in output channels 1, 3, 5 and 7.

The command Clear C is applied to the reset input terminal of each flip-flop in C Odd for the purpose of clearing the register before data is entered therein. This is the same command that is produced by the I/O controls to clear C Even.

*Data input gates*

There are eighteen data input gates corresponding to the eighteen bits of an incoming data word. A single data input gate 18–1 and its input circuits are shown in FIGURE 18 with the remaining gates and circuits being similar to the one shown. The particular gate shown is for receiving the highest order bit and thus produces the signal I/O 17 which is connected to the high order stage 17 of the Z register.

The gate 18–1 receives input signals from eight drivers 18–2 through 18–9. Only one driver at a time may produce a significant output signal. When a particular channel is allotted priority the V register produces one of the signals CH–0 through CH–7. This conditions each of the drivers for this channel. If a binary one signal is present in a given position in the input channel selected then the driver produces a negative output signal which is inverted at 18–1 and applied to the corresponding stage of the Z register.

For example, assume that channel 0 is allotted priority and a word is present on this channel which contains binary ones in positions 17 and 16 and binary zeros in positions 15 through 0. The V register produces the signal CH–0 which conditions one input of the driver 18–2 for each of the eighteen positions. The second input of the driver 18–2 in positions 17 and 16 is conditioned by the binary one signal in these positions of the input word so these drivers produce negative output signals which are inverted by gates 18–1 in positions 17 and 16 and then applied to the read-in gates of the Z register to set stages Z17 and Z16.

The second input to the drivers 18–2 in positions 0 through 15 is blocked by the presence of signals representing binary zeros in these positions of the input word. The drivers produce positive output signals. In addition, the drivers 18–3 through 18–9 for stages 0 through 15 produce positive output signals because they are not conditioned by a channel select signal from the V register. Thus, all inputs to gates 18–1 for stages 0 through 15 are positive and the gates produce negative output signals which are blocked at the read-in gates of the Z register.

*X register*

The X register is used in computing sequential instruction addresses and is also used during input-output operations to compute current addresses. The X register is an eighteen bit register. All stages of the register are similar to the low order stage X00 shown in FIGURE 19.

Each stage of the X register includes a flip-flop 19–1 and a pair of input gates 19–2 and 19–3. The set output terminal of each stage of the Z register is conected to one input of the gate 19–2 of the corresponding stage of the X register. The set output terminal of each stage of the P register is connected to the gate 19–3 of the corresponding stage of the X register.

Information is entered into the X register from the Z register by first setting each stage of the X register to one and then clearing those stages of the X register where the corresponding stage of the Z register contains a binary zero. This is accomplished as follows. The positive command Clear X sets each stage of the X register. The positive command Z to X is then applied to each of the gates 19–2. If the corresponding stage of the Z register contains a binary zero, then the signal from the set output terminal of the Z register is positive and the gate 19–2 produces a positive signal to reset the corresponding stage of the X register.

Information is entered into the X register from the P register in a similar manner. The command Clear X sets each stage of the X register. The positive command P to X is then applied to the gate 19–3 in each stage of the X register. If a given stage of the P register contains a binary zero then the gate 19–3 is conditioned and produces a positive output signal to reset the corresponding stage of the X register.

The set and reset output terminals of each stage of the X register are applied to the corresponding stages of the adder. The set and reset output stages X01 through X17 are applied to the corresponding stages of the D register. The set and reset outputs of stage X00 are applied to the D register controls of FIGURE 26.

Stage 17 of each register stores the sign bit. As explained previously, the signs of the control words determine whether the control words are to be incremented or decremented. These control words enter the X register after they are read out of memory so stage X17 produces two signals designated X+ and X−. These signals are applied to the I/O controls (FIG. 5) and the D register controls.

*S register*

The S register serves as the memory address register. If it is desired to read a word out of a specified address in memory the binary value representing this address is entered into the S register. The register comprises fifteen stages. Stages S01 through S05 are similar to the stage S06 shown in FIGURE 20 and each comprises a flip-flop 20–1 and a plurality of input gates 20–2, 20–3 and 20–4. The gate 20–2 in each stage has one input connected to the reset output terminal of the corresponding stage of the P register. In order to transfer a value in the P register into the S register the command P to S is made positive to condition each of the gates 20–2. If a given stage of the P register contains a binary one the gate 20–2 produces a positive output signal to set the corresponding stage of the S register.

Binary results produced by the adder are continuously applied to the gates 20–3. In order to enter this value in the S register the command Adder to S becomes positive to condition each of the gates 20–3. If a given stage of the adder is producing a binary one output, the gate 20–3 is conditioned to produce a positive output signal to set the corresponding stage of the S register.

The manner in which the function priority circuits and the V register produce a six-bit address designating the address of a desired buffer control word has been previously described. This address is applied to the gates 20–4 in stages S01 through S06. Upon occurrence of the positive command V to S this address is gated into stages S01 through S06 of the S register. It should be understood that stage S00 and stages S07 through S14 differ from stage S06 in that they do not contain the gate 20–4.

The positive command Set S00 is generated in FIGURE 25. The purpose of this command is to set S00 so that the S register may contain an odd rather than an even address. As previously explained, the command V to S enters an address in the stages S01 through S06 but does not enter a value into S00. Thus, the command V to S always enters an even address into the S register.

On an I/O Request this even address is the address of the terminal control word. After the terminal control word is selected stage S00 is set to select the next higher address. As previously explained, this is the address of the current control word. Columns 3 and 4 of Table I tabulate the addresses of the current control words assigned to each channel.

On an External Interrupt the even address entered into S is the address at which a data word is stored. After the data word is stored stage S00 is set to select the next higher address. This is the address of a special Jump instruction. Column 2 of Table II tabulates the addresses of special Jump instructions assigned to each channel.

*D register*

The D register is utilized in input-output operations to compute the current control addresses. The register contains eighteen binary stages designated D00 through D17. The high and low order stages are shown in FIGURE 21 with intermediate stages D02 through D16 being similar to stage D17.

Referring to stage D17, each stage of the D register includes a flip-flop 21–1 and a pair of input gates 21–2 and 21–3. The command X′ to D occurs when it is desired to transfer the complement of the value in the X register to the D register. This command is applied to each of the gates 21–3 in stages D01 through D17. If a given stage of the X register contains a binary zero the lead 21–4 is positive and conditions the gate 21–3 to set the corresponding stage of the D register.

When it is desired to transfer the value in the X register to the D register in true form the command X to D is applied to each of the gates 21–2 in stages D01 through D17. If a given stage of the X register contains a binary one the lead 21–5 is positive and conditions the gate 21–2 which produces a positive output signal to set the corresponding stage of the D register.

The low order stage D00 differs from the other stages of the D register. The reason for this is that in computing current control words the value +1 or the value −1 is entered into the D register depending upon whether the current control words are being incremented or decremented. To enter the value +1 into the D register the positive command Clear D is applied to the reset input terminal of each stage of the register. Next, the command Set D00 becomes positive on lead 21–6 to condition one input of the gate 21–7. This gate is further conditioned by phase 3 clock pulses and produces a positive output signal to set the lower order stage of the D register.

To enter the value −1 into the D register, the commands X′ to D and X to D become positive simultaneously thus setting stages D01 through D17 of the D register. Since the commands X′ to D and X to D do not control stage D00, this stage remains reset.

Signals representing the value in the D register are continuously applied to one set of inputs of the adder. As will be shown subsequently, the adder also continuously receives signals representing the value in the X register and presents at its output terminals the sum of the values in the X and the D registers.

On each operation resulting from an Input Request or an Output Request the current control word is compared with the terminal control word to determine if the two are equal. This is accomplished by entering the complement of the terminal control word into the D register and the true value of the current control word into the X register and performing an addition operation. If the output of the adder is zero then the current control word is equal to the terminal control word and the input-output operation should be terminated. In order to enter the complement of the terminal control word into the D register the command X′ to D becomes positive and conditions the gates 21–3 to thus transfer the complement of the value in stages X01 through X17 into stages D01 through D17. If stage X00 contains a binary zero at this time then the circuits of FIGURE 26 produce the positive command X, X′ to D00 to enter a binary one into stage D00. On the other hand, if stage X00 contains binary one at this time the command X, X′ to D00 remains negative and flip-flop D00 remains reset.

*Z register*

The Z register is the memory buffer register. All data read into or out of the memory passes through this register. The register comprises eighteen similar stages designated Z00 through Z17. The high order stage Z17 is shown in FIGURE 22.

Each stage of the register comprises a flip-flop 22–1 and a plurality of input gates 22–2, 22–3 and 22–4. The register is cleared at 6.4 of each sequence. The command Clear Z is applied to the reset input terminal of the flip-flop in each stage of the register.

Information is read from the memory into the Z register through the gates 22–2. The positive command Memory to Z is applied simultaneously to the gates 22–2. If a given position of the word being read out of memory contains a binary one then the second input of the corresponding gate 22–2 is conditioned and the gate produces a positive output signal to set the flip-flop.

Information may be entered into the Z register from an external device through the data input gates one of which is shown in FIGURE 18. This is accomplished by applying the positive command I/O to Z to each of the gates 22–3. If a given bit position of the incoming word is a binary one the data input gate produces a positive output signal to condition the corresponding gate 22–3 in the Z register. The gate thus produces a positive output signal to set the flip-flop in the corresponding stage of the Z register.

Information may also be entered into the Z register from the adder. The output from the adder is continuously applied to the gates 22–4 and upon occurrence of the positive command Adder to Z, the gate 22–4 produces a positive output signal to set the flip-flop in the Z register if the corresponding stage of the adder contains a binary one.

The reset output terminal of each stage of the Z register is connected to a read-in gate in the corresponding stage of the C Even and C Odd registers shown in FIGURES 16 and 17. The set output terminal of each stage of the Z register is connected to an input gate in the corresponding stage of the X register.

*P register*

The P register serves as an instruction address storage register. After each instruction address is computed by the adder it is stored in the P register until it is time to compute the next instruction address. The P register contains fifteen binary stages, the high order stage being shown in FIGURE 23. Each stage includes a flip-flop 23–1 and an input gate 23–2. The positive command Clear P appears on the lead 23–3 and is applied to the reset input terminal of each stage of the P register to clear the register. The gate 23–2 in each stage has one input connected to the output of the corresponding stage of the adder. The positive command Adder to P is applied simultaneously to the gates 23–2 in each stage and if a given stage of the adder contains a binary one the gate 23–2 produces a positive output signal to set the corresponding stage of the P register.

The set output terminal of each stage of the P register is connected to an input gate of the corresponding stage of the X register so that the value in the P register may be transferred to X and then to the adder for incrementing. The reset output terminal of each stage of the P register is connected to an input gate of the corresponding stage of the S register. This enables an instruction address contained in the P register to be transferred to the S register where it controls the memory selection circuits to select the instruction stored at that address.

*X register controls*

The circuit for controlling the input of information into the X register is shown in FIGURE 24 and comprises a plurality of gates 24–1 through 24–3 and a pair of inverters 24–4 and 24–5. The signals $\overline{\text{WC–I}}$ and $\overline{\text{R/W–I}}$ and the gating signal TC3.2 are applied to the inputs of gate 24–1. If all of these signals are positive the gate produces a negative output signal which is inverted at 24–4 to condition one input of gate 24–2 and inverted at 24–5 to condition one input of gate 24–3.

Gate 24–3 is further conditioned by phase 4 clock pulses so that the command Clear X is generated at time 3.4. The gate 24–3 is conditioned by phase 1 clock pulses and produces the command Z to X at time 4.3.

The commands Clear Z and Z to X are produced on any sequence which is not an R/W or a WC sequence. Stated differently, on input/output operations these commands occur only during RC or I sequences.

*S register controls*

The commands for entering information into the S register are shown in FIGURE 25. The signals RC–1, Pass II–1, and the gating signal TC6.2 are applied to a gate 25–1. The output of gate 25–1 is connected to one input of gates 25–2, 25–3 and 25–4.

Gate 25–2 is further conditioned by the signal $\overline{\text{WC–I}}$ and the gating signal TC6.2 and when all inputs are positive this gate produces a negative output signal that is applied through an inverter 25–5 to one input of each of the gates 25–6 and 25–7. Gate 25–6 is further conditioned by phase 4 clock pulses so that the command Clear S is produced at time 6.4 of a sequence.

The command Clear S is produced at 6.4 of each sequence except the WC sequence and the RC–II sequence. During the WC sequence the signal $\overline{\text{WC–I}}$ is negative. This causes gate 25–2 to produce a positive output signal that is inverted at 25–5 to block gate 25–6. During the RC–II sequence the signals RC–1 and Pass II–1 are both positive. The gating signal TC6.2 conditions the third input of gate 25–1 and this gate produces a negative output signal that passes through 25–2 and 25–5 to block gate 25–6.

The signals R/W–1 and EI as well as the gating signal TC6.2 are applied to the inputs of the gate 25–8. The output of this gate is applied to one input of gates 25–3, 25–4 and 25–9. Gate 25–4 is connected to one input of the gate 25–10 and gate 25–9 is connected to one input of the gate 25–11. Gates 25–10 and 25–11 are further conditioned by phase one clock pulses so that the commands Set S00 and V to S are produced at time 1.1 of a sequence.

The commands Set S00 and V to S are both produced on each R/W sequence resulting from an external interrupt. The gate 25–8 produces a negative output signal that is inverted at 25–4 to condition gate 25–10 and inverted at 25–9 to condition the gate 25–11.

The command Set S00 is also produced at time 1.1 of each RC–II sequence. In this case gate 25–1 produces a negative output signal that is inverted at 25–4 to condition the gate 25–10 so that upon occurrence of the phase 1 clock pulse the gate produces the command Set S00.

The command V to S is also produced at time 1.1 of each RC–I sequence. The signals RC–1 and Pass 1–1 are applied to a gate 25–12. The resulting negative output signal is fed through an inverter 25–13 to one input of a gate 25–14. This gate is further conditioned by the TC6.2 gating signal and thus produces a negative output signal that is applied to the gate 25–9. This causes the gate 25–9 to produce a positive output signal to condition the gate 25–11 so that it produces the command V to S at time 1.1.

The command V to S is also generated during each I sequence if the Interrupt Request Flip-Flop is set. The signals I–1 and Interrupt Request as well as the gating signal TC6.2 are applied to a gate 25–15. When all inputs are positive this gate produces a negative output signal which is applied to the gate 25–9. This causes gate 25–9 to produce a positive output signal to condition gate 25–11 so that it produces the command V to S at time 1.1.

When an external interrupt takes place it is an indication that some abnormal condition exists in the external device. In accordance with the present invention either one or two R/W sequences are performed depending upon whether the interrupt is requested over a channel set for the single mode or dual mode of operation. After the last R/W cycle is performed the present invention enters into an I sequence during which a special Jump Instruction is selected from the memory. This Jump instruction causes the data processing unit to first store the content of the P register and then enter into a sub-routine to analyze the abnormal condition.

The special Jump instruction is addressed during the I sequence as a result of the command V to S which is produced when the output of gate 25–15 goes negative. This occurs at time 1.1 of an I sequence which is the normal time for the transfer of the address of the next sequential instruction from the P register to the S register. As subsequently described with reference to FIGURE 29 the command P to S is inhibited on the first I sequence following an external interrupt.

The command Adder to S is produced during each R/W sequence which results from either an input request or an output request. The signals R/W–1 and the gating signal TC6.2 are applied to the gate 25–3 which also receives output signals from the gates 25–1 and 25–8. The output of 25–3 is connected through an inverter 25–19 to one input of the gate 25–7. Gate 25–7 also receives output signals from the inverter 25–5 and phase 1 clock pulses over the lead 25–20. The command Adder to S is produced as follows. During the R/W sequence the signal RC–1 is negative thus causing the output of gate 25–1 to be positive. This conditions one input of each of the gates 25–2 and 25–3. The signal $\overline{\text{WC–1}}$ is positive and conditions a second input of the gate 25–2 so that at time 6.2 this gate begins producing a negative signal. This signal is inverted at 25–5 and conditions one input of the gate 25–7. The signal R/W–1 is positive and conditions a second input of the gate 25–3. If the R/W sequence is not the result of an external interrupt then the output of gate 25–8 is positive to condition the third input of the gate 25–3 so that the gate begins producing a negative output signal at time 6.2. This signal is inverted at 25–19 and conditions the second input of the gate 25–7. At time 1.1 the phase 1 clock pulse conditions the third input of gate 25–7 and it produces the command Adder to S.

*D register control*

The circuits for controlling the entry of information into the D register are shown in FIGURE 26. These circuits control the clearing of the D register, the transfer of the complement of the value in the X register to the D register, or the entry of the value +1 or −1 into the D register.

The circuits for clearing the D register include a plurality of gates 26–1 through 26–6, an Or-inverter 26–7 and an inverter 26–8. Gate 26–1 receives the signals Pass I–2 and RC–1 and has an output connected to one input of the gate 26–2. Gate 26–2 also receives the signal $\overline{\text{WC–1}}$. The output of gate 26–2 is applied to one input of gates 26–3 which also receives the gating signal TC3.2. The output of gate 26–3 is applied to Or-inverter 26–7. The gate 26–4 receives the signal $\overline{\text{I–1}}$ and signals on the leads 26–9 and 26–10. The output of gate 26–4 is applied to the gate 26–5 which also receives the signal $\overline{\text{R/W–2}}$ and the gating signal TC6.2. The output of gate 26–5 is applied to a second input of Or-inverter 26–7. The output of 26–7 is applied through inverter 26–8 to one input of gate 26–6. The gate 26–6 is further conditioned by phase 4 clock pulses.

The command Clear D is produced at 3.4 of each RC–I sequence. With both inputs positive the gate 26–1 produces a negative output signal that is inverted at 26–2 and applied to one input of gate 26–3. The output of 26–3 becomes positive upon occurrence of the gating signal TC3.2. The positive output from 26–3 is inverted at 26–7, inverted again at 26–8 and conditions one input of the gate 26–6. At time 3.4 a phase 4 clock pulse conditions gate 26–6 and it produces the command Clear D.

The command Clear D is also produced during each WC sequence. The negative signal $\overline{\text{WC–1}}$ is inverted at 26–2 and applied to gate 26–3 where it is mixed with the gating signal TC3.2. The positive output signal from 26–3 is inverted at 26–7, inverted again at 26–8, and applied to the gate 26–6 where it is mixed with the phase 4 clock pulse to produce the command Clear D at time 3.4.

The command Clear D is also produced during each I sequence. The negative signal $\overline{\text{I–1}}$ is inverted at 26–4 and applied as a positive signal to one input of the gate 26–5. The signal $\overline{\text{R/W–2}}$ is positive at this time and it is applied to a second input of the gate 26–5. Upon occurrence of the gating signal TC6.2 the gate 26–5 produces a positive output signal that is inverted at 26–7, inverted again at 26–8 and applied as a positive signal to one input of the gate 26–6. At time 6.4 a phase 4 clock pulse conditions gate 26–6 and it produces the command Clear D.

The command Clear D is also produced at time 6.4 of each WC sequence. During this sequence one of the leads 26–9 or 26–10 is negative depending upon the sign of the value in the X register. This negative signal is inverted at 26–4 and applied to one input of the gate 26–5. The signal $\overline{\text{R/W–2}}$ is positive so that during the occurrence of the gating signal TC6.2 the gate 26–5 produces a positive output signal. This signal is inverted at 26–7, inverted again at 26–8, and applied to the gate 26–6 where it is mixed with the phase 4 clock pulse to produce a command Clear D at time 6.4.

The circuits for generating the command Set D00 include gates 26–11 and 26–12 and inverters 26–15, 26–16, 26–17 and 26–13.

For reasons which are subsequently explained, it is necessary to set D00 during WC or R/W cycles if the sign of the value in the X register is positive. The signal X+ from the set output terminal of X17 and the signal R/W+WC from the sequence controls are applied to the inputs of gate 26–11. With both inputs positive the gate produces a positive output signal that is inverted at 26–15, inverted again at 26–16, and applied to one input of gate 26–12. Gate 26–12 is further conditioned by the gating signal TC6.4 so that it produces a positive output signal. The output of gate 26–12 is inverted at 26–17 and inverted again at 26–13 to become the command Set D00. Therefore, the command Set D00 sets the low order stage of the D register at time 1.3 of each WC or R/W sequence if the sign of the value in the X register is positive.

The complement of the value in the X register (X′) is entered into the D register during each RC–I sequence. This places the complement of the terminal control in the D register so that during the next sequence RC–II it may be added to the true value of the current control to determine if the two are equal. If the two are equal the adder produces an output signal which terminates the input/output operation for the specified channel.

The output of gate 26–1 is connected through an inverter 26–18 to one input of a gate 26–19. Gate 26–19 also receives the gating signal TC3.4. The output of gate 26–19 is connected through an inverter 26–20 to an inverter 26–21 and a gate 26–22. The output of gate 26–22 is connected to one input of each of the gates 26–23 and 26–24.

The output of gate 26–24 is the command X′ to D. The output of gate 26–23 is applied through an Or-inverter 26–25 to one input of a gate 26–26. The output of inverter 26–21 is applied to a gate 26–27 which in turn has its output connected to a second input of the gate 26–26. The output of gate 26–26 is the command X, X′ to D00.

The complement of the value in the X register is entered into the D register in the following manner. During an RC–I sequence both inputs to 26–1 are positive and the gate produces a negative output signal that is inverted at 26–18 to condition one input of the gate 26–19. The second input of gate 26–19 is conditioned from 3.4 through 4.3 by the gating signal TC3.4 and thus produces a positive output signal. This signal is inverted at 26–20, inverted again at 26–22 and conditions one input of the gate 26–24. At time 4.3 of the RC–I sequence a phase 3 clock pulse conditions a second input of gate 26–24 and it produces the positive command X′ to D.

As explained with reference to FIGURE 19, the command X′ to D gates the complement of the value in X01 through X17 into the corresponding stages of the D register. The complement of the value in X00 is entered into D00 as follows. The positive output signal from gate 26–22 conditions one input of the gate 26–23. If stage X00 contains a binary zero the signal X00 is negative and blocks the gate 26–23 causing it to produce a negative output signal. As will be shown subsequently, the output of gate 26–35 is alway negative at this time. With both inputs negative Or-inverter 26–25 produces a positive output signal to condition one input of the gate 26—26. The positive output of gate 26–19 is inverted at 26–20, inverted again at 26–21 and conditions one input of the gate 26–27. At time 4.3 a phase 3 clock pulse conditions the second input of gate 26–27 and it produces a positive output signal to condition the second input of gate 26—26. At this time the gate 26—26 produces the positive command X, X′ to D00.

If the low order stage had contained a binary one then the signal X00 would have been positive to condition the second input of gate 26–23. The resulting positive output signal from 26–23 after inversion in Or-inverter 26–25 would have blocked gate 26—26 to prevent the generation of the command X, X′ to D00. This would have effectively caused the entry of a binary zero into stage D00.

In accordance with the present invention it is sometimes necessary to subtract the value 1 from the value in the X register. This is accomplished by entering a −1 in the D register and then adding the contents of the X and the D register in the adder. If the value in the X register has a negative sign it is an indication that the value −1 should be entered into the D register.

A gate 26–28 receives the signal X— from the set output terminal of X17 and the signal R/W+WC. The output of gate 26–28 is connected through a pair of inverters 26–29 and 26–30 to one input of a gate 26–31. This gate is further conditioned by the gating signal TC6.4. The output of gate 26–31 is connected through an inverter 26–32 to one input of the gate 26–22. The output of inverter 26–32 is connected through an inverter 26–33 to one input of a pair of gates 26–34 and 26–35. Gate 26–34 is further conditioned by phase 3 clock pulses and its output is the positive command X to D.

The value −1 is entered into D register in the following manner. If the sign of the value in the X register is minus and the device is in either an R/W or a WC sequence both inputs to gate 26–28 are positive. The positive output from this gate is inverted at 26–29, inverted again at 26–30 and conditions one input of gate 26–31. The gating signal TC6.4 conditions the second input of gate 26–31 from 6.4 through 1.3 of the sequence and the gate produces a positive signal. This signal is inverted at 26–32, inverted again at 26–33 and conditions one input of gate 26–34. At time 1.3 a phase 3 clock pulse conditions a second input of gate 26–34 and it produces a positive command X to D. This command conditions a set of read-in gates in the D register so that the true value in stages 01 through 17 of the X register is entered into the corresponding stages of the D register.

The positive output signal from gate 26–31 is inverted at 26–32, inverted again at 26–22 and conditions one input of the gate 26–24. At time 1.3 a phase 3 clock pulse conditions a second input of this gate and it produces the positive command X′ to D. As explained previously, this command gates the complement of the value in stages 01 through 17 of the X register into the corresponding stages of the D register.

From the above description it is seen that the commands X to D and X′ to D are both generated at 1.3 of an R/W or a WC sequence if the sign of the value in X is minus. The simultaneous occurrence of both commands has the effect of entering a binary one into each of the stages D01 through D17. At time 1.3 the gating signal TC3.4 is negative and thus blocks gate 26–19. The negative output from gate 26–19 blocks gate 26–27 which in turn produces a negative output signal to block gate 26—26. This prevents the occurrence of the command X, X′ to D00 thus permitting stage D00 to remain in the reset state. The sum result is that binary ones are entered into all except the low order stage of the D register with a zero being entered into the low order stage. This gives a binary representation of the value −1.

*Z register controls*

The Z register control circuits are shown in FIGURE 27. These circuits control the clearing of the Z register as well as the entry of information therein.

The command Clear Z is generated at 6.4 of each sequence. The gating signal TC6.2 is applied to one input of gate 27–1 where it is mixed with the phase 4 clock pulse to produce the positive command Clear Z.

The command Adder to Z occurs at 3.1 of each WC sequence. The gating signal TC2.2 is applied to one input of the gate 27–2 which is further conditioned by the signal WC–2. When both signals are positive gate 27–2 produces a positive output signal that is applied to one input of a gate 27–3. This gate is further conditioned by phase 1 clock pulses and when both inputs are positive the gate 27–3 produces the positive command Adder to Z.

The command I/O to Z is generated during each R/W sequence if either an input request or an external interrupt is being performed. The negative signal $\overline{R/W \cdot IN}$ is applied to an inverter 27–4 which has its output connected to one input of a gate 27–5. This gate is further conditioned by TC1.4 gating signals and phase 2 clock pulses so that it produces the command I/O to Z at time 2.2 of the R/W sequence.

The signal $\overline{R/W \cdot IN}$ is also applied to one input of a gate 27–6. This gate also receives the signal WC–1. When both of its inputs are positive the gate 27–6 produces a negative output signal which is applied through an inverter 27–7 to one input of a gate 27–8. The gate 27–8 is further conditioned by TC2.2 gating signals. Therefore, the gate 27–8 produces the command Memory to Z only when both inputs to gate 27–6 are positive. Stated differently, the command Memory to Z is generated from 2.2 through 3.1 of each I sequence and RC sequence, and also during and R/W sequence resulting from an output request.

*Adder control*

The adder employed in the present invention may be of the type disclosed in copending application Serial No. 193,472 filed May 9, 1962, now U.S. Patent 3,192,367. It employs a half subtractor which half subtracts the ones complement of the value in the X register from the value in the D register to develop a series of sum digits and a series of borrow digits. The sum and borrow digits are then applied to a borrow pyramid where the borrows are propagated to the left and end around. Each borrow propagates to the left up to and including the first position where the sum digit is a binary one. The output of the borrow pyramid is then half added to the sum digits to produce the resultant sum. Consider the example where +3 is added to +1.

| | $2^4$ | $2^3$ | $2^2$ | $2^1$ | $2^0$ | |
|---|---|---|---|---|---|---|
| | 0 | 0 | 0 | 0 | 1 | +1=D register |
| | 1 | 1 | 1 | 0 | 0 | −3=complement of X register |
| Example 1 | | | | | | |
| | 1 | 1 | 1 | 0 | 1 | Sum digits |
| | 1 | 1 | 1 | 0 | 0 | Borrow digits |
| | 1 | 1 | 1 | 0 | 1 | Sum digits |
| | 1 | 1 | 0 | 0 | 1 | Borrow pyramid |
| | 0 | 0 | 1 | 0 | 0 | Sum=4 |

In the above illustration the complement of the value +3 is half subtracted from the value +1 to give the sum digits (11101) and the borrow digits (11100). The borrow digit in position $2^2$ moves to the left one position before it finds a one in the sum. The borrow digit in position $2^3$ moves to the left one position before it finds a one in the sum. The borrow digit in position $2^4$ is propagated end around and finds a one in stage $2^0$ of the sum. The sum digits (11101) and the output of the borrow pyramid (11001) are then half added to produce the sum.

Consider now the following example where the value of −3 is added to −1.

| | $2^4$ | $2^3$ | $2^2$ | $2^1$ | $2^0$ | |
|---|---|---|---|---|---|---|
| | 1 | 1 | 1 | 1 | 0 | 1=D register |
| | 0 | 0 | 0 | 1 | 1 | +3=complement of X register |
| Example 2 | 1 | 1 | 1 | 0 | 1 | Sum digits |
| | 0 | 0 | 0 | 0 | 1 | Borrow digits |
| | 1 | 1 | 1 | 0 | 1 | Sum digits |
| | 0 | 0 | 1 | 1 | 0 | Borrow pyramid |
| | 1 | 1 | 0 | 1 | 1 | Sum=4 |

In this example the complement of −3 (00011) is half subtracted from the value of −1 (11110) to obtain the sum digits (11101) and the borrow digits (00001). The borrow digit in position $2^0$ moves to the left through position $2^1$ to position $2^2$ before it finds a one in the sum digits. Thus, the borrow pyramid produces a binary one signal in positions $2^1$ and $2^2$. These borrow signals are then half-added to the sum digits to produce the sum.

Example 1 above is a typical example of the manner in which a current control word is modified when its sign is plus and the device is operating in the single channel mode. The positive sign of the current control word indicates it should be incremented. Since the single channel mode is operative the current control word is to be incremented by one.

The current control word is entered into the X register and its sign position sampled. The resulting signal is applied to the D register controls which then produce the the command set D00. This enters the value +1 into the D register. The values in X and D are continuously applied to the adder so the adder continuously presents the sum of X and D at its output. At time 3.1 of the WC sequence the command Adder to Z to gates the sum to the Z register for storage in the memory.

Example 2 above is a typical example of the manner in which a current control word is modified when its sign is minus and the device is operating in the single channel mode. The negative sign of the current control word indicates it should be decremented. Since the single channel mode is operative the current control word is to be decremented by one.

The current control word is entered into the X register and its sign position sampled. The resulting signal is applied to the D registerf controls which then produce the commands X to D and X′ to D. As explained previously, this causes the value minus one to appear in the D register. The Adder forms the sum of the values in the X and D register and at time 3.1 of the WC sequence the sum is gated to the Z register for storage.

When a particular channel is operating in the dual mode it is necessary to either increment or decrement the current control word by a value of 2 depending upon whether the sign of the current control word is positive or negative. This is accomplished by entering either a +1 or a −1 into the D register as described above and adding it to the current control word applied to the Adder from the X register with one of the flip-flops shown in FIGURE 28 being set. These flip-flops operate to effectively add or subtract one from sum of the values in the X and D registers.

As indicated in Example 1, there is always an end around borrow when two positive numbers are added. A binary one may be effectively added to the sum or the values in the X and D registers by inhibiting this end around borrow at the time the sum digits are half-added to the output of the borrow pyramid. Consider again Example 1.

| With EAB | EAB Inhibited | |
|---|---|---|
| 11101 | 11101 | Sum digits |
| 11001 | 11000 | Borrow Pyramid |
| 00100=4 | 00101=5 | Sum |

Example 2 shows that there is never an end around borrow when two negative numbers are added. A binary one may be subtracted from the sum of the values in the X and D registers by inserting an artificial end around borrow at the time the sum digits are half-added to the output of the borrow pyramid. Consider again Example 2.

| Without EAB | With EAB | |
|---|---|---|
| 11101 | 11101 | Sum digits |
| 00110 | 00111 | Borrow Pyramid |
| 11011=−4 | 11010=−5 | |

A current address is modified by +2 or −2 only if the device is operating in the dual mode. The modification occurs during the WC sequence. The signals Dual and WC–1 are applied to a pair of gates 28–1 and 28–2 together with a TC6.4 gating pulse. If the current control word is to be incremented the lead 28–3 is positive and the gate 28–1 produces a negative output signal. This signal is inverted in an inverter 28–4 and applied to a gate 28–5. This gate is further conditioned by $\phi 2$ clock pulses and at time 1.2 produces a positive output signal to set the flip-flop 28–6. When the flip-flop is set, the negative signal from the set output terminal inhibits the end around borrow.

If the current control word is to be decremented the lead 28–7 is positive and the gate 28–2 produces a negative output signal. This signal is inverted in an inverter 28–8 and applied to a gate 28–9. This gate is further conditioned by $\phi 2$ clock pulses and at time 1.2 produces a positive output signal to set the flip-flop 28–10. When the flip-flop is set the negative signal from the set output terminal causes an artificial end around borrow to be inserted into the borrow circuits.

The gates 28–11 and 28–12 are provided for clearing flip-flops 28–6 and 28–10, respectively. A TC2.4 gating signal is applied to the gates 28–11 and 28–12 during each sequence. The gates are further conditioned by $\phi 2$ clock pulses and thus produce positive output signals at 3.2 of each sequence to reset the flip-flops.

*I sequence timing chain*

FIGURE 29 shows the timing chain for controlling the transfer of an instruction address from the P register to the S register and incrementing the instruction address by one to obtain the address of the next instruction. Therefore, this timing chain is normally active during the I sequence when an instruction is being withdrawn from memory and the address of the next instruction is being computed. This timing chain is not operative during the first I sequence following an external interrupt. The reason is that during this I sequence a Jump Instruction is withdrawn from memory so that the data processing unit may jump to an instruction address which is out of the normal sequence of instruction addresses and this begin a sub-routine to analyze the code word stored during the external interrupt operation.

During the first I sequence following initiation of an external interrupt operation the Interrupt Request Flip- Flop in FIGURE 5d is set and thus applies a negative signal to gate 29–1. The gate produces a positive output signal that is inverted at 29–2 and applied to one input of gate 29–3. This prevents the positive commands P to S and Set D00 from being generated and also prevents the timing chain from being started.

On an I sequence which does not follow an external interrupt the signals I–1, TC6.4 and $\overline{\text{I}}$nterrupt Request are all positive. Gate 29–1 produces a negative output signal that is inverted at 29–2 to condition one input of gate 29–3. The output of inverter 29–2 is applied to one input of a gate 29–4 which also receives phase 1 clock pulses. At time 1.1 of the I sequence gate 29–4 produces the positive command P to S.

The output of inverter 29–2 becomes the command Set D00. This command is applied to the D register where it is mixed with a phase 3 clock pulse to reset the D register at time 1.3 of the I sequence.

The output of gate 29–3 is connected to the set input terminal of a flip-flop 29–5 which has a set output terminal connected to one input of a gate 29–6 and a reset output terminal connected to one input of a gate 29–7. Gates 29–6 and 29–7 are connected to the reset and set input terminals, respectively, of a flip-flop 29–8. The set output terminal of this flip-flop is connected to a gate 29–9 and the reset output terminal is connected to a gate 29–10. Gates 29–9 and 29–10 are connected to the reset and set input terminals, respectively, of a flip-flop 29–11. The reset output terminal of this flip-flop is connected to gates 29–12 and 29–13.

The reset output terminal of flip-flop 29–8 is connected to one input of a gate 29–14 which in turn has its output connected to the reset input terminal of flip-flop 29–5. The reset output terminal of flip-flop 29–5 is connected to each of the gates 29–15 and 29–16.

Phase 1 clock pulsese are applied to gates 29–4, 29–6, 29–7 and 29–15. Phase 2 clock pulses are applied to gates 29–3, 29–13 and 29–14. Phase 3 clock pulses are applied to the gate 29–12. Phase 4 clock pulses are applied to the gates 29–9, 29–10 and 29–16.

As soon as the data processing unit enters an I sequence all inputs to gate 29–1 are positive if the Interrupt Request Flip-Flop is not set. The gate produces a negative output signal that is inverted at 29–2 and conditions one input of gate 29–4. At time 1.1 of the I sequence a phase 1 clock pulse conditions the gate and it produces the command P to S. This transfers the address of the present instruction from the P register to the Memory Address register.

The output of inverter 29–2 is the command Set D00. This command is applied to the D register where it is mixed with a phase 3 clock pulse to set the low order stage of the D register at time 1.3.

From 6.4 through 1.3 of the I sequence the output of inverter 29–2 conditions one input of gate 29–3. At time 1.2 a phase 2 clock pulse passes through this gate to set flip-flop 29–5. The resulting positive output off the reset output terminal of this flip-flop conditions one input of each of the gates 29–15 and 29–16. At time 1.4 a phase 4 clock pulse passes through gate 29–16 to produce the command Clear X. At time 2.1 a phase 1 clock pulse passes through gate 29–15 to transfer the present instruction address from the P register to the X register.

The positive output off the reset output terminal of flip-flop 29–5 conditions one input of gate 29–7 and at time 2.1 a phase 1 clock pulse passes through this gate to set flip-flop 29–5. The resulting positive output off reset output terminal of this flip-flop conditions one input of gate 29–10 and at time 2.4 a phase 4 clock pulse passes through this gate to set flip-flop 29–11. When flip-flop 29–11 is set the positive output signal off the reset output terminal conditions the gates 29–12 and 29–13.

At time 3.2 a phase 2 clock pulse passes through gate 29–13 to produce the command Clear P. With the value 1 having been set into the D register at time 1.3 and the value of the current instruction address entered into the X register at time 2.1, the sum of these values is available at the output of the adder. At time 3.3 a phase 3 clock pulse passes through gate 29–12 to become the command Adder to P. This gates the next instruction address from the Adder into the P register where it is stored until the next I sequence.

Flip-flops 29–5, 29–8 and 29–11 are reset in the following manner. When flip-flop 29–8 is set at time 2.1 the positive signal off the reset output terminal conditions gate 29–14 and at time 2.2 a phase 2 clock pulse passes through this gate to reset flip-flop 29–5. The resulting positive output signal from the set output terminal of flip-flop 29–5 conditions one input of gate 29–6 and at time 3.1 a phase 1 clock pulse passes through this gate to reset output terminal of this flip-flop conditions one input terminal of this flip-flop conditions one input of gate 29–9 and at time 3.4 a phase 4 clock pulse passes through this gate to reset flip-flop 29–11.

Referring now to FIGURE 30, gate 30–1 receives the signal I–2, the TC2.4 gating signal, and phase 2 clock pulses. At time 3.2 of every I sequence the gate produces a positive output signal to set a flip-flop 30–2. The resulting positive signal at the reset output terminal of this flip-flop is applied to one input of each of the gates 30–3 and 30–4. Gate 30–3 is further conditioned by phase 4 clock pulses and at time 3.4 of each I sequence this gate produces the commands Clear D and Clear Instruction register.

Gate 30–4 is further conditioned by phase 1 clock pulses and at time 4.1 of each I sequence this gate produces the command Z to Instruction register. This command transfers an instruction from Z to the Instruction Register. If this is a normal I sequence this instruction is the one stored at the address specified by the value transferred from P to S as a result of the output signal produced by gate 29–4. If this is an I sequence resulting from an External Interrupt operation then the instruction transferred from Z to the Instruction Register is a Jump Instruction which comes from a fixed address assigned to the particular channel which requested the External Interrupt.

The positive output signal from the reset side of flip-flop 30–2 also becomes the command Clear X=D'. This command is applied to the I/O control circuits where it resets the X=D' flip-flop.

Flip-flop 30–2 is reset as follows. When the flip-flop is set, the positive signal off the reset output terminal conditions one input of a gate 30–5. This gate is further conditioned by phase 4 clock pulses and at time 3.4 produces a positive output signal to set flip-flop 30–6. The resulting positive signal at the reset output terminal of flip-flop 30–6 conditions one input of a gate 30–7. At a time 4.2 a phase 2 clock pulse passes through gate 30–7 to reset flip-flop 30–2. When the flip-flop is reset the positive signal at its set output terminal conditions one input of a gate 30–8. This gate is further conditioned by phase 4 clock pulses and at time 4.4 of the I sequence it produces a positive output signal to reset flip-flop 30–6.

*Typical Operations*

Several typical operations will now be described in conjunction with the timing diagrams shown in FIGURES 33 through 37. In these examples several assumptions are made. First, it is assumed that all input and all output channels have been previously activated by performing the special instructions which (1) load the terminal control words and starting control words for each channel into the addresses specified in Table I and (2) turn on the In Active and Out Active register stages for all channels. This assumption is made for ease of explanation of the primary features of the invention, it being understood that in actual practice the channels may be activated in any desired combination.

Second, it is assumed that the values of the current control words and terminal control words for each channel are such that in the examples they are never equal and thus never turn on the X=D flip-flop or render a channel inactive.

Third, it is assumed that the scan sequence is a sequence during which the scan timing chain (FIG. 4) goes through a cycle and the sequence controls (FIG. 3) are in condition to begin an RC or an R/W sequence. These conditions have been previously explained.

Fourth, it is assumed that the proper Input Request, Output Request or External Interrupt signal has been received before the Scan sequence begins and the proper One-Shot register stages have been set.

Finally, it is assumed that all requests are received from the device connected to channel 7.

Referring to FIGURES 33 through 37, it is seen that in addition to the Scan sequence the timing diagrams are divided into a plurality of sequences designated RC, WC, R/W and I. These sequences are defined by the flip-flops of the lower rank of FIGURE 3 and thus begin at time 6.4. The RC and R/W sequences are further defined as RC–I, RC–II, R/W–I and R/W–II. An RC–I sequence is one in which the RC–2 flip-flop (FIG. 3) is set and flip-flop 5–18 is reset. An RC–II sequence is one in which the RC–2 flip-flop is set and flip-flop 5–18 is also set. An R/W–I sequence is one in which the R/W–2 flip-flop (FIG. 3) is set and flip-flop 5–18 is reset. An R/W–II sequence is one in which the R/W–2 flip-flop is set and flip-flop 5–18 is also set.

Figure 33A:
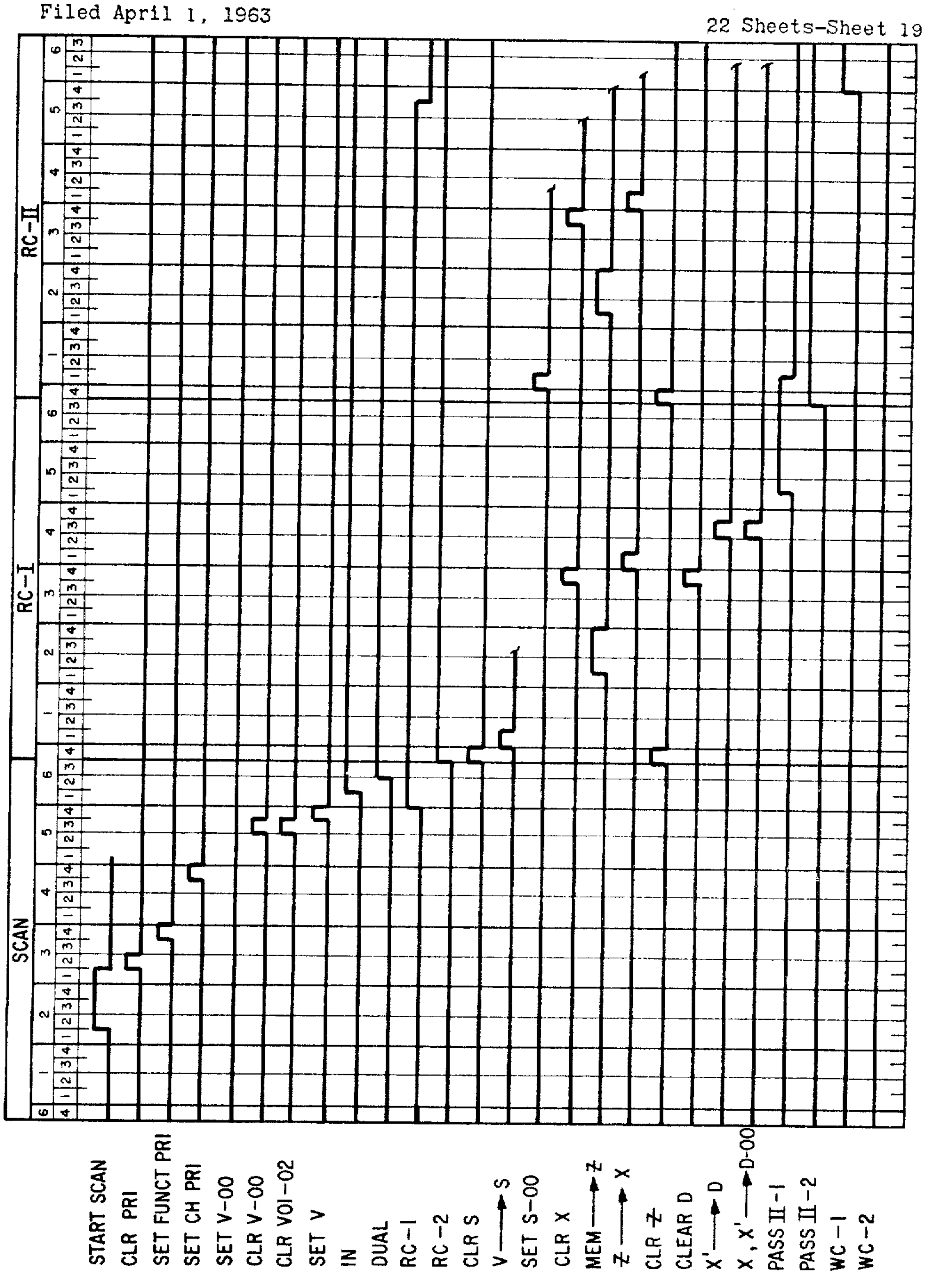
Figure 33B:
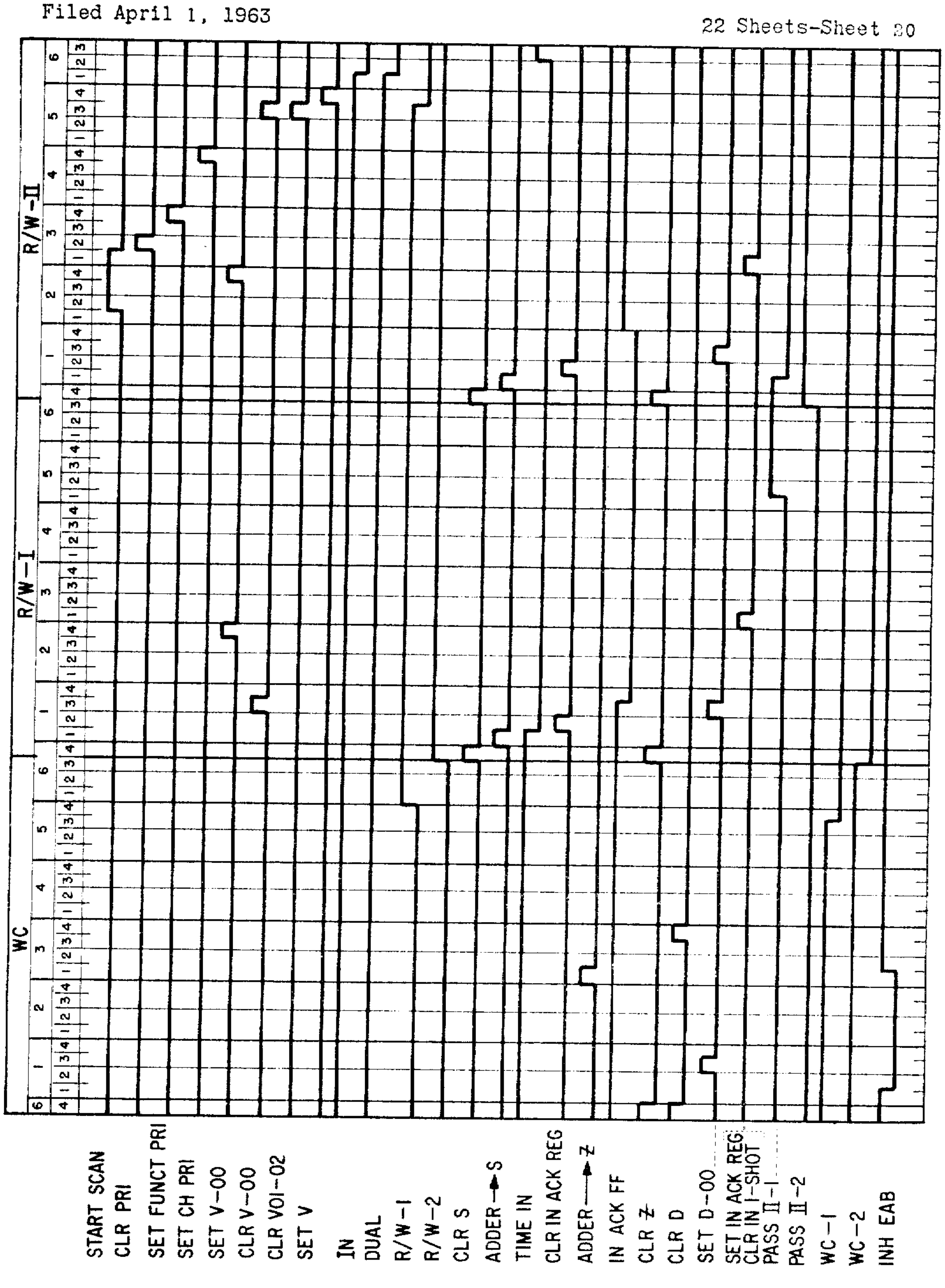

*Case I.*—FIGURES 33*a* and 33*b* illustrate the timing of certain signals when an input request is performed in the dual mode and incoming data is being stored at ascending memory addresses. Channels 6 and 7 are set up for the dual mode by closing switch S7 in FIGURE 5*d*.

The Scan Timing Chain is started at time 2.4 of the Scan sequence. The circuit is from 5–104 through 5–106 and 4–2 to set flip-flop 4–1. At time 3.2 the function priority and channel priority flip-flops are cleared. The circuit is from the zero side of flip-flop 4–1 through 5–107 and gates 13–3 through 13–5 to reset the function priority flip-flops and from 5–107 to the channel priority flip-flops.

At time 3.4 the In Function Flip-flop is set. The circuit is from stage 2 of the Scan Chain through 4–4 and 13–7 to the In Flip-Flop. At time 4.4 all stages of the Channel Priority register except stage 07 are set. The circuit is from the zero side of the In Flip-Flop through 13–6, 13–26, 13–27 and gates 14–3 to the set input terminals of stages 00 through 06. The signal CH-7 In Request is negative to prevent stage 07 of the Channel Priority register from being set.

At time 5.3 the V register is cleared. The circuit is from stage 5 of the Scan Chain through 5–23 and 5–25 to reset the stage V00 and from 5–23 through 5–24 to reset stages V01 and V02. At time 5.4 of the scan cycle the value 111 is entered into the V register from the channel priority circuits. The circuit is from stage 6 of the scan chain through 4–5 and gates 15–22 through 15–24 to the set input terminals of V00 through V02. When all stages of the V register are set the V translator gate 15–12 produces the signal CH–7 to select channel 7.

At time 6.1 of the scan sequence flip-flop RC–1 of FIGURE 3 is set. The circuit is as follows. From the zero side of the In Flip-Flop through 13–16 and 13–17 to condition one input of 5–87 and from the zero side of flip-flop 14–1 through 14–5, 14–8 and 14–14 to condition the second input of gate 5–87. With both inputs conditioned gate 5–87 conditions one input of 5–89 and a circuit is completed from the ones side of the In Flip-Flop through 5–91, 5–89, 3–27, 3–26 and 3–29 to the set input terminal of flip-flop RC–1.

At time 6.2 of the scan sequence the In/Out Flip-Flop is set to produce the signal In. The circuit is from stage 7 in the Scan Chain through 13–30, 13–31 and 13–18 to the reset input terminal of the In/Out flip-flop.

The Dual Mode Flip-Flop is cleared at time 6.2 by a circuit from stage 7 of the Scan Chain through 5–1 and 5–2 to the reset input terminal. As soon as the reset signal terminates the Dual Mode Flip-Flop is set by the signal CH–7 which passes through gate 5–6 to the set input terminal of the flip-flop.

At time 6.4 flip-flop RC–2 is set to begin the RC–I sequence. The circuit is from the zero side of flip-flop RC–1 through gate 3–13 to the set input terminal of flip-flop RC–2.

The S and Z registers are cleared at time 6.4 of the RC–I sequence. The circuit for clearing the Z register is from 27–1 to the reset input terminal of each stage of the Z register. The circuit for clearing the S register is from the zero side of flip-flop 5–15 through 25–1 to one input of 25–2, and from the one side of flip-flop WC–1 through 25–2, 25–5 and 25–6 to the reset input terminal of each stage of the S register.

At time 1.1 of the RC–I sequence the address of the terminal control word for input channel 07 is entered into the S register. As shown in Table I the seven low order bits of this address are 0111110. It is obtained as follows. From the one side of the In flip-flop through 13–15, 13–23, 13–24 and gate 20–4 of stage 5 to the set input terminal of S05. From the zero side of the In flip-flop a signal passes through 13–16, 13–25 and a gate 20–4 in stage 4 to the set input terminal of S04. With V02 set, the signal off the zero side of the flip-flop is applied through gate 20–4 of stage 3 to the set input terminal of S03. With V01 set a signal from the zero side of this flip-flop passes through gate 20–4 in stage 2 to set S02. With flip-flop V00 set a signal off the zero side of this flip-flop passes through gate 20–4 of stage 1 to set S01.

At time 2.2 of the RC–I sequence the terminal control word is read out of memory and placed in the Z register. The signals $\overline{R/W}\cdot\overline{IN}$ from FIGURE 5 and $\overline{WC-I}$ from FIGURE 3 are both positive and condition gate 27–6 which produces a signal that passes through 27–7 and 27–8 to gates 22–2 to condition these gates so that the terminal control word may be entered into the Z register from memory.

The next step is to enter the complement of the terminal control word into the D register. At time 3.4 the X and D registers are cleared. The circuit for clearing the D register extends from 26–1 through 26–2, 26–3, 26–7, 26–8, and 26–6 to the reset input terminal of the flip-flops in the D register. The circuit for clearing the X register extends from 24–1 through 24–5 and 24–3 to the set input terminal of each flip-flop in the X register.

At time 4.1 the terminal control word is entered into the X register by clearing each stage of this register where the corresponding stage of the Z register contains a binary zero. The circuit is from 24–1 through 24–4 and 24–2 to the read-in gates 19–2 in each stage of the X register.

At time 4.3 the complement of the value in stages X01 through X17 is entered into D01 through D17. The circuit is from 26–1 through 26–18, 26–19, 26–20, 26–22 and 26–24 to the gates 21–3 in stages D01 through D17. The complement of the value in stage X00 is entered into D00 at time 4.3. If X00 contains a binary zero gates 26–23 and 26–35 are both blocked and a signal passes from 26–25 through 26–26 to the set input terminal of D00. If stage X00 contains a binary one then this signal does not appear. At time 5.2 of the RC–I sequence flip-flop 5–15 is set to begin preparation for sequence RC–II. Gates 5–9 and 5–11 are both blocked at this time so the output 5–12 passes through 5–13 to set flip-flop 5–15. When flip-flop 5–15 is set the signal off the zero side of the flip-flop extends through 3–1, 3–2 and 3–3 to block gate 3–4 and prevent the resetting of flip-flop RC–1. This allows the RC–1 and RC–2 flip-flops to remain set for a second sequence. At time 6.4 flip-flop 5–18 is set to define the following sequence as a type II sequence.

At time 6.4 of the RC–II sequence the Z register is again cleared by the output from gate 27–1.

The address of the terminal control word was entered into the S register at time 1.1 of the RC–I sequence and has remained in the register since that time. In order to obtain the address of the current control word for input channel 7 all that is necessary is to increase the value in the S register by one. This is accomplished at time 1.1 of the RC–II sequence by a signal from the reset output terminal of flip-flop 5–15 which passes through 25–1, 25–4 and 25–10 to the set input terminal of S00. At time 2.2 the current control word is read out of memory and entered into the Z register. The circuit extends from 27–6 through 27–7 and 27–8 to the gates 22–2. Next, the X register is cleared and the current control word is transferred from Z to X so that it may be added to the complement of the terminal control word to see if the two are equal. The circuit for clearing X is from 24–1 through 24–5 and 24–3 to the set input terminal of each stage of the X register. The circuit for transferring Z to X is from 24–1 through 24–4 and 24–2 to the gates 19–2 in each stage of the X register.

At this time the complement of the terminal control word is contained in the D register and the true value of the current control word is contained in the X register. These two values are added together in the adder and if the terminal control word equals the current control word the adder produces the signal X=D′ for the purpose of inactivating the channel. It is assumed they are not equal.

Flip-flop 5–15 is reset at time 1.2 of the RC–II sequence. Therefore, at time 5.4 of the RC–II sequence the RC–1 flip-flop is reset. The circuit is through 3–1, 3–2, 3–3, 3–4 and 3–6 to the reset input terminal of the RC–1 flip-flop. At time 6.1 the RC–II sequence the WC–1 flip-flop is set. The circuit is from the zero side of flip-flop RC–2 through 3–21, 3–23, 3–10 to the set input terminal of flip-flop WC–1. At time 6.4 the RC–2 flip-flop is reset and the WC–2 flip-flop is set. This begins the WC sequence. The purpose of this sequence is to increment by two the current control word now contained in the X register and to store the modified current control word at the same address from which the original current control word was withdrawn.

The Z register is cleared at time 6.4 by the output from 27–1. The D register is cleared at time 6.4 by the circuit which extends from 26–11 through 26–15, 26–4, 26–5, 26–7, 26–8, and 26–6 to each stage of the D register. The value one is entered into the D register at time 1.3 of the WC sequence. The circuit extends from 26–11 through 26–15, 26–16, 26–12, 26–17, 26–13 and 21–7 to the set input terminal stage D00.

The addition of two to a current control word is accomplished by entering the value one into the D register and inhibiting the end around borrow as the sum of X and D is formed in the Adder. The Inhibit Borrow Flip-Flop is set at time 1.2 of the WC sequence. The circuit is from 28–1 through 28–4 and 28–5 to the set input terminal of the flip-flop.

At time 3.1 the output of the Adder is gated into the Z register. The circuit extends from 27–2 through 27–3 to the read-in gates 22–4 in each stage of the Z register. From the Z register the modified current control word is entered into the memory where it remains until another input request is received over channel 7.

The Inhibit Borrow Flip-Flop is reset at time 3.2 by the output from gate 28–11. The D register is cleared at time 3.4 by a signal which passes from gate 26–1 through 26–2, 26–3, 26–7, 26–8 and 26–6 to each stage of the D register.

The WC–1 flip-flop is reset at time 5.3 by a signal which passes from 3–1 through 3–2, 3–3, 3–4 and 3–7 to the reset input terminal of the flip-flop. The R/W–1 flip-flop is set at time 6.1 of the WC sequence. The output of WC–2 blocks gates 3–24 and 3–28 so that a signal passes from 3–29 through 3–11 to set R/W–1. The R/W–2 flip-flop is set and the WC–2 flip-flop is reset at time 6.4 to begin the R/W–1 sequence. During this sequence the eighteen bits of data on input channel 6 are stored in memory at the address specified by the current control word read out of memory during the RC–II sequence. This address was entered into the X register at time 4.1 of the RC–II sequence and has remained in that register unchanged.

*Case II.*—An input operation in the Dual Channel Mode with succeeding words being stored at addresses in descending order is performed in substantially the same manner as when the words are stored in addresses in ascending order.

The Scan, RC–I and RC–II sequences are performed in exactly the same manner as described for the preceding example. Furthermore, the WC, R/W–I and R/W–II sequences are quite similar to those described in the previous example but differ in the manner in which the current control word is modified and the sequence in which data on the even and odd channels is stored. These differences result from the fact that the sign of the current control word is minus rather than plus.

Figures 34A, 34B, 34C:
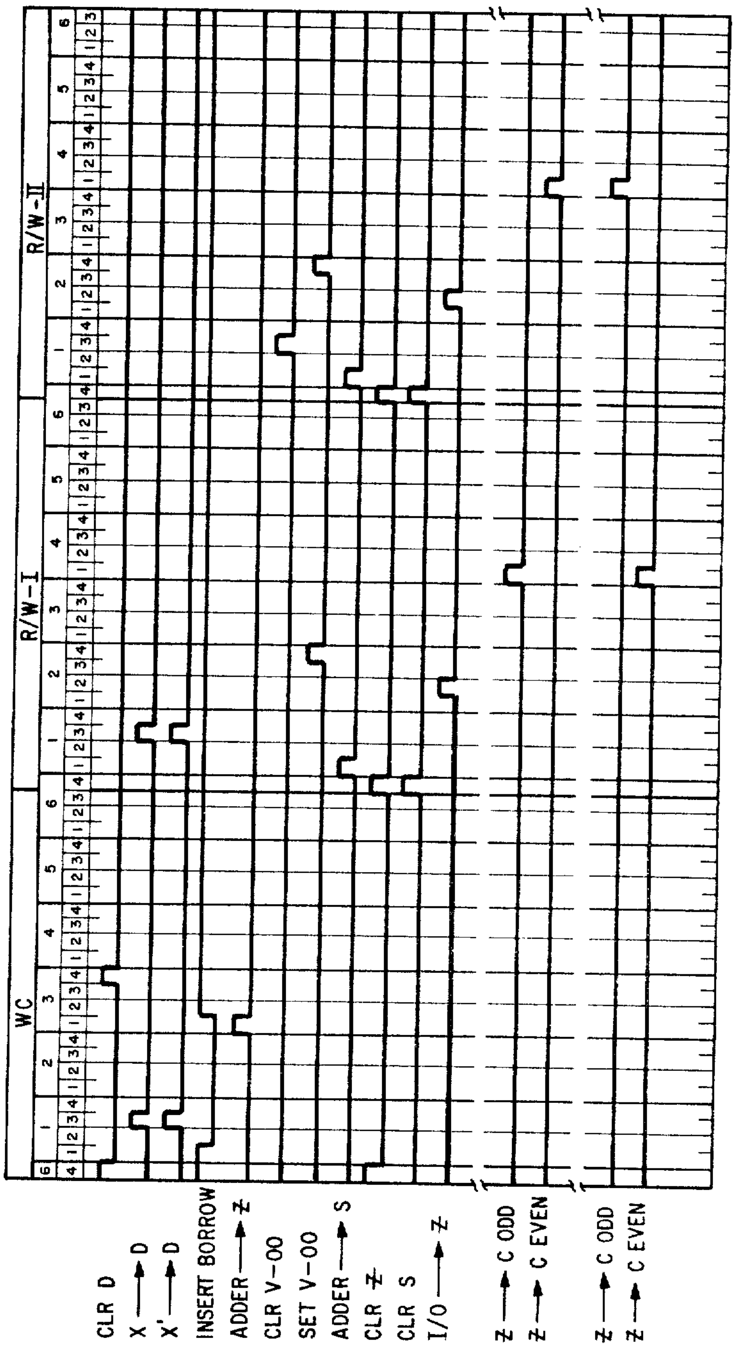

FIGURE 34*a* shows only those waveforms which are necessary for explaining these differences, it being understood that other pertinent waveforms are as shown in FIGURES 33*a* and 33*b*.

FIGURE 34*a* begins with the WC sequence. At this time the current control word is standing in the X register, having been entered therein at time 4.1 of the RC–II sequence. The objective of the WC sequence is to place the value −1 in the D register and add this value to the content of the X register in the Adder while inserting an artificial borrow so that the output of the Adder is two less than the value of the current control word.

The D and Z registers are cleared at time 6.4. The circuit for clearing the D register is from 26–11 through 26–15, 26–4, 26–5, 26–7, 26–8, and 26–6 to the reset input terminal of each stage of the D register. The output of gate 27–1 is applied to the reset input terminal of each stage of the Z register to clear this register.

The Insert Borrow Flip-Flop is set at time 1.2. The circuit is from 28–2 through 28–8 and 28–9 to the set input terminal of the flip-flop. The complement of the value in stages X01 through X17 as well as the true value in each of these stages is gated into the corresponding stages of the D register at time 1.3. The circuit from 26–28 through 26–29, 26–30, 26–31, 26–32, 26–22 and 26–24 to the gates 21–3 gates the complement of the value in X01 through X17 into the corresponding stages of the D register. The circuit from 26–28 through 26–29, 26–30, 26–31, 26–32, 26–33, and 26–34 to the gates 21–2 gates the true value in stages X01 through X17 into the corresponding stages of the D register. The signal X+ blocks gate 26–11 to prevent the generation of the signal Set D00. The gates 26–23 and 26–35 both have one input conditioned so that one of the signals X00 or $\overline{\mathbf{X00}}$ passes through one of these gates to prevent the signal X, X′ to D00 from being generated. These operations result in the value −1 being entered into the D register.

At time 3.1 the output of the Adder is gated into the Z register. The output of the Adder at this time is equal to the original current control word decremented by two. The circuit for gating the content of the Adder to the Z register is from 27–2 through 27–3 to the read-in gates 22–4 in each stage of the Z register. After the modified current control word is entered into the Z register a memory cycle takes place during which the current control word is stored in memory.

At time 3.2 the Insert Borrow flip-flop is reset and at time 3.4 the D register is cleared. The value of the unmodified current control word is still in the X register so that the output of the Adder is equal to this value.

At time 6.4 of the R/W–I sequence the S and Z registers are cleared. At time 1.1 of this sequence the current control word is gated through the Adder and into the S register. The circuit is from 25–3 through 25–19 and 25–7 to the read-in gates 20–3 in each stage of the S register.

The V translator has been producing a signal CH–7 since 5.4 of the Scan sequence. This signal conditions the drivers 18–9 so that the eighteen bits on input channel 7 are gated through the data input gtaes 18–1 to the read-in gates 22–3. At time 2.2 of the R/W–I sequence the command I/O to Z gates this data into the Z register. The circuit is from 5–55 through 27–4 and 27–5 to the read-in gates 22–3 in each stage of the Z register. After the data is entered into the Z register a memory cycle takes place during which the data is entered into the memory at the address specified by the current control word now contained in the S register.

At time 1.3 of the R/W–I sequence the value −1 is again entered into the D register by gating the true value and the complement of the value in X01 through X17 into the corresponding stages of the D register. At time 6.4 of the R/W–II sequence the S and Z registers are cleared. At time 1.1 of the R/W–II sequence the output of the Adder is gated into the S register. Since X contains the current control word and the D register contains the value −1, the value entered into the S register at this time is equal to the current control word decremented by one.

At time 1.3 of the R/W–II sequence the low order stage of the V register is cleared so that the V translator begins to produce the signal CH–6. The circuit for clearing V00 is from 5–32 through 5–34, 5–28, 5–29, 5–26, 5–23 and 5–25 to the reset input terminal of the reset input terminal of V00.

The signal CH–6 conditions the drivers 18–8 so that the data on input channel 6 is gated through these drivers and data input gates 18–1 to the read-in gates 22–3 in the Z register. At time 2.2 of the R/W–II sequence the command I/O to Z conditions gates 22–3 so that the data from channel 6 is entered into the Z register. A memory cycle then takes place during which the data from channel 6 is stored in the memory at the address specified by the value in the S register.

*Case III.*—FIGURES 33*a* and 33*b* may also be used to explain the case where channel 7 is set for the dual mode and data is being removed from consecutive memory addresses in ascending order in response to output resquests. Thus, the general sequence of events described for case I also holds for this case. The primary differences are as follows.

First, the Out Function Priority Flip-Flop is set instead of the In Function Flip-Flop. This occurs at time 3.4 when the Out Request signal is gated through 13–6 to the set input terminal of the Out Flip-Flop.

Second, the In/Out flip-flop 13–29 is set at time 6.2 so that it produces the Out rather than the In signal.

Third, because the Out Function Priority Flip-Flop is set the Function Priority circuits produce the signal Set S05 but dot not produce the signals Set S06 and Set S04. Therefore, during the RC–I sequence the terminal control word at address 0101110 is read out of memory and during the RC–II sequence the current control word at address 0101111 is read out of memory.

With these exceptions the Scan, RC–I, RC–II and WC sequences are the same for an output operation as for an input operation. The R/W–I and R/W–II sequences for output and input operations differ in the following ways.

First, it is the time Out Flip-Flop rather than the time In Flip-Flop which is reset at 1.2 of the R/W–I sequence and set at 6.3 of the R/W–II sequence.

Second, the Out Acknowledge register rather than the In Acknowledge register is cleared at time 1.2 and set at time 3.1 of each R/W sequence.

Third, the command I/O to Z is not generated but instead the commands Z to C Odd and Z to C Even are produced. FIGURE 34*c* shows the time at which these signals are generated.

As explained for case I, the unmodified current control word is entered into the S register at time 1.1 of the R/W–I sequence. Therefore, at time 4.1 of the R/W–I sequence a word is read out of memory from the address specified by the unmodified control word and is entered into the C Even register. The current control word is then incremented by one and the word at this address is entered into the C Odd register at time 4.1 of the R/W–II sequence. After the external device receives the Out Acknowledge signal it samples output channels 6 and 7 connected to C Even and C Odd, respectively.

*Case IV.*—The conditions which govern this case are as follows: Switch S–7 is set for the dual mode of operation, the sign of the current control word is minus to signify that the current control words are to be decremented, and an output request sets the Out Function Flip-Flop.

The Scan, RC–I and RC–II sequences are the same for this case as for case III. The WC sequence differs from case III in that the current control word is decremented rather than incremented by two before being returned to memory. FIGURE 34 shows the timing of the signals produced for decrementing the current control word by two during the WC sequence.

The R/W sequences differ from the R/W sequences for case III in that the current control word is decremented rather than incremented by one before the second memory reference. FIGURE 34*a* also shows the timing of the signals produced for decrementing the current control word by one during the R/W sequences.

FIGURE 34*b* shows the timing of the signals Z to C Odd and Z to C Even which are required for case IV. At time 1.1 of the R/W–I sequence the unmodified current control word is entered into the S register. A memory cycle takes place and the word at this address is read into the Z register. At time 4.1 this word is transferred from the Z register to the C Odd register.

The current control word is then decremented by one and this value entered into the S register at time 1.1 of the RC–II sequence. Another memory cycle takes place and the word at the address specified by the value in the S register is entered into the Z register. At time 4.1 the command Z to C Even gates this word into the C Even register.

Since the unmodified current control word is in the X register, the D register has been cleared, and the Inhibit EAB Flip-Flop has been reset, the Adder is presenting at its output the value representing the unmodified current control word. At time 6.4 of the R/W–I sequence the S register is cleared and at time 1.1 the current control word is gated from the Adder into the S register. The circuit for clearing the S register is from 25–1 through 25–2, 25–5 and 25–6 to the reset input terminal of the flip-flops in the S register. The signal for gating the content of the Adder to the S register comes from gate 25–3 and passes through 25–19 and 25–7 to the gates 20–3 in each stage of the S register.

At time 1.2 the Time In flip-flop is cleared. The circuit is from 5–55 through 5–56, 5–57 and 5–58 to the reset input terminal of the Time In Flip-flop. The In Acknowledge register is also cleared at time 1.2. This circuit is from 5–55 through 5–56, 5–57 and gates 11–2 to the reset input terminals of the flip-flops in each stage.

All stages of the V register are set, these stages having been set at time 5.4 of the scan cycle. As a result, the V translator circuits have been producing the signal CH–7 which activates the channel 7 controls. However, when operating in the dual mode and storing incoming information at consecutively higher addresses, it is necessary to store the least significant digits or those appearing in the even numbered channel at one address and then store the most significant digits or those appearing on the odd numbered channel at the next higher address. Therefore, at time 1.3 of the R/W-I sequence of the flip-flop V00 is cleared thus causing the V translator to produce the signal CH–6. The circuit for clearing V00 is from 5–31 through 5–32, 5–34, 5–28, 5–29, 5–26, 5–23 and 5–25 to the reset input terminal of the flip-flop.

The signal CH–6 produced by the V translator conditions drivers 18–8 so that the eighteen bits of data on channel 6 are gated through these drivers and data input gates 18–1 to the gates 22–3. At time 2.2 the command I/O to Z is produced. The circuit is from 5–55 through 27–4 and 27–5 to the gates 22–3. This gates the data from the data input gates into the Z register and a memory cycle takes place to store this data in the memory at the address specified by the value in the S register.

At time 1.3 of the RW-I sequence the value 1 is again entered into the D register. The circuit is from 26–11 through 26–15, 26–16, 26–12, 26–17, 26–13 and 21–7 to the set input terminal of D00. This value will be used to obtain the address at which the data word appearing on channel 7 is stored during the R/W-II sequence.

At time 2.4 of the R/W-I sequence the low order stage of the V register is again set so that the V translator produces the signal CH–7. The circuit for setting V00 extends from the Dual Mode Flip-flop through 5–35, 5–38 and 15–25 to the set input terminal of V00.

At time 3.1 stage 7 of the In One-Shot register is cleared. The circuit extends from 5–36 through 5–37, 5–65 and gate 8–5 in stage 7 to the reset input terminal of the flip-flop in stage 7.

The In-Acknowledge register stage 7 is also set at this time but has no effect since the Time In Flip-Flop is reset.

At time 5.2 of the R/W-I sequence flip-flop 5–15 is again set. The circuit extends from 5–10 through 5–11, 5–12, and 5–13 to set input terminal of the flip-flop. When the flip-flop is set it inhibits the normal stepping of the sequence control circuits and also sets the flip-flop 5–18 so that the device enters an R/W-II sequence.

At time 6.4 the S register is again cleared by the circuit extending from 25–1 through 25–2, 25–5 and 25–6 to the reset input terminals of the flip-flops in each stage of the S register. At time 6.4 the Z register is also cleared of the data entered therein from channel 6.

The unmodified current control word obtained from memory during the RC-II sequence is still contained in the X register and the value one entered into the D register during the R/W-I sequence is still contained in this register. At time 1.1 of the R/W-II sequence the sum of these values is gated from the Adder to the S register. The circuit is from 25–3 through 25–19 and 25–7 to the gates 20–3 in each stage of the S register. The address entered into the S register at this time is the address at which the eighteen bits of data from channel 7 are to be stored. At time 2.2 a signal from gate 5–55 passes through 27–4 and 27–5 to condition the gates 22–3 so that the data on channel 7 may be entered into the Z register. The memory then goes through a cycle during which the information in the Z register is entered into the address specified by the S register.

Stage 7 of the In Acknowledge register is again cleared at time 1.2 of the R/W-II sequence. The circuit is from 5–55 through 5–56, 5–57 and gates 11–2 to the reset input terminal of the flip-flop in each stage of the register.

At time 2.1 the In Acknowledge flip-flop is set. The circuit is from 5–19 through 5–20, 5–21, 5–43, 5–44, 5–45 and 5–47 to the set input terminal of the flip-flop.

At time 3.1 stage 7 of the In Request One-Shot register again receives a clear command and stage 7 of the In Acknowledge register is set. The circuit for clearing stage 7 of the In One-Shot register extends from 5–36 through 5–37, 5–65 and 8–5 to the reset input terminal of the flip-flop in stage 7. The circuit for setting stage 7 of the In Acknowledge register extends from 5–36 through 5–37, 5–59, gate 11–3 in stage 7, to the set input terminal of the flip-flop.

At time 5.4 the R/W–1 flip-flop is reset by the output signal from gate 3–4. At time 6.3 the Time In Flip-Flop is set. The circuit extends from the reset output terminal of the In Acknowledge Flip-Flop through gate 5–49 to the set input terminal of the Time In Flip-Flop. With both the Time In Flip-Flop and stage 07 of the In Acknowledge register set the driver 11–4 produces an output signal to the device connected to channel 7 to signal this device that the data on channels 6 and 7 has been stored. The operation ends at the end of time 6.3 when flip-flop 5–18 and the R/W–2 flip-flop are reset.

It should be noted that the scan timing chain begins another cycle of operation at time 2.4 of the R/W–II sequence. This causes a sequence of events to occur in much the same manner as in the scan cycle previously described. However, for reasons previously explained the sequence control circuits are not set up to begin a new input or output operation.

*Case V.*—The conditions which govern this case are as follows: The switch S7 in FIGURE 5 is not set for the dual mode of operation, the sign of the current control word assigned to channel 7 is positive thus signifying that the current control words are to be incremented, and an Input Request sets the In Function flip-flop in the Function Priority circuits.

The objective is to perform a Scan, RC–I, RC–II, WC and an R/W–I sequence. During the Scan sequence the Function Priority circuits, Channel Priority circuits and V register are set to select channel 7 and generate the address of the terminal control word. During the RC–I sequence the terminal control word is read out of the memory through the Z register into the X register and then transferred in complement form into the D register. During the RC–II sequence the address of the terminal control word is incremented by one by setting the low order stage of the S register. The current control word stored at this address is then read out of the memory through the Z register to the X register and subsequently compared with the terminal control word by adding the two values in the Adder.

During the WC sequence the current control word in the X register is incremented by one and the modified current control word is restored in memory at the same address from which the unmodified current control word was withdrawn. During the R/W–I sequence the unmodified current control word in the X register is transferred to the S register and the data word on input channel 7 is gated through the data input gates and the Z register and stored at the memory address specified by the unmodified current control word.

From the above summary it is seen that the Scan, RC–I and RC–II sequences for this case are the same as for case I described above. Therefore, the waveforms shown in FIGURE 33*a* show the timing of the various signals during these sequences. There is one exception however. Since the switch S7 is not set the dual mode flip-flop is not set at time 6.3 of the Scan sequence but instead remains reset throughout the input operation.

Figures 35A, 35B:
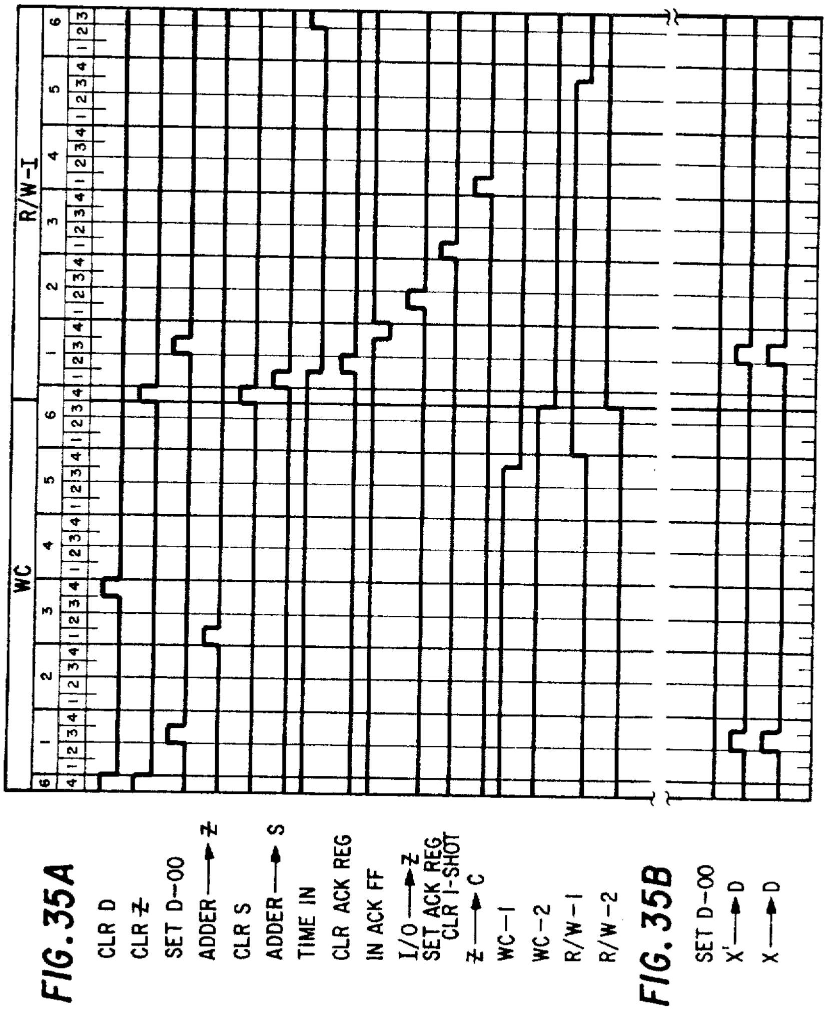

FIGURE 35*a* shows the waveforms of the various signals during the WC and R/W–I sequences. The Z register is cleared at time 6.4 of the WC sequence by the output of gate 27–1. The D register is also cleared at time 6.4 of the WC sequence by a signal which extends from 26–11 through 26–15, 26–4, 26–5, 26–7, 26–8 and 26–6 to the reset input terminal of the flip-flop in each stage of the D register. The value +1 is entered into the D register at time 1.3 of the WC sequence. The circuit is from 26–11 through 26–15, 26–16, 26–12, 26–17, 26–13 and 21–7 to the set input terminal of D00.

With the value +1 in the D register and the unmodified current control word in the X register the output of the Adder is the sum of these two values and thus represents the value of the next current control word. This value is entered into the Z register at time 3.1 of the WC sequence. Gate 27–2 produces an output signal that passes through 27–3 to condition the gates 22–4 in each stage of the Z register so that the content of the Adder may be entered into the Z register. After the modified current control word is entered into the Z register a memory cycle takes place during which the control word is stored at the address from which the original control word was withdrawn during the RC–II sequence.

The D register is again cleared at time 3.4 of the WC sequence. The circuit is from 26–2 through 26–3, 26–7, 26–8, and 26–6 to the reset input terminal of the flip-flop in each stage of the D register.

Since the flip-flop 5–18 is not set, the WC–1 flip-flop is reset at time 5.4 and the R/W–1 flip-flop is set at time 6.1 of the WC sequence. At time 6.4 flip-flop WC–2 is reset and flip-flop R/W–2 is set to begin the R/W–I sequence.

The Z register is cleared at time 6.4 of the R/W–I sequence by the output of gate 27–1. The S register is also cleared at time 6.4. The circuit is from 25–1 through 25–2, 25–5 and 25–6 to the reset input terminal of the flip-flop in each stage of the S register.

The current control word obtained from memory during the RC–II sequence is still contained in the X register in its unmodified form. The D register contains the value zero having been cleared at time 3.4 of the WC sequence. Therefore, the Adder is presenting at its output signals representing the current control word. These signals are gated into the S register at time 1.1 of the R/W–I sequence. The circuit is from 25–3 through 25–19 and 25–7 to the gates 20–3 in each stage of the S register.

During the Scan sequence the V register was set in all stages so that the V translator produces the signal CH–7. This signal conditions the drivers 18–9 so that the data on channel 7 is gated through the drivers and data input gates 18–1 to the gates 22–3 in each stage of the Z register. At time 2.2 of the R/W–I sequence this data is gated into the Z register. The circuit is from 5–55 through 27–4 and 27–5 to the read-in gates 22–3 in each stage of the Z register.

At time 1.2 of the R/W–I sequence the Time In flip-flop is reset by the circuit which extends from 5–55 through 5–56, 5–57 and 5–58 to the reset input terminal of the flip-flop. At time 1.2 the In Acknowledge register is cleared by a signal which passes from 5–55 through 5–56, 5–57 and gates 11–2 to the reset input terminal of the flip-flop in each stage of the In Acknowledge register.

The In Acknowledge flip-flop is reset at time 1.4 but is immediately set again at time 2.1 of the R/W–II sequence. The circuit for resetting the flip-flop is from 5–39 through 5–40 and 5–42 to the reset input terminal. The circuit for setting the flip-flop is from the reset output terminal of the Dual Mode flip-flop through 5–20, 5–21, 5–43, 5–44, 5–45 and 5–47 to the set input terminal of the In Acknowledge flip-flop. At time 3.1 of the R/W–II sequence stage 7 of the In Acknowledge register is set and stage 7 of the In One-Shot register is cleared. The circuit for setting the In Acknowledge register is from 5–36 through 5–37, 5–59 and gate 11–3 in stage 7 to set the In Acknowledge flip-flop in stage 7.

At time 6.3 of the R/W–I sequence the Time In flip-flop is set by the output of 5–50 which passes through gate 5–49 to the set input terminal of the flip-flop.

With both the Time In flip-flop and stage 7 of the In Acknowledge register set the driver 11–4 produces an In Acknowledge signal which is transmitted to the external device to indicate that the word placed on input channel 7 by the external device has been stored in the memory unit.

*Case VI.*—The conditions which govern this case are as follows: Switch S–7 is not set for the dual mode of operation, the sign of the current control word is positive indicating that the control words are to be incremented, and an Output Request sets the Out Function flip-flop in the function priority circuits.

FIGURES 33*a* and 35*a* may also be used to illustrate the timing of the signals involved in this case. Since this case differs only slightly from case V, only the differences will be noted.

At time 3.4 of the Scan sequence the Out flip-flop rather than the In flip-flop is set. The Out Request signal is gated through 13–6 by the signal Set Function Priority. With the Out Function flip-flop set, the In/Out flip-flop is set at time 6.2 by a signal which passes through 13–30, 13–31, and 13–32 to the set input terminal. This causes the Out signal rather than the In signal to be produced.

Since the Out Function flip-flop is set, gate 13–13 produces the signal Enable Out Request which passes through gates 14–2 to set stages 00 through 06 of the Channel Priority register. Stage 7 is not set because the signal CH–7 Out Request is negative at this time.

Because switch S7 is not closed, the Dual Mode Flip-Flop is not set at time 6.3 of the Scan sequence.

The RC-I, RC-II and WC sequences are the same for this case as for case V. The R/W-I sequence differs as follows.

Gate 5–55 is blocked so that the signal I/O to Z is not produced at time 2.2 of the R/W-I sequence. Since this is an output rather than an input operation it is desired to transfer information from memory through the Z register to the C register rather than transfer information from the input gates through the Z register to the memory. The current control word is entered into the S register at time 1.1 of the R/W-I sequence and a memory cycle takes place to read the word at this address into the Z register. At time 4.1 the command Z to C gates this data word into both the C Even and the C Odd registers. The negative output signal from the Dual Mode Flip-flop passes through gates 5–76 and 5–77 to condition the gates 5–74 and 5–75. A circuit is then completed from 5–51 through 5–68, 5–69, 5–73, 5–74 and 5–75 to the read-in gates 16–1 of C Even and the read-in gates of 17–1 of the C Odd.

The Out Acknowledge register is cleared at time 1.2 of the R/W-I sequence. The circuit is from 5–51 through 5–52, 5–53 and gates 12–2 to the reset input terminal of each stage of the Out Acknowledge register.

The Time Out flip-flop is reset at time 1.2 of the R/W-I sequence. The circuit is from 5–51 through 5–52, 5–53 and 5–54 to the reset input terminal of the flip-flop.

The Out Acknowledge Flip-Flop is reset at time 1.4 and is immediately set again at time 2.1. The circuit for resetting the Out Acknowledge Flip-flop is from 5–39 through 5–40 and 5–41 to the reset input terminal. The circuit for setting the Out Acknowledge Flip-flop extends from the zero side of the Dual Mode Flip-Flop through 5–20, 5–21, 5–43, 5–44, 5–45 and 5–46 to the set input terminal.

Stage 7 of the Out One-Shot register is reset at time 3.1 of the R/W-I sequence. The circuit is from 5–62 through 5–63, 5–60, gate 9–5 for stage 7 to the reset input terminal of the flip-flop in stage 7.

Stage 7 of the Out Acknowledge register is set at time 3.1 of the R/W-I sequence. The circuit is from 5–36 through 5–37, 5–60, gate 12–3 in stage 7 to the set input terminal of the flip-flop in stage 7.

*Case VII.*—The conditions which govern this case are as follows. The switch S7 in FIGURE 5 is not set for the dual mode of operation, the sign of the current control word assigned to channel 7 is negative thus signifying that the current control words are to be decremented, and an Input Request sets the In Flip-Flop in the function priority circuits.

The objective is to perform a Scan, RC-I, RC-II, WC and an R/W-I sequence. During the scan sequence the function priority circuits, channel priority circuits and V register are set to select channel 7 and generate the address of the terminal control word. During the RC-I sequence a terminal control word is read out of the memory through the Z register into the X register and then transferred in complement form into the D register. During the RC-II sequence the address of the terminal control word is incremented by one by setting the low order stage of the S register. The current control word stored at this address is then read out of the memory through the Z register to the X register and subsequently compared with the terminal control word by adding the two values in the Adder.

During the WC sequence the current control word in the X register is decremented by one and the modified current control word is restored in memory at the same address from which the unmodified current control word was withdrawn. During the R/W-I sequence the unmodified current control word in the X register is transferred to the S register and the data word on input channel 7 is gated through the data input gates and the Z register and stored at the memory address specified by the unmodified current control word.

From the above summary it is seen that the Scan, RC-I, RC-II and R/W-I sequences for this case are the same as for case V described above. Therefore, the waveform shown in FIGURES 33*a* and 35*a* show the timing of the various signals during these sequences.

The WC sequence differs from case V in that the current control word is decremented by one rather than incremented by one before being returned to the memory. As shown in FIGURE 35*b*, the signal Set D00 is not generated at time 1.3 of the WC sequence in order to enter the value +1 into the D register. Instead, the commands X′ to D and X to D are generated at this time to enter the value −1 into the D register. The signal X+ is negative and blocks gate 26–11 to prevent the command Set D00 from being generated. The signal X− passes through 26–28, 26–29, 26–30, 26–31, 26–32, 26–33 and 26–34 to become the command X to D and from 26–32 through 26–22 through 26–24 to become the command X′ to D.

With the value −1 entered into the D register the current control word is decremented by one and restored in memory during the WC sequence.

*Case VIII.*—The conditions which govern this case are as follows. Switch S7 is not set for the dual mode of operation, the sign of the current control word is negative indicating that the current control words are to be decremented, and an Output Request sets the Out Flip-flop in the function priority circuits.

The objective is to perform a Scan, RC-I, RC-II, WC and an R/W-I sequence. During the Scan sequence the function priority circuits, channel priority circuits and V register are set to select channel 7 and generate the address of the terminal control word. During the RC-I sequence the terminal control word is read out of the memory through the Z register into the X register and then transferred in complement form into the D register. During the RC-II sequence the address of the terminal control word is incremented by one by setting the low order stage of the S register. The current control word stored at this address is then read out of the memory through the Z register to the X register and subsequently compared with the terminal control word by adding the two values in the Adder.

During the WC sequence the current control word in the X register is decremented by one and the modified current control word is restored in memory at the same address from which the unmodified current control word was withdrawn. During the R/W-I sequence the unmodified current control word in the X register is transferred to the S register and a memory cycle takes place during which the word at the address specified by the value in the S register is read out of the memory into the Z register. This word is then transferred from the Z register to both the C Odd and C Even registers.

From the above summary it is seen that this case differs from case VI only by the fact that each current control word is decremented by one rather than by incremented by one before being returned to memory during the WC sequence. FIGURE 35*b* shows how the waveforms set D00, X′ to D and X to D vary for this case. Since the waveforms of FIGURE 35*b* have been previously explained with reference to Case VII a further explanation is not given.

Figure 36:
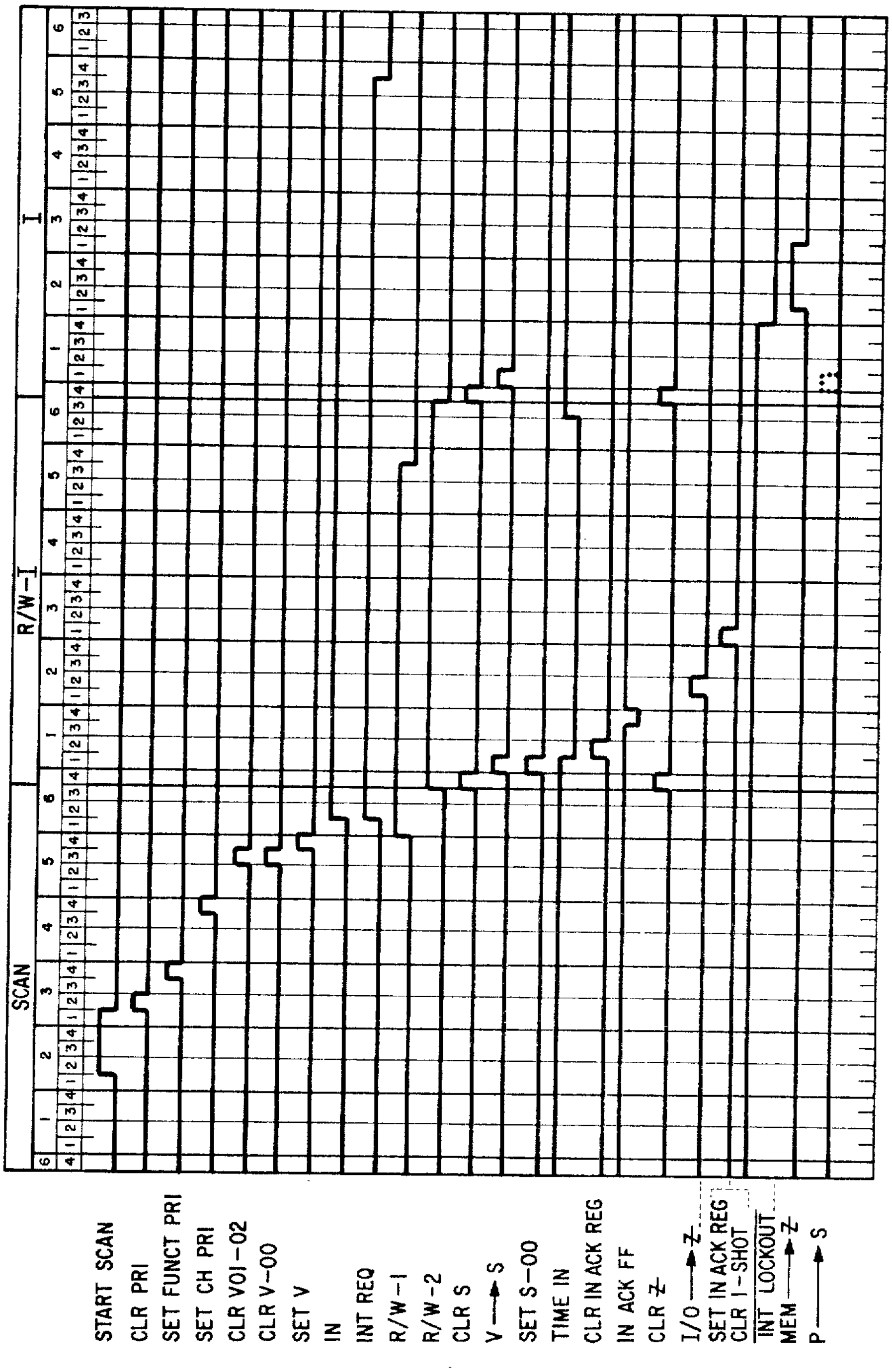

*Case IX.*—FIGURE 36 shows the sequence of operations when an External Interrupt is received and channel 7 is set for the single channel mode of operation.

The objective is to perform a Scan sequence, an R/W–I sequence and an I sequence. During the Scan sequence the function priority, channel priority and V register circuits are set to produce a memory address. During the R/W–I sequence this address is incremented by one as it is entered into the S register by setting the low order stage of the S register. The code word on the input channel is entered into the Z register and a memory cycle takes place during which the code word is stored at the address specified by the value in the S register. At the beginning of the I sequence the S register is cleared and the address generated by the priority circuits and V register is entered therein. A memory cycle then takes place to read out a Jump instruction which is stored at this address.

The Scan Timing Chain is started at time 2.4 of the Scan sequence by a signal which passes through 5–104, 5–106 and 4–2 to set flip-flop 4–1 in stage 1 of the timing chain. At time 3.2 the function and channel priority circuits are cleared. The circuit is from the zero side of stage 1 of the timing chain through 5–107 to the reset input terminals of the channel priority register and from 5–107 through gates 13–3 through 13–5 to the reset input terminals of the function priority flip-flops.

At time 3.4 the EI flip-flop is set in the function priority circuits. The circuit is from stage 2 of the timing chain through 4–4 and 13–8 to condition 13–11. The signal EI passes through 13–9, 13–10 and 13–11 to the set input terminal of the EI flip-flop. At time 4.4 stages 00 through 06 of the Channel Priority register are set. The circuit is from stage 4 of the timing chain through gates 14–4 in each stage of the Channel Priority register to the set input terminals of the flip-flops in these stages. Since channel 7 is making the External Interrupt request the signal CH–7 EI blocks gate 14–4 in stage 7 and prevents stage 7 of the Channel Priority register from being set.

The V register is cleared at time 5.3 of the Scan sequence. The circuit is from stage 5 of the Scan timing chain through 5–23 and 5–25 to the reset input terminal of V00 and from 5–23 through 5–24 to the reset input terminals of V01 and V02.

With all stages except stage 7 of the channel priority register set, the register produces the signals Set V00, Set V01 and Set V02. At time 5.4 these signals are gated through gates 15–22 through 15–24 to the set input terminals of the flip-flops in the V register. The circuit is from stage 6 of the Scan timing chain through 4–5 to the gates 15–22 through 15–24.

Since the Out flip-flop in the function priority circuits is not set, one input of gate 13–18 is conditioned. At time 6.2 a signal from stage 7 of the Scan timing chain passes through 13–30, 13–31 and 13–18 to reset the In/Out flip-flop and thus cause the flip-flop to produce the positive signal In.

At time 6.2 the output from stage 7 of the Scan timing chain blocks gate 5–94. Since gate 5–92 is blocked at this time because neither an In Request nor an Out Request is being made, a signal is produced at 5–93 which passes through 5–95 to set the Interrupt Signal Flip-flop.

When the EI Flip-Flop was set at time 3.4 the function priority circuits began producing the signal EI. This signal is applied through 5–90, 3–28 and 3–29 to condition 3–11. At time 6.1 a signal passes through 3–1, 3–2, 3–3, 3–5 and 3–11 to set the R/W–1 flip-flop. At time 6.4 a circuit is completed from the zero side of the R/W–1 flip-flop through gate 3–17 to the set input terminal of the R/W–2 flip-flop. This signifies the beginning of the R/W–I sequence.

At time 6.4 of the R/W–I sequence the Z and S registers are cleared. The Z register is cleared by the output from gate 27–1. The circuit for clearing the S register extends from 25–1 through 25–2, 25–5, 25–6, to the reset input terminal of each stage of the S register.

When the EI flip-flop was set, the function priority circuits began producing the signal Set S06. These circuits do not produce the signals Set S05 and Set S04 at this time. Since all stages of the V register are set, this register produces the signals Set S03, Set S02 and Set S01. At time 1.1 of the R/W–I sequence these address signals are transferred to the S register through the read-in gates 20–4 in stages S01 through S06. The circuit for conditioning gates 20–4 extends from 25–8 through 25–9 and 25–11 to the gates 20–4. At the time the address is entered into the S register from the V register and function priority circuits, it is incremented by one by setting the low order stage of the S register. This circuit extends from 25–8 through 25–4 and 25–10 to the set input terminal of S00.

At time 1.2 of the R/W–1 sequence the In Acknowledge register is cleared. The circuit is from 5–55 through 5–56, 5–57, gates 11–2 to the reset input terminals of the flip-flops in each stage of the In Acknowledge register.

The Time In flip-flop is also reset at time 1.2. This circuit extends from 5–55 through 5–56, 5–57 and 5–58 to the reset input terminal of the flip-flop.

The In Acknowledge flip-flop is reset at time 1.4 of the R/W–I sequence and is immediately set again at time 2.1. The circuit for reseting the flip-flop is from 5–39 through 4–40 and 5–42 to the reset input terminal. The circuit for setting the flip-flop extends from the reset output terminal of the Dual Mode Flip-Flop through 5–20, 5–21, 5–43, 5–44, 5–45, and 5–47 to the set input terminal.

When the V register was set at time 5.4 of the Scan sequence the V register translator gate 15–12 began producing the signal CH–7. This signal conditions the drivers 18–9 so that the code word on input channel 7 is gated through these drivers and data input gates 18–1 to the read-in gates 22–3 in the Z register. The read-in gates are conditioned at time 2.2 of the R/W–I sequence and the code word is entered into the Z register. The circuit for conditioning gates 22–3 extends from 5–55 through 27–4 and 27–5 to the gates 22–3.

After the code word is entered into the Z register a memory cycle takes place during which the code word is stored in the memory at the address specified by the value in the S register. As shown previously, the seven low order bits of this address have the value 1001111.

At time 3.1 of the R/W–I sequence stage 7 of the In Request One-Shot register is cleared. The circuit is from 5–36 through 5–37, 5–65, 8–5 in stage 7 of the register to the reset input terminal of the flip-flop in this stage.

At time 3.1 stage 7 of the In Acknowledge register is set. This circuit is from 5–36 through 5–37, 5–59, gate 11–3 in stage 7 to the set input terminal of the flip-flop in stage 7.

At time 6.3 of the R/W–I sequence the Time In flip-flop is set. This circuit is from 5–50 through 5–49 to the set input terminal of the flip-flop. With the Time In flip-flop set in stage 7 of the In Acknowledge register also set driver 11–4 in stage 7 produces an In Acknowledge signal to indicate to the external device that the code word which it placed on the input channel has been stored in the memory unit.

Flip-flop R/W–1 is reset at time 5.4 of the R/W–I sequence. The circuit is from 3–1 through 3–2, 3–3, 3–4 and 3–8 to the reset input terminal of the flip-flop. At time 6.4 a circuit is established from the set output terminal of this flip-flop through gate 3–16 to reset the R/W–2 flip-flop and thus terminate the R/W–I sequence and begin an I sequence.

At time 6.4 of the I sequence the Z register is cleared by the output from gate 27–1 and the S register is cleared by the circuit which extends from 25–1 through 25–2, 25–5, 25–6 to the set input terminal of the flip-flop in each stage of the X register.

The function priority circuits and the V register are still generating the address digits which were entered into S during the R/W–I sequence. At time 1.1 of the I sequence these address digits are again entered into stages S01 through S06. The circuit is from 25–15 through 25–9 and 25–11 to the gates 20–4 in each stage of the S register. Since gate 25–8 is blocked the signal Set S00 is not produced during the I sequence as it was during the R/W–I sequence. Therefore, the seven low order digits of the address in the S register are 1001110. As shown in Table II this is the address of the Jump instruction for channel 7.

The command P to S normally occurs at time 1.1 of the I sequence in order to enter the address of the next instruction into the S register. On an I sequence resulting from an External Interrupt the command P to S is inhibited. The signal $\overline{\text{Interrupt Request}}$ produced by the Interrupt Request flip-flop in FIGURE 5 blocks gate 29–1 to prevent the command from being generated. This also prevents the starting of the timing chain of FIGURE 29 which normally steps through a cycle of operation during I sequences to compute the address of the next instruction.

At time 2.1 of the I sequence the Interrupt Lock-out Flip-Flop is set by the circuit which extends from the zero side of the Interrupt Request Flip-flop through 5–96, 5–97 and 5–98 to the set input terminal of the Interrupt Lock-out Flip-Flop. The signal $\overline{\text{Interrupt Lock-out}}$ is applied to the function priority circuits of FIGURE 13 where it prevents further external interrupts from setting the EI flip-flop and also terminates the signal EI produced by gate 13–28.

At time 2.2 of the I sequence the special Jump instruction is read out of the address specified by the S register and entered into the Z register. The circuit is from 27–6 through 27–7 and 27–8 to the read-in gates 22–2 in each stage of the Z register. Although not shown in FIGURE 36, this special Jump instruction is entered into the instruction register at time 4.1 when the output of 30–4 becomes positive.

The Jump instruction is decoded in the instruction register and causes the data processing unit to first store the content of the P register at a designated address and then take the instruction stored at the next address to thus enter a subroutine to analyze the code word stored in the memory during the R/W–I sequence. The last instruction of the subroutine is a Jump instruction which produces a signal on leads 5–102 to reset the Interrupt Lock-out Flip-flop and which also returns to P the value stored at the memory address designated by the special Jump instruction which initiated the subroutine. Thus, the Interrupt Lock-out Flip-flop may remain set for an indeterminate number of sequences.

The Interrupt Request Flip-flop is reset at time 5.4 of the I sequence when a signal from 5–99 passes through 5–100 and 5–101 to the reset input terminal of the flip-flop.

*Case X.*—The conditions which govern this case are as follows. Switch S7 in FIGURE 5 is set for the dual mode of operation and an External Interrupt sets the EI flip-flop in the function priority circuits.

The objective is to form a Scan, R/W–I, R/W–II and an I sequence. During the Scan sequence the Function Priority, Channel Priority and V register circuits are set to produce a memory address. During the R/W–I sequence this address is incremented by one as it is entered into the S register by setting the low order stage of the S register. The code word on input channel 7 is entered into the Z register during the R/W–1 sequence and a memory cycle takes place during which the code word is stored at the address specified by the value of the S register.

During the R/W–I sequence the low order stage of the V register is reset so that the value of the memory address produced by the Function Priority, Channel Priority and V register circuits is reduced by two. At the beginning of the R/W–II sequence this address is incremented by one as it is entered into the S register by setting the low order stage of the S register. The code word on input channel 6 is entered into the Z register and a memory cycle takes place during which the code word is stored at the address specified by the value in the S register.

V00 is set at time 2.4 of the R/W–II sequence and at the beginning of the I sequence the address produced by the Function Priority, Channel Priority and V register circuits is entered into the S register. Stage S00 is not set on the I sequence. During the I sequence a memory cycle takes places during which the special Jump instruction assigned to channel 7 is read out of memory and placed in the Z register.

Figure 37:
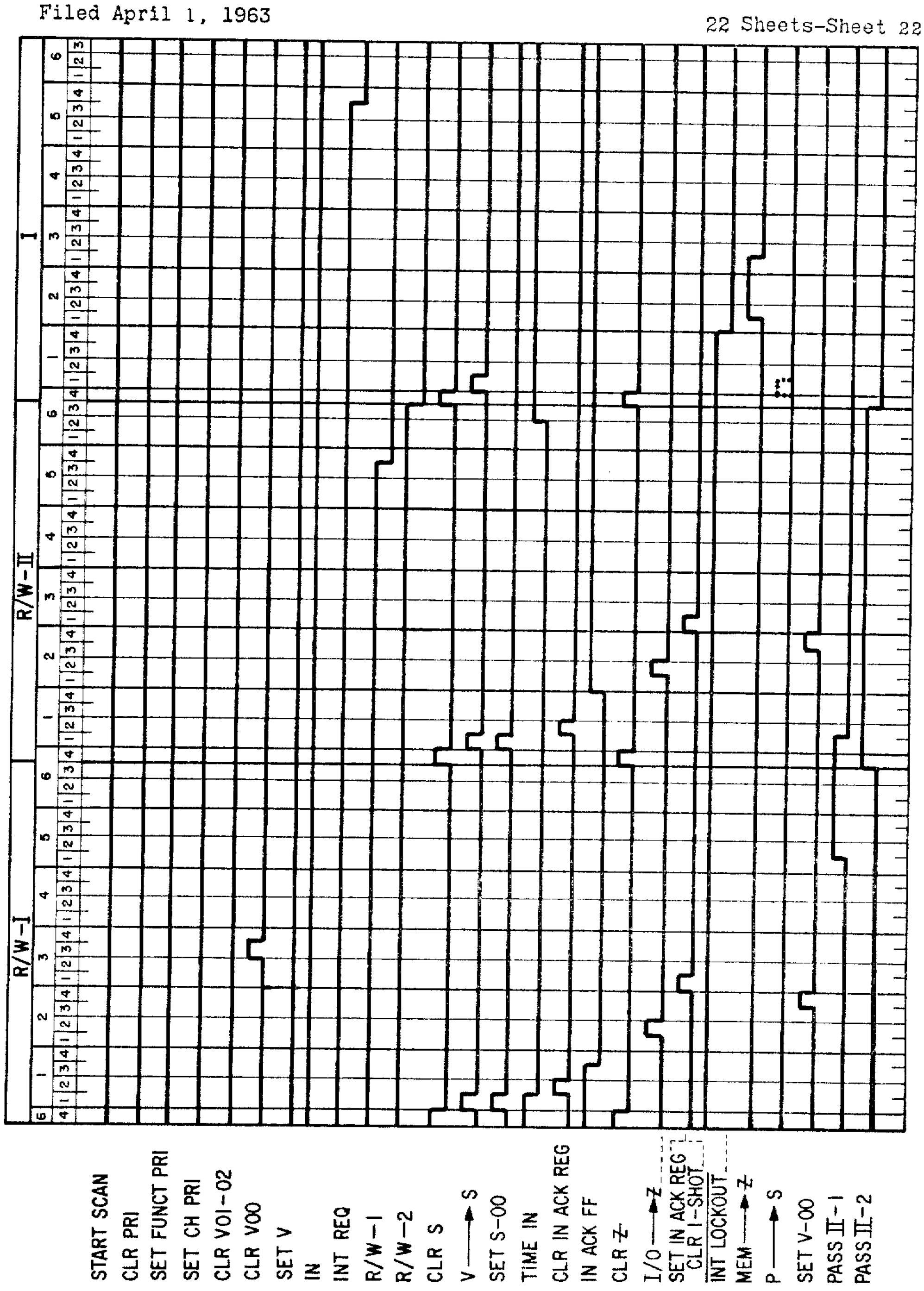

FIGURE 37 shows the timing of the signals which occur during the R/W–I, R/W–II and I sequences. The events which occur during the Scan sequence are the same as shown in FIGURE 36 with one exception. This exception is that the Dual Mode Flip-flop is set at time 6.2 of the Scan sequence because channel 7 requests an External Interrupt and switch S7 is set.

At time 6.4 of the R/W–1 sequence the S and Z registers are cleared in the usual manner. At time 1.1 the address generated by the function priority circuits and the V register is gated through the gates 20–4 into stages S01 through S06. For channel 7 the seven low order bits of this address are 1001110. At time 1.1 the low order stage of the S register is set. The circuit is from 25–8 through 25–4 and 25–10 to the set input terminal of S00. This changes the address in the S register to the value 1001111.

The Z register is producing the signal CH–7 which conditions the drivers 18–9 so that the code word on input channel 7 is gated through the drivers and data input gates 18–1 to the read-in gates 22–3 in each stage of the Z register. At time 2.2 of the R/W–I sequence this code word is gated through the gates 22–3 and into the Z register. The circuit is from 5–55 through 27–4 and 27–5 to the read-in gates 22–3. A memory cycle takes place during which the content of the Z register is stored in memory address 1001111.

At time 3.3 of the R/W–I sequence stage V00 is cleared so that the V translator circuit no longer produces the signal Set S01.

At time 5.2 of the R/W–I sequence flip-flop 5–15 is set and at time 6.4 the flip-flop 5–18 is set. The setting of flip-flop 5–15 enables the signal Pass II–1 to block the normal resetting of the R/W–1 flip-flop in FIGURE 3. As a result, the R/W–1 and R/W–2 flip-flops remain up for another sequence.

At time 6.4 of the R/W–II sequence the S and Z registers are again cleared in the normal manner. The address being generated by the function priority in V register circuits is entered into the S register at time 1.1. Since V00 is reset the seven low order digits of the address entered into S are 1001100. At time 1.1 the low order stage of the S reigster is set by the circuit which extends from 25–8 through 25–4 and 25–10 to the set input terminal of S00. This changes the value of the address in the S register to 1001101.

When V00 was cleared at time 3.3 of the R/W–I sequence the V translator circuit began producing the signal CH–6. This signal conditions the drivers 18–8 so that the code word on channel 6 is gated through these drivers and data inputs gates 18–1 to the read-in gates 22–3 in each stage of the Z register. A memory cycle then takes place to store the content of the Z register at address 1001101.

Flip-flop 5–15 is reset at time 1.2 of the R/W–II sequence so the R/W–1 flip-flop is reset at time 5.4 in the normal manner. At time 6.4 the R/W–2 flip-flop is reset to thus terminate the R/W–II sequence and begin the I sequence.

At time 6.4 of the I sequence the S and Z registers are again cleared. At time 1.1 of the I sequence the address being generated by the function priority and V register circuits is entered into the S register. Since the low order stage of the V register was set at time 2.4 of the R/W–II sequence the seven low order digits of this address are 1001110. At time 2.2 a memory cycle takes place so that the special Jump instruction at address 1001110 may be read into the Z register.

This Jump instruction causes the data processing unit to transfer the present instruction address from the P register to the memory and then enter a subroutine to analyze the two code words received over channels 6 and 7 and stored at addresses 1001101 and 1001111, respectively.

The operation of the Acknowledge circuits for case X differ from case IX in that the In Acknowledge flip-flop is reset at time 1.4 of the R/W–I sequence and remains reset until the R/W–II sequence. The Time In flip-flop is reset at time 1.2 of the R/W–II sequence and remains set until 6.3 of the R/W–II sequence.

Obvious modifications falling within the spirit and scope of the invention herein described will be obvious to those skilled in the art. It is intended therefore to be limited only by the scope of the appended claims.

We claim:

1. In a data processing unit of the type having an addressable memory for storing N bits of data at each memory address, first and second input channels each having N data signal paths, first and second means associated with said first and second input channels, respectively, for manifesting input request signals, priority circuit means responsive to said input request signals for granting priority to one of said channels and producing signals indicating the channel granted priority, and transfer control means normally operative in response to signals from said priority circuit means for storing at one of said memory addresses the data present on the input channel granted priority, the improvement comprising: selectively settable mode control means responsive to a priority signal indicating that said first channel has been granted priority for producing a mode control signal; and means responsive to said mode control signal for applying signals to said transfer control means; said transfer control means including means responsive to said last named signals and signals from said priority circuit means for storing at one of said memory addresses the data present on the channel granted priority and storing at an adjacent memory address the data present on the channel not granted priority.

2. In a data processing unit of the type having an addressable memory for storing N bits of data at each memory address, first and second output channels, first and second means associated with said first and second output channels, respectively, for manifesting output request signals, priority circuit means responsive to said output request signals for allotting priority to one of said channels and producing signals indicating the channel allotted priority, and transfer control means normally operative in response to signals from said priority circuit means for reading a data word from one of said memory addresses and placing it on the output channel allotted priority, the improvement comprising: selectively settable mode control means responsive to a priority signal indicating that said first channel has been allotted priority for producing a mode control signal; and means responsive to said mode control signal for applying signals to said transfer control means, said transfer control means including means responsive to said last named signals and signals from said priority circuit means for reading a data word from one of said memory locations and placing it on the output channel allotted priority and reading a data word from an adjacent memory address and placing it on the output channel not alloted priority.

3. The combination comprising: an addressable memory for storing an N-bit word at each address; a plurality of consecutively numbered input channels and a plurality of consecutively numbered output channels each having N data signal paths; input request means associated with each input channel for producing an input request signal; output request means associated with each output channel for producing an output request signal; priority determining means responsive to said input request signals and said output request signals for granting priority to one of said channels and producing signals indicative of the channel granted priority; a plurality of selectively settable switches, one switch for each odd numbered input channel and its correspondingly numbered output channel; mode control means connected to said switches and said priority determining circuits for producing a dual mode signal when an odd numbered channel is granted priority and the corresponding switch is set; and transfer control means responsive to said priority determining circuits and the absence of said mode control signal for transferring an N-bit word between said memory and the channel granted priority and responsive to said priority determining circuits and said mode control signal for transferring a word between one memory address and the input or output channel granted priority and another word between a consecutive memory address and the next lower even numbered channel of the same type.

4. The combination as claimed in claim 3 wherein current control words, one for each channel, are stored at fixed addresses in said memory, said transfer control means including: first means responsive to said priority determining circuits for withdrawing a current control word from said memory; second means for modifying said current control word to obtain the next control word and returning said next control word to memory; third means responsive to said current control word, said priority determining circuits, and the absence of said dual mode signal for transferring a word between a memory address specified by said current control word and the channel granted priority; and fourth means responsive to said current control word, said priority determining circuits and said dual mode signal for transferring two words between the channel granted priority, the next lower even numbered channel of the same type, and two consecutive memory addresses.

5. The combination as claimed in claim 4 wherein said fourth means includes further modifying means for modifying said current control word by one to thereby obtain one of said two consecutive memory addresses.

6. The combination as claimed in claim 5 wherein each current control word has an indicator stored therewith to indicate whether the control word should be incremented or decremented, said second means including means responsive to said indicator for normally modifying said current control word by one and further means responsive to said indicator and said dual mode signal for modifying said current control word by an additional one.

7. The combination comprising: an addressable memory having stored therein a plurality of terminal control words and current control words each specifying a memory address, there being one terminal control word and one current control word for each channel; at least two consecutively numbered channels; means associated with each channel for manifesting a request signal; priority means responsive to said request signals for producing a signal indicative of the channel having the highest priority; settable switch means associated with the odd numbered channels; means responsive to a signal from said priority means indicating an odd numbered channel has the highest priority for producing a dual mode signal if the switch means corresponding to that channel is set; means responsive to said priority means for withdrawing from said memory the terminal and current control words for the channel having the highest priority; means for comparing the terminal and current control words withdrawn from memory; first means normally operative for modifying said current control word by one but responsive to said dual mode signal for modifying said current control word by two to obtain a next current control word; means for storing said next current control word at the same memory address from which the current control word was withdrawn; second means responsive to said dual mode signal for modifying said current control word by one; and means normally operative in response to a signal from said priority means indicating the channel having highest priority for transferring a word between said channel and the memory address specified by said current control word, said means being operative in response to said dual mode signal for also transferring a word between the memory address specified by said current control word modified by one and the next lower even numbered channel.

8. The combination as claimed in claim 7 wherein said current control words include a designator bit, said first means including means responsive to said designator bit for modifying said current control word by plus or minus one and further means responsive to said designator bit and said mode control signal for modifying said current control word by plus or minus two.

9. In a data processing unit of the type having an addressable memory for storing N bits of data at each memory address; first and second input channels each having N data signal paths, first and second means associated with said first and second input channels, respectively, for manifesting external interrupt signals, priority circuit means responsive to said external interrupt signals for granting priority to one of said channels and producing signals indicating the channel granted priority, and interrupt control means normally operative in response to signals from said priority circuit means for storing at one of said memory addresses the data present on the channel granted priority and withdrawing from memory a Jump Instruction, the improvement comprising: selectively settable mode control means responsive to a priority signal indicating that said first channel has been granted priority for producing a mode control signal; and means responsive to said mode control signal for applying signals to said transfer control means, said transfer control means including means responsive to said last named signals and signals from said priority circuit means for storing at one of said memory addresses the data present on the channel granted priority, storing at another memory address the data present on the channel not granted priority, and withdrawing from memory a Jump Instruction.

10. The combination comprising: a plurality of consecutively numbered input channels each having N data signal paths; an addressable memory for storing an N-bit word at each address, said memory having an address assigned to each input channel for the storage of data words received over that channel; external interrupt means associated with each input channel for producing an external interrupt signal; priority determining means responsive to said external interrupt signals for granting priority to one of said channels and producing signals indicative of the channel granted priority; a plurality of selectively settable switches, one switch for each odd numbered input channel; mode control means connected to said switches and said priority determining circuits for producing a dual mode signal when an odd numbered channel is granted priority and the corresponding switch is set; and interrupt control means responsive to said priority determining circuits and the presence of said mode control signal for transferring an N-bit word from the channel granted priority to the memory address assigned thereto and transferring an N-bit word from the next lower even numbered channel to the memory address assigned to said even numbered channel.

11. The combination as claimed in claim 10 wherein said addressable memory has another address assigned to each input channel for the storage of a Jump Instruction, said interrupt control means having means therein responsive to said mode control signal and said priority determining circuits for withdrawing one of said Jump Instructions from said memory.

12. In a data processing system having a plurality of external units connected to a data processing unit by a plurality of consecutively numbered channels, each channel including data lines, and means within said data processing unit responsive to a signal from one of said external units for entering information on one of said data lines into said memory, the improvement comprising: selectively settable dual mode control means responsive to a signal from an external device connected to an odd numbered channel for entering into said memory the data appearing on said odd numbered channel and the next lower even numbered channel.

References Cited by the Examiner

UNITED STATES PATENTS

| | | | |
|---|---|---|---|
| 3,200,380 | 8/1965 | MacDonald ------- | 340—172.5 |

ROBERT C. BAILEY, *Primary Examiner.*

R. ZACHE, *Assistant Examiner.*